US011356900B2

United States Patent
Xin et al.

(10) Patent No.: US 11,356,900 B2
(45) Date of Patent: Jun. 7, 2022

(54) RESERVING FUTURE CHANNEL TIME FOR HANDLING OF REAL TIME APPLICATION (RTA) PACKETS ON WIRELESS LOCAL AREA NETWORK

(71) Applicant: SONY GROUP CORPORATION, Tokyo (JP)

(72) Inventors: Liangxiao Xin, San Jose, CA (US); Mohamed Abouelseoud, Burlingame, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 213 days.

(21) Appl. No.: 16/694,874

(22) Filed: Nov. 25, 2019

(65) Prior Publication Data

US 2021/0007016 A1 Jan. 7, 2021

Related U.S. Application Data

(60) Provisional application No. 62/870,322, filed on Jul. 3, 2019.

(51) Int. Cl.
*H04L 47/80* (2022.01)
*H04W 28/26* (2009.01)
(Continued)

(52) U.S. Cl.
CPC .......... *H04W 28/26* (2013.01); *H04L 47/722* (2013.01); *H04L 47/801* (2013.01);
(Continued)

(58) Field of Classification Search
CPC ..... H04L 12/581; H04L 47/801; H04L 65/00; H04L 65/4023; H04L 12/413; H04W 74/08; H04W 74/0808
See application file for complete search history.

(56) References Cited

U.S. PATENT DOCUMENTS

2004/0264488 A1* 12/2004 Yoon ................ H04L 47/14
370/412
2014/0092857 A1* 4/2014 Kneckt .............. H04W 28/26
370/329

(Continued)

FOREIGN PATENT DOCUMENTS

| CA | 2532852 | 8/2006 |
| KR | 20050118599 A | 12/2005 |
| KR | 100798854 B1 | 5/2007 |

OTHER PUBLICATIONS

K. Rahimi Malekshan, W. Zhuang and Y. Lostanlen, "An Energy Efficient MAC Protocol for Fully Connected Wireless Ad Hoc Networks," in IEEE Transactions on Wireless Communications, vol. 13, No. 10, pp. 5729-5740, Oct. 2014, doi: 10.1109/TWC.2014. 2336801. (Year: 2014).*

(Continued)

*Primary Examiner* — Salvador E Rivas
(74) *Attorney, Agent, or Firm* — O'Banion & Ritchey LLP; John P. O'Banion

(57) ABSTRACT

A wireless communication circuit configured for communicating over a wireless local area network (WLAN) in its reception area to communicate real-time application (RTA) packets as well as non-real time (non-RTA) packets while utilizing carrier sense multiple access/collision avoidance (CSMA/CA). An RTA scheduling table is utilized for tracking active RTA sessions and managing transmission times for RTA traffic. Scheduling of channel time based on the expected RTA packet arrival time, and rejecting other packet transmissions during the scheduled channel time for RTA packet.

22 Claims, 32 Drawing Sheets

(51) Int. Cl.
*H04W 72/04* (2009.01)
*H04L 47/722* (2022.01)
*H04W 74/08* (2009.01)
*H04W 84/12* (2009.01)
*H04L 12/413* (2006.01)

(52) U.S. Cl.
CPC ... *H04W 72/0446* (2013.01); *H04W 74/0808* (2013.01); *H04L 12/413* (2013.01); *H04W 84/12* (2013.01)

(56) References Cited

U.S. PATENT DOCUMENTS

2015/0092639 A1* 4/2015 Jia ................. H04W 52/0212 370/311
2020/0404704 A1* 12/2020 Xin ................. H04L 1/1877

OTHER PUBLICATIONS

Little, T.D.C. et al., "Real-Time Scheduling for Multimedia Services", In Proc. SPIE Symposium OE/FIBERS '92, (High-Speed Networks and Channels II), Sep. 1992, SPIE vol. 1784, pp. 320-331.

Heusse, Martin et al., "Scheduling Time-sensitive Traffic on 802.11 Wireless LANs", In: Karlsson G., Smirnov M.I. (eds) Quality for All. QofIS 2003. Lecture Notes in Computer Science, vol. 2811. Springer, Berlin, Heidelberg, 2003.

Malekshan, Kamal et al., "An Energy Efficient MAC Protocol for Fully Connected Wireless Ad Hoc Networks," in IEEE Transactions on Wireless Communications, vol. 13, No. 10, pp. 5729-5740, Oct. 2014, doi: 10.1109/TWC.2014.2336801, published online Jul. 23, 2014.

Maqhat, Bakeel et al., "Performance analysis of fair scheduler for A-MSDU aggregation in IEEE802.11n wireless networks," 2014 2nd International Conference on Electrical, Electronics and System Engineering (ICEESE), Kuala Lumpur, 2014, pp. 60-65, doi: 10.1109/ICEESE.2014.7154608.

* cited by examiner

RTA-RTS frame | Frame Control | Duration | RA | TA | Indication of RTA traffic | RTA session ID | Priority | FCS

RTA-CTS frame | Frame Control | Duration | RA | Indication of RTA traffic | RTA session ID | Priority | FCS

RTA-NTS frame | Frame Control | Duration | RA-NAV | Number of RA-notNAV | RA-notNAV | ... | RA-notNAV | Indication of RTA traffic | RTA session ID | Priority | Start Time of Channel Occupancy | FCS

RESERVING FUTURE CHANNEL TIME FOR HANDLING OF REAL TIME APPLICATION (RTA) PACKETS ON WIRELESS LOCAL AREA NETWORK

CROSS-REFERENCE TO RELATED APPLICATIONS

This application claims priority to, and the benefit of, U.S. provisional patent application Ser. No. 62/870,322 filed on Jul. 3, 2019, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication stations, and more particularly to wireless local area network (WLAN) stations communicating a combination of real time and non-real time traffic.

2. Background Discussion

Current wireless technologies using Carrier Sense Multiple Access/Collision Avoidance (CSMA/CA) focus on high overall network throughput, however they lack low latency capability for properly supporting real time applications (RTAs).

An RTA requires low latency communication and uses best effort communication. The data generated from the RTA is called RTA traffic and is packetized as RTA packets at the transmitter station (STA), while the data generated from a non-time sensitive application is called non-RTA traffic and is packetized as non-RTA packets at the transmitter STA. These RTA packets require low latency due to a high timeliness requirement (real-time) on packet delivery. The RTA packet is valid only if it can be delivered within a certain period of time.

Due to the random channel access scenario, a STA needs to sense and contend for channel access before transmitting each packet. Although obtaining a short channel contention time accelerates channel access, it increases the probability of packet collision. The delay inherent in packet collisions is still significant due to the channel contention time required for each retransmission. To avoid packet collisions and improve packet delivery success rates, an STA retransmits the packet following a longer channel contention period after a packet collision, which further delays the packet.

In view of the above, it is seen that there are still significant latencies involved in communicating time sensitive RTA packets within a CSMA/CA system.

Accordingly, a need exists for enhanced handling of real time application (RTA) packets and significantly reducing packet latency. The present disclosure fulfills that need and provides additional benefits over previous technologies.

BRIEF SUMMARY

The communication of packet traffic for real time applications (RTAs) is enhanced by reserving future channel time. Yet, obtaining a future channel reservation for an RTA packet in a CSMA/CA system introduces numerous challenges. In the present disclosure stations are able to distinguish between RTA packets and non-RTA packets, and separate the channel access scheme for RTA packets from that of non-RTA packets, thus allowing non-RTA packet traffic to still use regular random channel access scheme defined in CSMA/CA.

The disclosed technology allows the station (STA) to have knowledge of the arrival time of RTA traffic at its Medium Access Control (MAC) layer and schedule the future channel time for RTA traffic transmission. In addition, this technology allows the STA to occupy the channel before the scheduled channel time for RTA traffic transmission. The STA thus can have channel access for the RTA traffic at the beginning of the scheduled channel time.

The disclosed technology schedules channel time based on the expected RTA packet arrival and allows the STA to reject the non-RTA packet and unexpected RTA packet transmission during the scheduled channel time for RTA packet transmission. The future RTA channel time reservation of this disclosure considers the time-validity of RTA traffic and minimizes its latency in a wireless network where RTA and non-RTA traffic coexist. Thus, the disclosure technology overcomes many issues with existing wireless networking technologies that fail to meet timeliness requirements of RTA packets.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 34 is a data field diagram of an RTA-RTS frame according to at least one embodiment of the present disclosure.

FIG. 35 is a data field diagram of an RTA-CTS frame according to at least one embodiment of the present disclosure.

FIG. 36 is a data field diagram for of an RTA-NTS frame according to at least one embodiment of the present disclosure.

DETAILED DESCRIPTION

1. Conventional WLAN Systems 1.1. Random Channel Access Scheme

Conventional WLAN systems under IEEE 802.11, specifically up to 802.11ax, use carrier-sense multiple access/collision avoidance (CSMA/CA) to allow stations (STAs) to have random access to the channel for packet transmission and retransmission.

Figure 1:
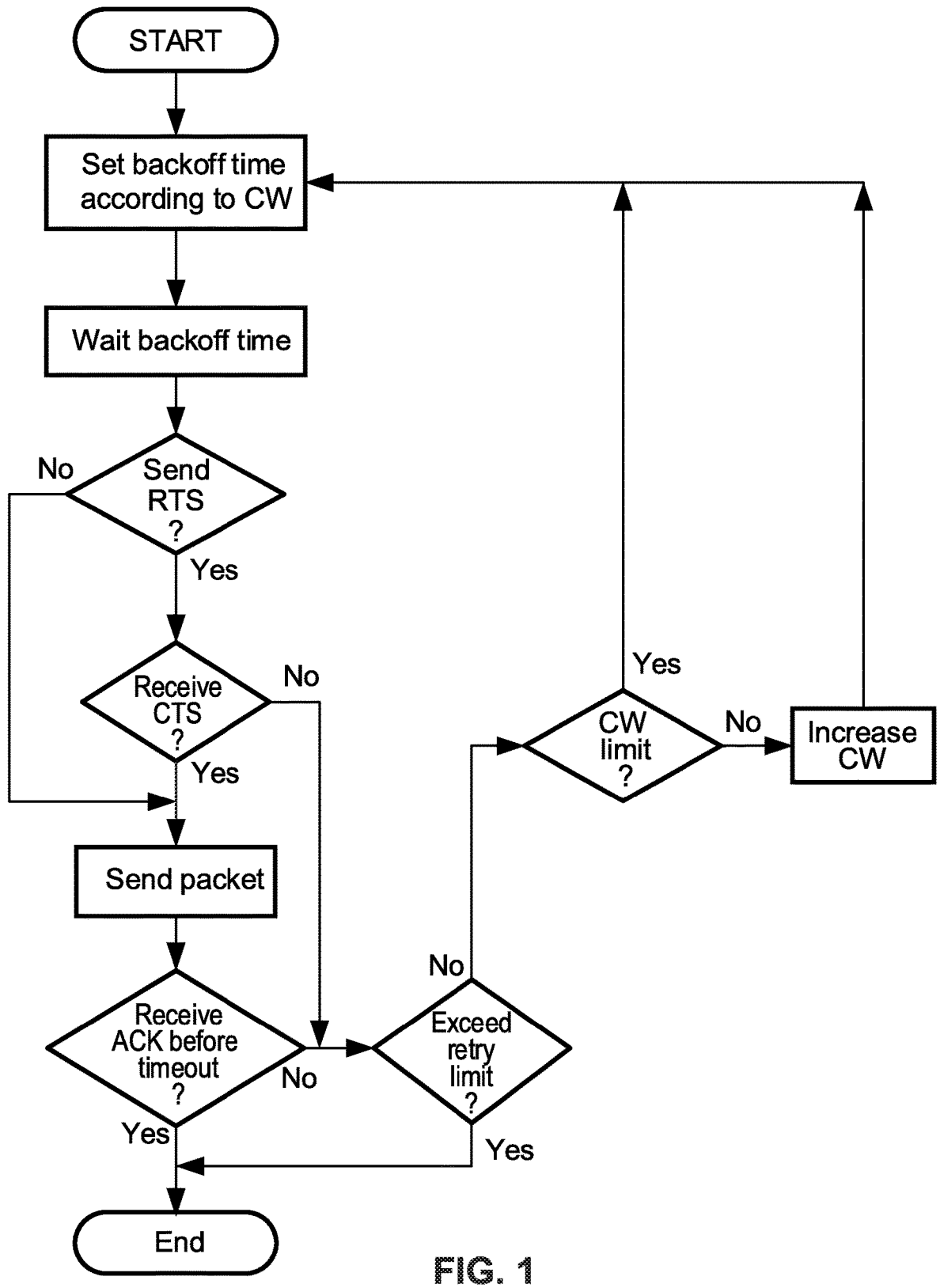
FIG. 1 is a flow diagram of contention-based channel access in CSMA/CA.

FIG. 1 depicts contention-based channel access in CSMA/CA. In a CSMA/CA system, the STA senses the channel for transmission when there is data to transmit. Before each transmission and retransmission, the STA has to sense the channel and set a backoff time to contend for channel access. The backoff time is decided by a uniform random variable between zero and the size of a contention window (CW).

After the STA waits for the backoff time and senses that the channel is idle (unoccupied), the STA decides whether to send a Ready To Send (RTS) frame to ensure channel occupancy or not. If the STA sends an RTS frame, the channel occupancy is ensured when it receives a Clear To Send (CTS) frame, whereby the STA sends the packet. If the STA does not send an RTS frame, then it sends the packet directly. A retransmission is required if the CTS frame is not received after sending an RTS frame, or if the STA does not receive an ACKnowledgement (ACK) before timeout. Otherwise, the transmission succeeds. When the retransmission is required, the STA checks the number of retransmissions of the packet. If the number of retransmissions exceeds the retry limit, then the packet is dropped and no retransmissions are scheduled. Otherwise, the retransmission is scheduled. If the retransmission is scheduled, then another backoff time is needed to contend for channel access for the retransmission. If the size of the contention window does not reach the upper limit, then the STA increases it. The STA sets another backoff time depending on the new size of the contention window. The STA waits the backoff time for retransmission and so forth.

Figure 2:
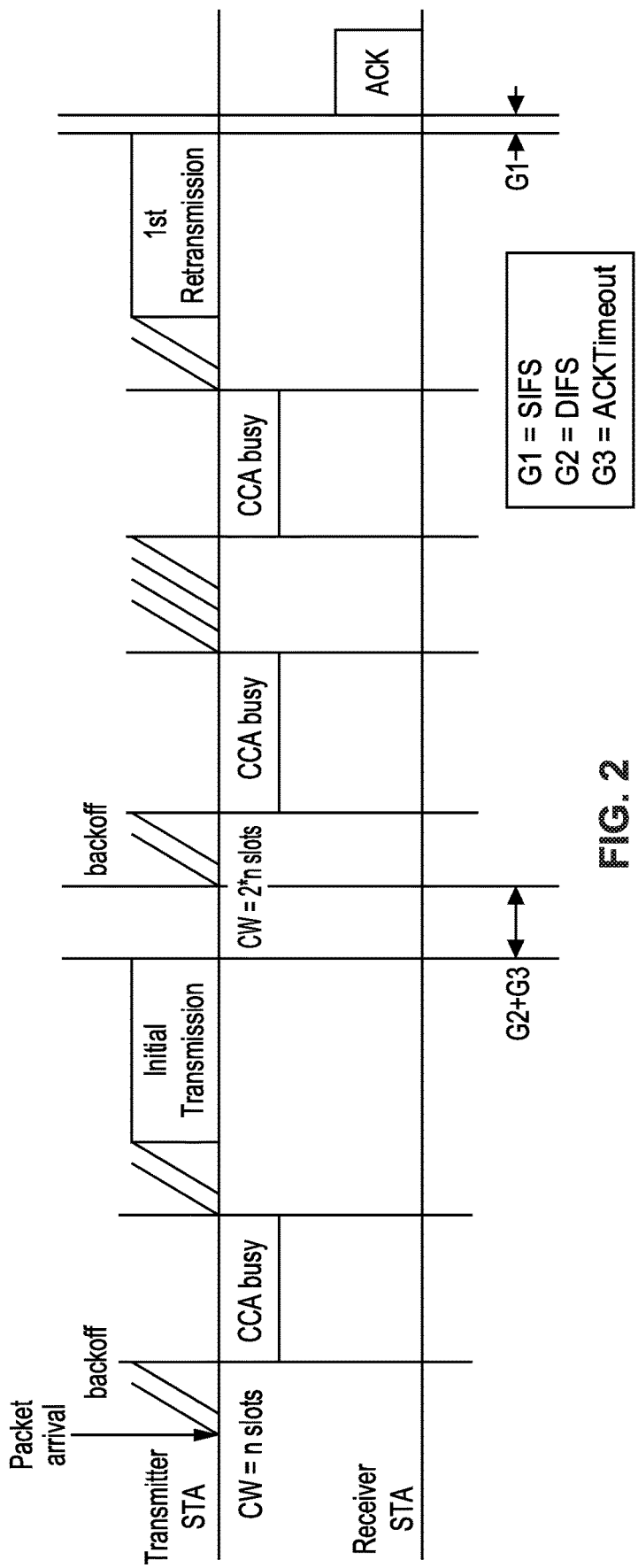
FIG. 2 is a communication sequence diagram of random channel access in CSMA/CA where RTS/CTS is disabled.

FIG. 2 depicts one example of random channel access in CSMA/CA where the RTS/CTS is disabled. It will be noted that the 802.11 standard regarding CSMA/CA utilizes the two lowest levels in the OSI networking stack, which are the Physical (PHY) layer and the Medium Access Control (MAC) layer. When the MAC layer of the transmitter STA receives the data from its upper layers, it contends for the channel to gain access. When the transmitter STA contends for the channel, it has to wait until the backoff time, whereby the size of the contention window is n slots, and counts down to zero. The count-down process will be interrupted, such as by a Clear Channel Assessment (CCA) that indicates busy, when other packet transmissions are occurring over the channel. After the transmitter STA gains channel access to transmit the data, it packetizes the data into a packet and transmits the packet over the channel. As shown in the figure, if the initial transmission of the packet does not succeed, a retransmission of the packet is performed. The transmitter STA sets backoff time again to contend for channel access. This time, the size of the contention window is doubled, which is 2*n slots, due to the retransmission. The expected backoff time is also doubled by the contention window size. When the backoff time is longer, there is more chance that the count-down process will be interrupted (i.e., CCA busy) by other packet transmissions.

1.2. Channel Occupancy by RTS/CTS

In CSMA/CA, a STA is able to occupy the channel by using an RTS/CTS exchange which protects packet transmission from interference from other nodes, especially in a hidden node problem (situation).

Figure 3:
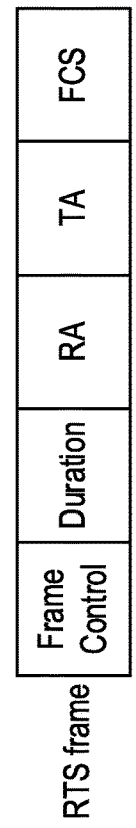
FIG. 3 is a data field diagram for a Request To Send (RTS) frame.

FIG. 3 depicts the content of a RTS frame having the following fields. A Frame Control field indicates the type of the frame. A Duration field contains network allocation vector (NAV) information used for CSMA/CA channel access. A Recipient Address (RA) field contains the address of a recipient of the frame. A Transmitter Address (TA) field contains the address of the station that transmitted the frame.

Figure 4:
FIG. 4 is a data field diagram for a Clear To Send (CTS) frame.

FIG. 4 depicts the content of the CTS frame having the following fields. A Frame Control field indicates the type of the frame. A Duration field contains NAV information used for CSMA/CA channel access. An RA field contains the address of the recipient of the frame.

Figure 5:
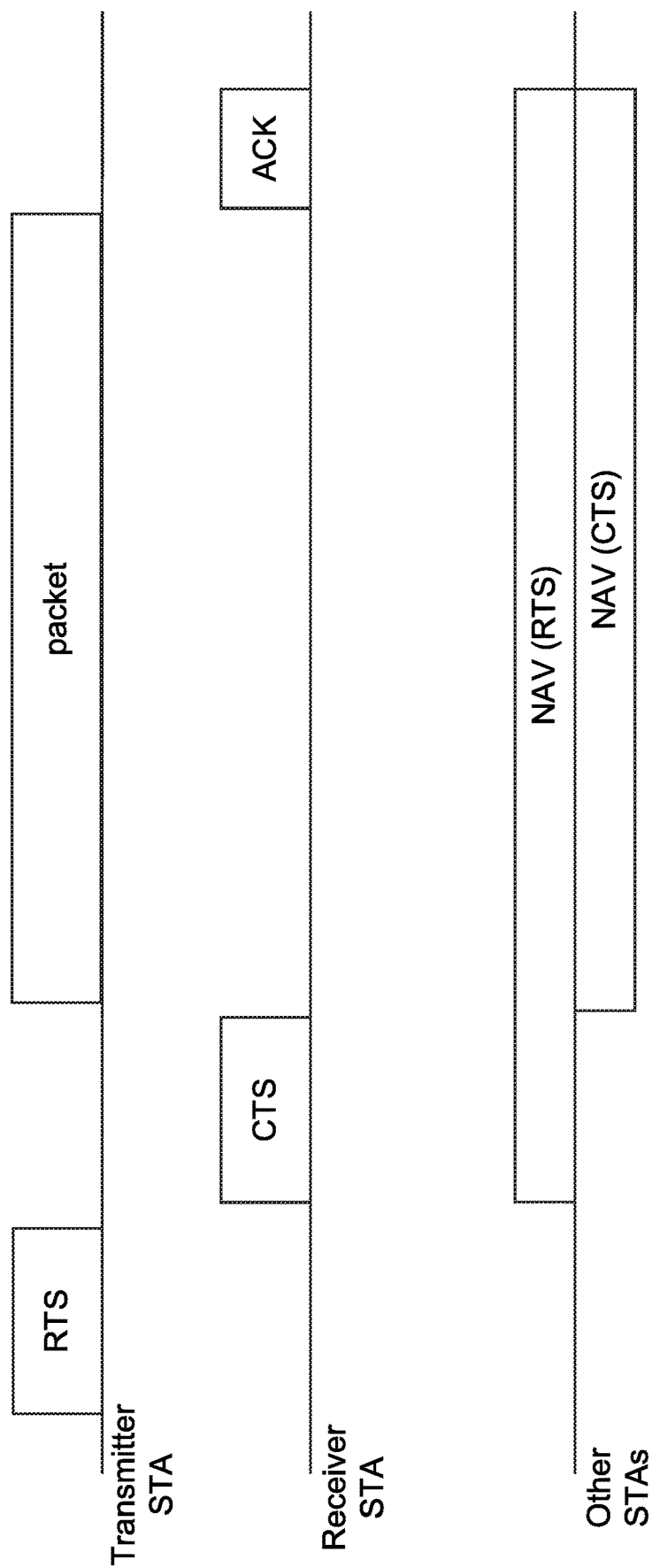
FIG. 5 is a communication sequence diagram of a station occupies the channel by using RTS/CTS exchange in CSMA/CA.

FIG. 5 depicts an example explaining how a station occupies the channel by using RTS/CTS exchange in CSMA/CA. Before the transmitter STA transmits the packet, it first sends an RTS frame to request the channel occupancy time for the packet transmission. When the receiver STA receives the RTS frame, it sends a CTS frame back to the transmitter STA to report that the channel occupancy time is reserved for the packet transmission. The other STAs receiving RTS and CTS frames will set the network allocation vector (NAV) to reserve that time, so that during the period of time set by the NAV, the other STAs will not transmit any packets.

2. Problem Statement

The current wireless communication systems using CSMA/CA do not identify, or distinguish, an RTA packet from a non-RTA packet, nor do they reserve specific channel times for RTA traffic. Under CSMA/CA all the packets must use the same random channel access scheme. The random channel access scheme in CSMA/CA cannot guarantee channel time for RTA packet transmission. CSMA/CA arranges channel access after the data arrives at the MAC layer. In most cases, the data has to wait in the queue to be transmitted, which causes a queuing delay for packet transmission.

The RTA packet in the present disclosure, however, has priority over non-RTA packets. And within RTA packets, the RTA packet with higher priority should always transmit earlier than the RTA packet with lower priority. However, the random channel access scheme in CSMA/CA is directed to fair access between all the packet transmissions. That is, the packet with low priority has a chance to be transmitted earlier than the packet with higher priority. The RTS/CTS exchange in CSMA/CA forces all the other STAs to set the NAV and keep quiet. Though this design protects the packet transmission between two STAs from the interference due to other STAs, it blocks channel access to other STAs that may have more important data to be transmitted.

3. Contributions of Present Disclosure

By utilizing the disclosed technology, STAs are able to identify and distinguish RTA packets from non-RTA packets. The disclosed technology separates the channel access scheme for RTA packets from non-RTA packets, and allows non-RTA packets to still use the regular random channel access scheme defined in CSMA/CA. The disclosed technology allows the STA to obtain information (knowledge) of the arrival time of RTA traffic at its MAC layer and schedule future channel time for an RTA traffic transmission. The disclosed technology allows the STA to occupy the channel before the scheduled channel time for RTA traffic transmission; therefore, the STA should have channel access for the RTA traffic at the beginning of the scheduled channel time. The disclosed technology allows the STA to reject the non-RTA packet and unexpected RTA packet transmission during the scheduled channel time for RTA packet transmission.

4. Example Embodiments

4.1. STA Hardware Configuration

Figure 6:
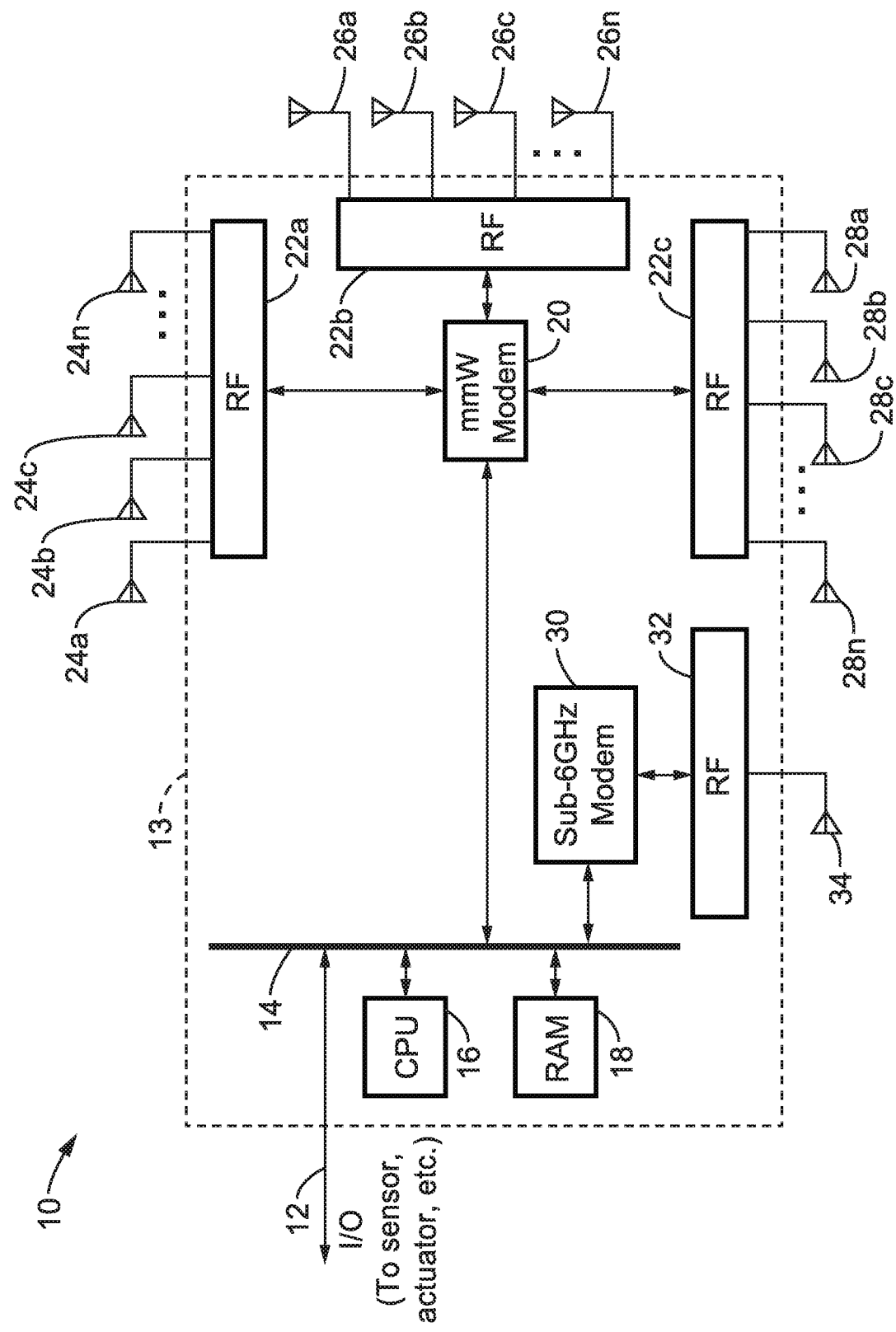
FIG. 6 is a block diagram of station (STA) hardware according to at least one embodiment of the present disclosure.

FIG. 6 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination, access point (AP) and so forth); depending on what role it is playing in the current communication context.

The STA may be configured with a single modem and single radio-frequency (RF) circuitry, or it may be configured with multiple modems and multiple RF circuits as depicted by way of example and not limitation in FIG. 6. In this example, the host machine is shown configured with a millimeter-wave (mmW) modem 20 coupled to radio-frequency (RF) circuitry 22a, 22b, 22c to a plurality of antennas 24a-24n, 26a-26n, 28a-28n to transmit and receive frames with neighboring STAs. In addition, the host machine is also seen with a sub-6 GHz modem 30 coupled to radio-frequency (RF) circuitry 32 to antenna(s) 34, although this second communication path is not absolutely necessary for implementing the present disclosure.

Thus, this host machine is shown configured with two modems (multi-band) and their associated RF circuitry for providing communication on two different bands. By way of example and not limitation the intended directional communication band is implemented with a millimeter-wave (mmW) band modem and its associated RF circuitries for transmitting and receiving data in the mmW band. The other band, generally referred to a discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

It is seen therefore, that the host machine accommodates a modem which transmit/receives data frames with neighboring STAs. The modem is connected to at least one RF module to generate and receive physical signals. The RF module(s) include a frequency converter, array antenna controller, and other circuitry as necessary. The RF module (s) are connected to multiple antennas which are controlled to perform beamforming for transmission and reception. In this way, the STA can transmit signals using multiple sets of beam patterns.

4.2. Example STA Topology for Consideration

Figure 7:
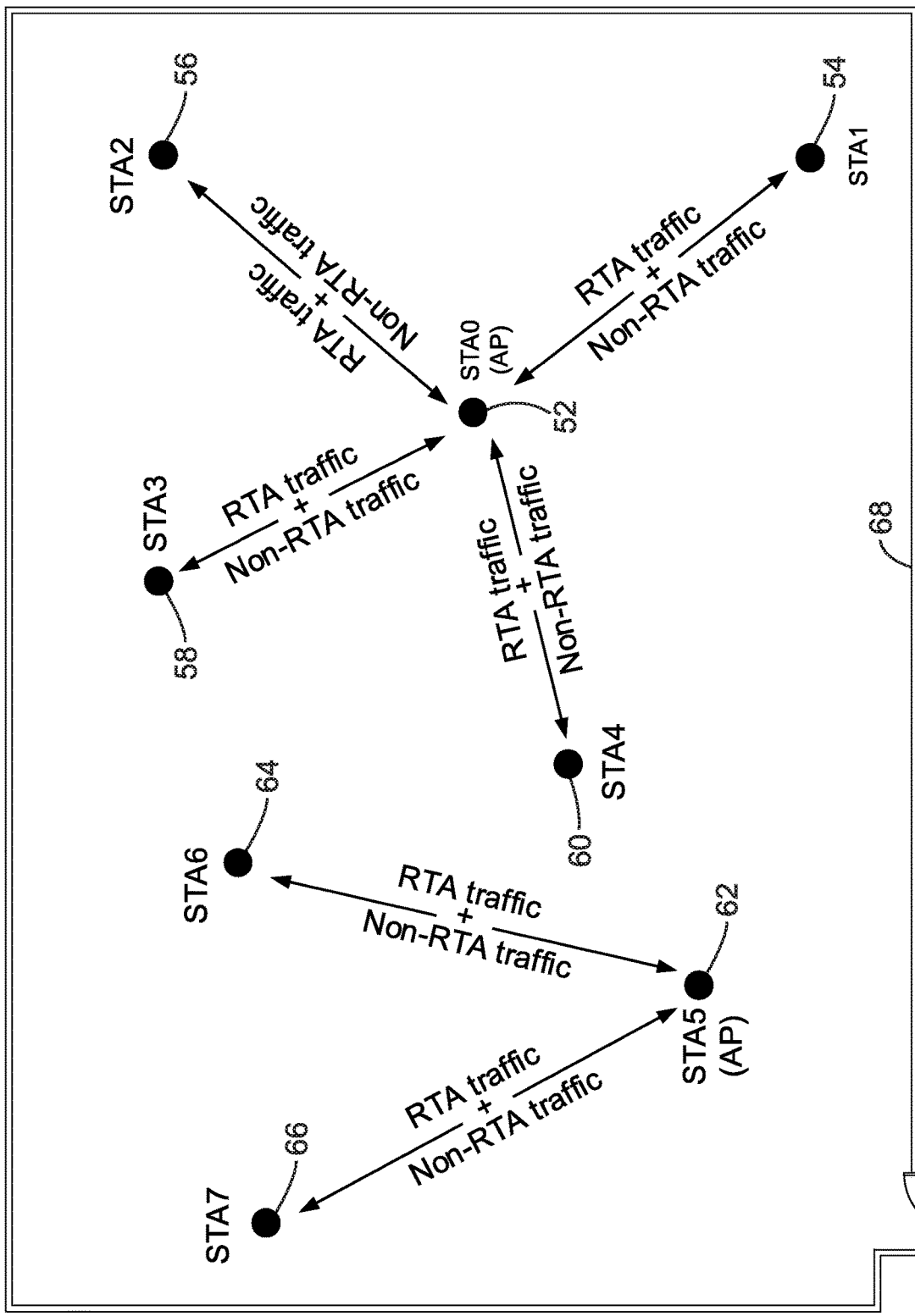
FIG. 7 is a network topology diagram showing a topological example addressed according to at least one embodiment of the present disclosure.

FIG. 7 illustrates an example network topology (scenario) 50 as an aid to explaining the goal of the disclosed technology. By way of example and not limitation, this example assumes there are 8 STAs consisting of two Basic Service Sets (BSSs) in a given area 68, herein exemplified as a room. Each STA can communicate with the other STAs in the same BSS. All STAs use CSMA/CA for random channel access. A first BSS depicts STA0 52 operating as an access point (AP) and non-AP stations STA1 54, STA2 56, STA3 58 and STA4 60. A second BSS depicts STA5 62 as AP along with STA6 64, STA7 66.

All STAs in this example are considered to support both applications requiring low latency communication and applications that utilize best effort communication. The data generated from the application requiring low latency communication is called Real Time Application (RTA) traffic and will be packetized as RTA packets at the transmitter STA. Also, the data generated from the non-time sensitive applications are called non-RTA traffic and are packetized as non-RTA packets at the transmitter STA. As a consequence, the transmitter STA generates both RTA traffic and non-RTA traffic for communication. The location of the STAs and their transmission links are as shown in this example network topology figure.

When the STA transmits a non-RTA packet, the STA can follow the regular CSMA/CA scheme. One goal of the disclosed technology is to reduce latency of RTA traffic.

4.3. STA Layer Model

Figure 8:
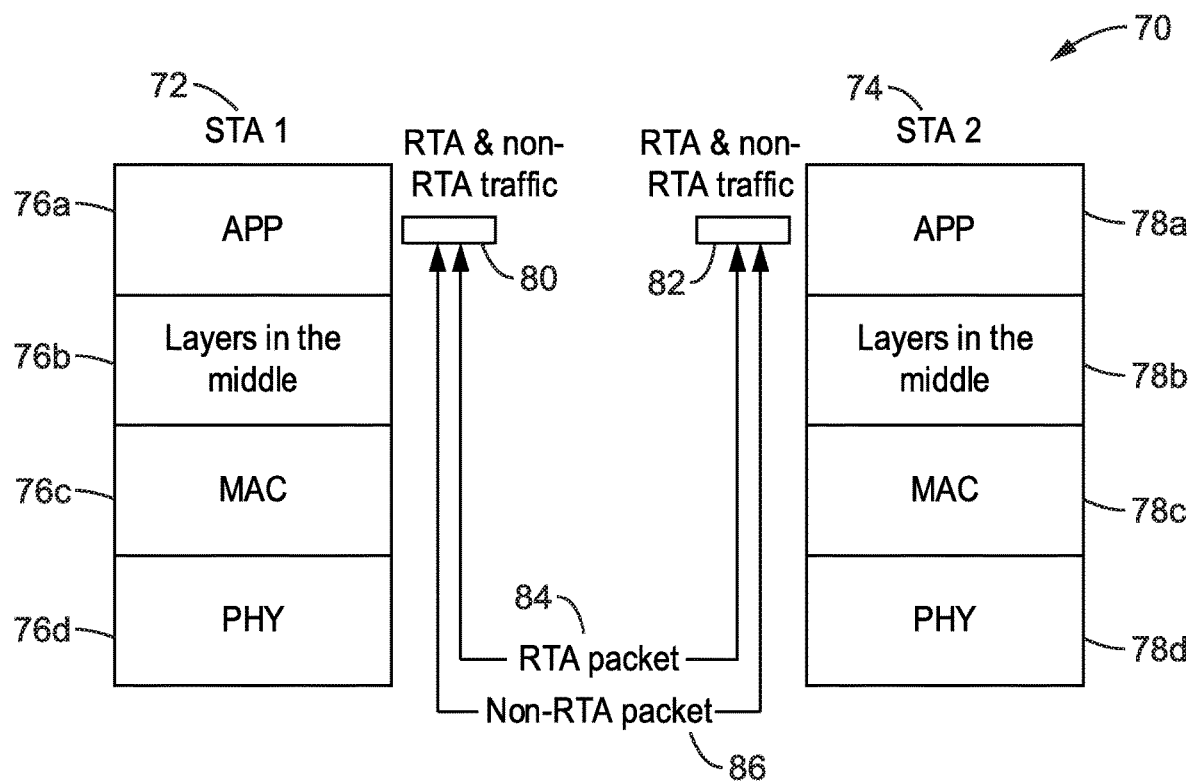
FIG. 8 is a layered communication diagram for RTA and non-RTA traffic communication in an open systems interconnection (OSI) model according to at least one embodiment of the present disclosure.

FIG. 8 illustrates an example embodiment 70 of RTA and non-RTA traffic communication which generally follow an Open Systems Interconnection (OSI) model. In an OSI model there is an Application Layer, Transport Layer, Network Layer (IP), Data Link Layer (MAC), and Physical Layer (PHY). In the present disclosure the transport layer and network layer are merely referred to as layers in the middle, with the described protocol (e.g., proposed IEEE802.11 variant/standard) utilizing the MAC and PHY layers.

In this section, the STA layer model for traffic communication is explained. As shown in this example two STAs, STA1 72 and STA1 74 generate RTA traffic and non-RTA traffic 80, 82 and communicate with each other with RTA packets 84 and non-RTA packets 86. The overall process is explained below.

Both RTA traffic and non-RTA traffic are generated by the APP layer 76a, 78a of the respective transmitter STAs. The APP layer of the transmitter STA passes the RTA traffic and non-RTA traffic to the MAC layer 76c, 78c via (through) layers in the middle 76b, 78b. The MAC layer 76c, 78c and the PHY layer 76d, 78d append additional signal fields in the MAC header and PLCP header to the packet, and the packets are transmitted over the PHY layer of the network.

The receiver STA receives the packets at the PHY layer, decodes and sends them to its MAC layer if the packets are decoded correctly, after which the data is fed to its APP layer through (via) layers in the middle.

4.4. Mechanism for Identifying RTA and Non-RTA Packets

The disclosed technology classifies packets in the wireless communication system as being either RTA or non-RTA packets. RTA packets use reserved future channel time for transmission and use an immediate retransmission scheme for packet retransmissions, while non-RTA packets may use the regular CSMA/CA scheme. To that end, the STA identifies the RTA packet and non-RTA packet at the MAC layer. This process is described in this section.

According to the STA layer model shown in FIG. 8, it is possible that the MAC layer of the transmitter STA identifies the RTA traffic and non-RTA traffic from the upper layers and packetizes them into RTA packets and non-RTA packets, respectively. This section provides the details of how the transmitter STA identifies the RTA traffic using prior negotiation.

According to the STA layer model shown in FIG. 8, the transmitter STA transmits the packets to the receiver STA over the PHY layer of the network. When the receiver STA receives the packet at the MAC layer, it is able to identify the RTA packet and non-RTA packet based on the information embedded in the MAC header or Physical Layer Convergence Protocol (PLCP) header. This section provides the details on how the receiver STA identifies the RTA packet based on the PLCP or MAC header information.

The RTA traffic has to be communicated within a given lifetime to assure the validity of the data. In other words, if the RTA traffic is not received by the receiver before this lifetime expires, the RTA traffic is invalid and can be discarded. The STA packetizes the RTA traffic into RTA packets for transmitting through the PHY layer. Hence, the RTA packet also has a lifetime for its transmission. This section provides the details of how the STA copes with the lifetime expiration of the RTA packet.

4.4.1. Prior Negotiation

Often, real time applications (RTAs) generate traffic periodically, just as with connection-oriented communication. RTA connection-oriented communications established by an application between STAs is called an RTA session. It is possible that STAs can have multiple RTA sessions in the network. Each STA according to the present disclosure is able to manage those RTA sessions properly.

Before an RTA session starts transmitting RTA traffic, a prior negotiation occurs between the transmitter STA and the receiver STA to establish the connection. During the prior negotiation, the transmitter STA and the receiver STA record the RTA session with the RTA session identifying information that can be used for identifying the RTA traffic at the MAC layer of the transmitter side and the RTA packet at the MAC layer of the receiver side.

As was shown in FIG. 8, when the APP layer passes the traffic to the MAC layer on the transmitter side, the layers in the middle add header information to the traffic. When the MAC layer of the transmitter STA receives traffic from the upper layers, it extracts the header information from the upper layers and looks up (searches) the RTA session records created by the prior negotiation. If the header information matches one RTA session in the records, the traffic is RTA; otherwise, the traffic is considered non-RTA. The header information that could be used for identifying RTA traffic is listed in Table 1. In this section, the details of the prior negotiation are described.

According to the prior negotiation results, it is also possible that the receiver STA classifies the RTA and non-RTA packet by the channel resource for packet transmission, such as time, frequency, and other metrics. When a packet is received using the channel resource that is granted for an RTA packet, then the STA identifies it as an RTA packet. Otherwise, that packet is a non-RTA packet. This scenario will be used when the packet is transmitted in multi-user uplink mode.

Figure 9:
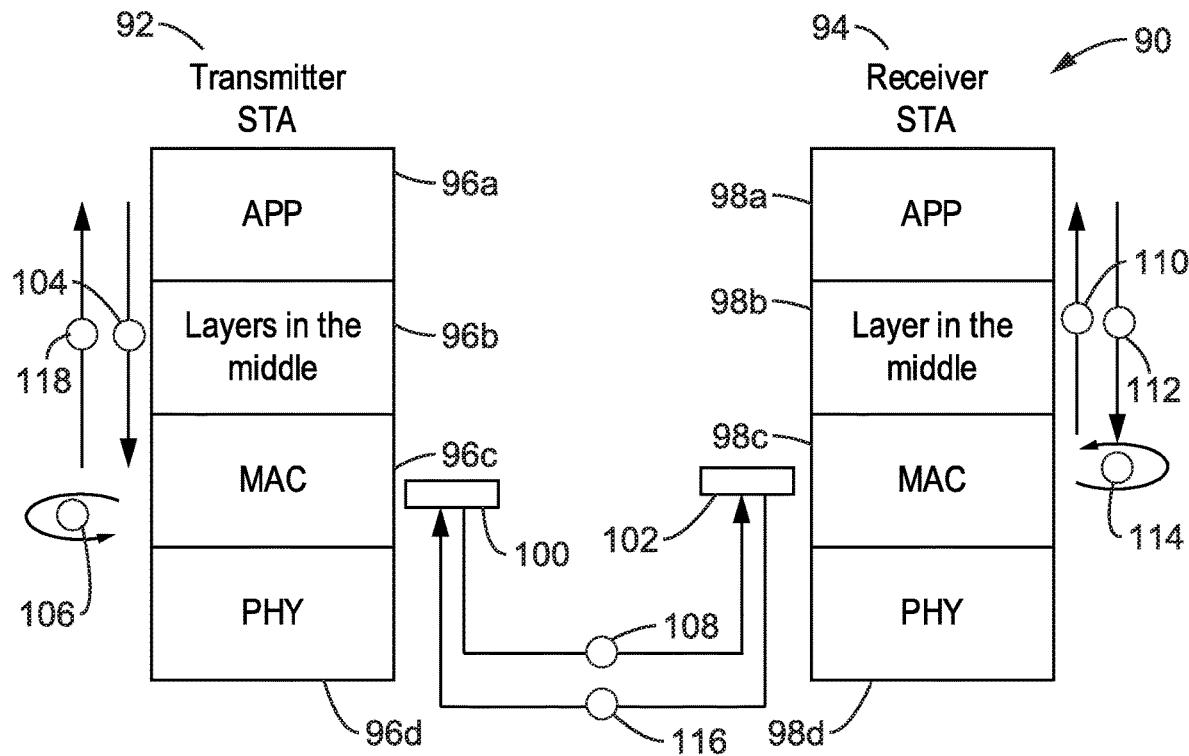
FIG. 9 is a layered communication diagram showing prior negotiation for RTA traffic communications according to at least one embodiment of the present disclosure.

FIG. 9 illustrates an example embodiment 90 of prior negotiation between transmitter 92 and receiver 94 for RTA traffic packet 100 at transmitter side and packet 102 at receiver side. It should be appreciated that one prior negotiation establishes one RTA session and could be used for all the RTA packets generated by that RTA session. The figure shows prior negotiation for establishing an RTA session between two STAs in a STA layer model as was seen in FIG. 8. A transmitter STA 92 is shown having layers APP 96a, layers in the middle 96b, MAC layer 96c and PHY layer 96d with a receiver STA 94 having the same layers APP 98a, layers in the middle 98b, MAC layer 98c and PHY layer 98d. The process of the prior negotiation is explained below.

Referring to FIG. 9, the following steps are seen. The APP layer 96a of transmitter 92 requests 104 a resource (e.g., time, channel) negotiation. Thus, on the transmitter STA side, the APP layer starts an RTA session and requests a negotiation of the channel resources, such as time and bandwidth, for its RTA traffic transmission. This negotiation request is transmitted from the management entity in the APP layer to the management entity residing in the MAC layer.

The MAC layer of the transmitter STA receives the negotiation request from the upper layer and checks 106 resource availability on its side. Also, it records the RTA session identifying information provided by the upper layers for identifying RTA traffic in the session. The record of the identifying information could be picked from the information listed in Table 1, such as TCP/UDP port number, the type of service, etc. It may deny the request from the upper layer if the resource is unavailable, or re-negotiate with the upper layer.

If the MAC layer of the transmitter STA finds the resource available, it sends 108 a negotiation request frame to the MAC layer of the receiver STA. The negotiation frame contains the identifying information of the RTA session so that the receiver can record and use it afterwards. After the MAC layer of the receiver STA receives the negotiation request frame, it first informs 110 its APP layer to get ready for receiving RTA packets by sending a negotiation request from the management entity in the MAC layer to the management entity in the APP layer. The negotiation may fail if the APP layer is not available for RTA transmission.

The APP layer of the receiver grants the availability of resources at its layer and sends 112 this information from the management entity in the APP layer to the management entity that resides in the MAC layer. Then, the MAC layer of the receiver STA checks 114 the resource availability on its side. The MAC layer can deny or re-negotiate if the resource is unavailable. The MAC layer of the receiver STA collects all the negotiation information on its side and reports it 116 to the MAC layer of the transmitter. The MAC layer of the transmitter receives the negotiation result and forwards it 118 to its APP layer. If the negotiation succeeds, the APP layer can start to transmit RTA traffic using the resource granted by both STAs.

According to the RTA session records created by the prior negotiation, the MAC layer of the transmitter STA identifies the RTA traffic and non-RTA traffic by the header information from the upper layers. When the APP layer generates RTA traffic, the RTA traffic is passed to its MAC layer with the header information provided by the layers in the middle. By looking up the RTA session records created by the prior negotiation, the transmitter STA is able to use that header information to identify the RTA traffic and packetizes the RTA traffic into RTA packet at the MAC layer.

Figure 10:
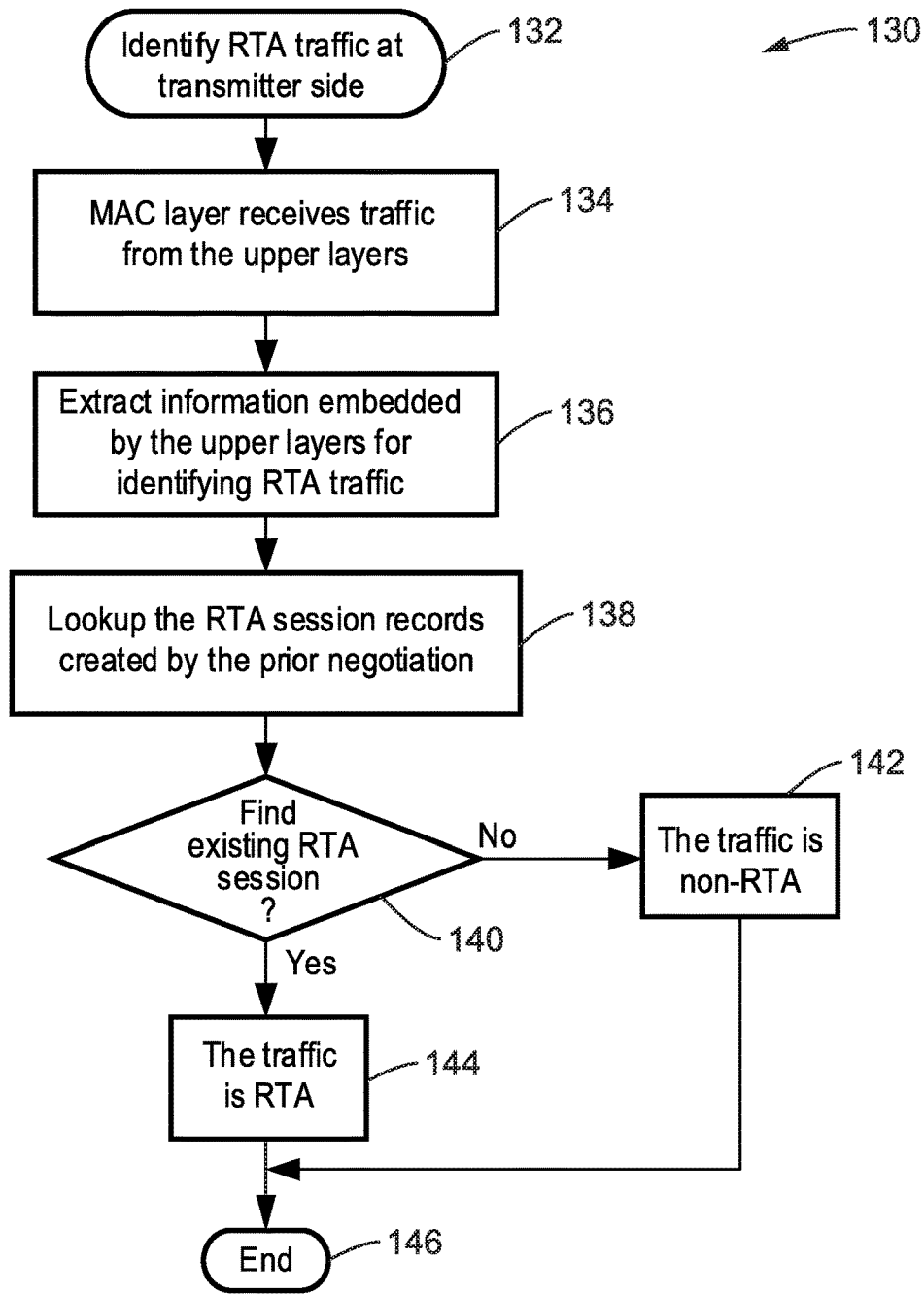
FIG. 10 is a flow diagram of identifying RTA packet traffic on the transmitter side according to at least one embodiment of the present disclosure.

FIG. 10 illustrates an example embodiment 130 of identifying RTA packet traffic on the transmitter side. The routine starts 132 and the MAC layer of the transmitter STA receives traffic 134 from the upper layer. The MAC layer extracts 136 information embedded by the upper layer for identifying RTA traffic, and is checking the header information of the upper layers, such as the type of service and the TCP/UDP port number.

The MAC layer of the transmitter STA compares (looks up) 138 the header information from the upper layers with the RTA session records created by the prior negotiation. A check 140 is made on the header information. If the header information from the upper layers matches one RTA session in the record, then block 144 is reached with the traffic determined to be RTA traffic, otherwise block 142 is reached with the traffic considered to be non-RTA traffic, after which processing ends 146.

4.4.2. Packet Header Information

Figure 11:
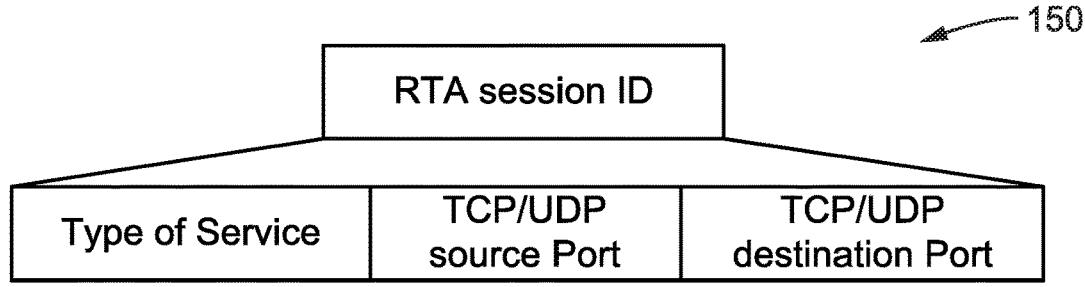
FIG. 11 is a data field diagram of RTA session identifying information according to at least one embodiment of the present disclosure.

FIG. 11 illustrates an example embodiment 150 of an RTA session identifying information format. When the transmitter STA generates RTA packets, it adds additional signal fields in the PLCP or MAC header. When the additional signal field contains the RTA session identifying information, the receiver STA can use the RTA session identifying information in the PLCP or the MAC header to distinguish at the MAC layer between an RTA packet and a non-RTA packet. One example of the RTA session identifying information is shown in the figure.

Figure 12:
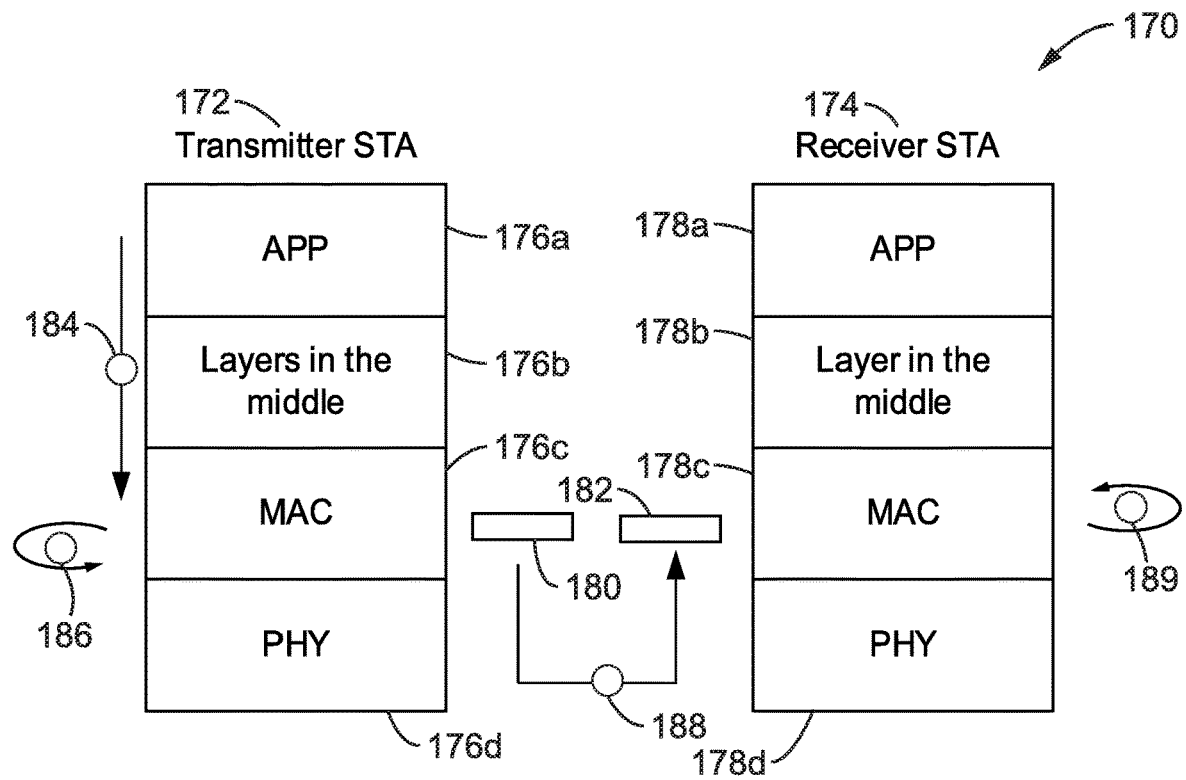
FIG. 12 is a layered communication diagram of header information exchange according to at least one embodiment of the present disclosure.

FIG. 12 illustrates an example embodiment 170 of header information exchange 180, 182 between APP layer and MAC layer. A transmitter STA 172 is seen with APP layer 176a, layers in the middle 176b, MAC layer 176c, and PHY layer 176d. A receiver STA 174 is seen with the same layers APP layer 178a, layers in the middle 178b, MAC layer 178c, and PHY layer 178d.

The figure depicts details of how this process works between two STAs in the STA layer model. The APP layer of the transmitter STA generates 184 RTA traffic and passes it to the MAC layer. When the traffic is passed through the layers in the middle, the header information, such as the type of service field and the TCP/UDP port numbers is added to the traffic. When the MAC layer of the transmitter STA receives the RTA traffic from the upper layer, it extracts the header information, such as the type of service and the TCP/UDP port numbers from the traffic. By looking up the RTA session records created by the prior art, the MAC layer identifies 186 the traffic is RTA.

Then the MAC layer of the transmitter STA packetizes the traffic into an RTA packet 180 and embeds the type of service and the TCP/UDP port numbers in the MAC header or the PLCP header as the RTA session identifying information. One example of the RTA session identifying information was shown in FIG. 11. Next, the transmitter STA sends 188 the RTA packet to the receiver STA which receives it as packet 182. When the receiver STA receives the RTA packet at its MAC layer, it can identify 189 the RTA packet based on the RTA session identifying information in the PLCP or the MAC header.

Figure 13:
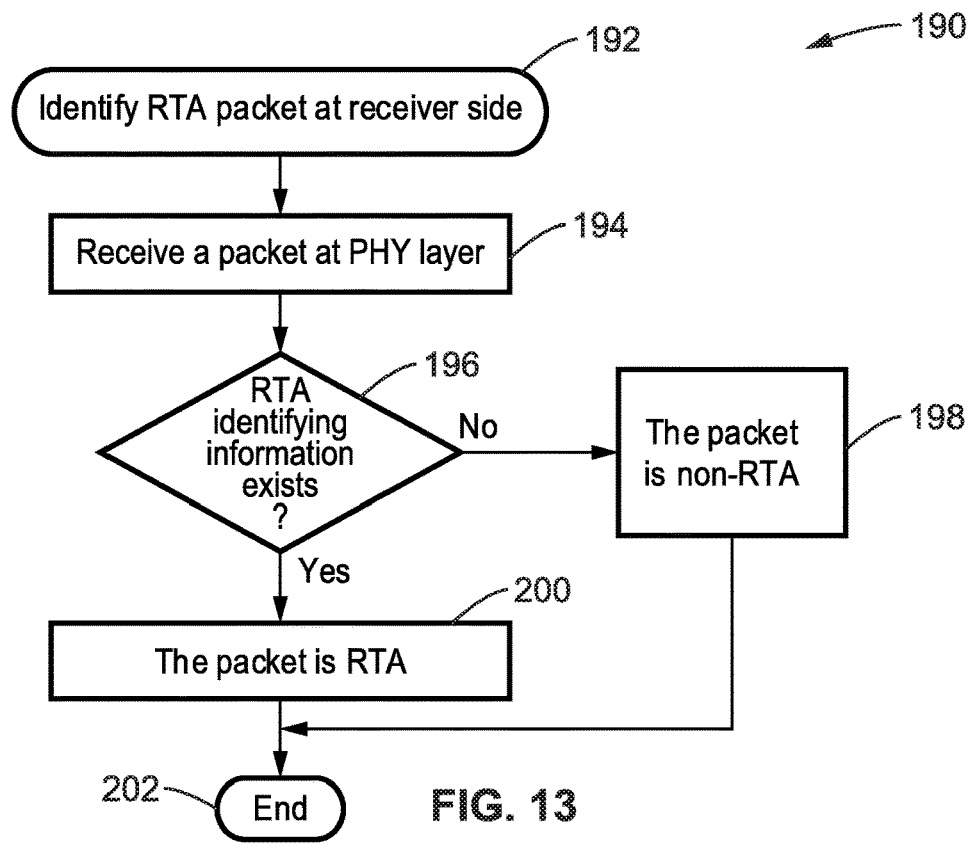
FIG. 13 is a flow diagram of identifying an RTA packet on the receiver side at the MAC layer according to at least one embodiment of the present disclosure.

FIG. 13 illustrates an example embodiment 190 of a process for identifying an RTA packet on the receiver side at the MAC layer. The process starts 192 and the receiver receives a packet at the PHY layer 194. As explained in FIG. 12, the MAC header or the PLCP header of RTA packets includes the identifying information of a RTA session. Referring again to FIG. 13 a check is made 196 to determine if the identifying information exists. If the identifying information exists, then execution moves to block 200 as the receiver STA has determined that the packet is an RTA packet. Otherwise, if the information does not exist, then execution moves from block 196 to 198, as it has been determined that the packet is a non-RTA packet. After which the process ends 202.

4.4.3. RTA Packet Lifetime Expiration

In the conventional WLAN, the retransmissions of a packet are discontinued when the number of retransmissions of that packet exceeds the retry limit, and the packet is dropped. In contrast, the RTA packet has a limited lifetime for being transmitted. When the lifetime of the RTA packet expires, the retransmission of that RTA packet stops and the packet is dropped.

The RTA traffic has a lifetime which represents the time during which the information of the packet (traffic) is considered valid. The lifetime of the RTA packet is used to ensure the RTA traffic carried by the packet is valid when the packet is received by the receiver STA. Therefore, the lifetime of the RTA packet should not be longer than the lifetime of the RTA traffic. In the simplest case, those two lifetimes can be set to the same value.

Figures 14, 15:
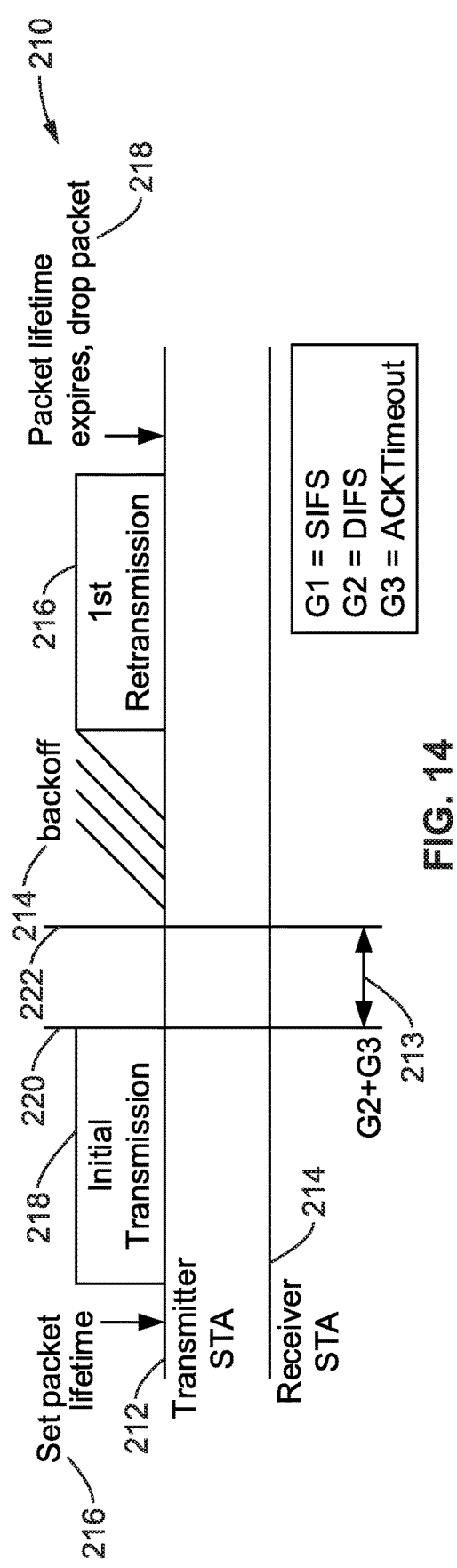
FIG. 14 is a communication sequence diagram of an RTA packet being dropped due to an expired packet lifetime according to at least one embodiment of the present disclosure.
FIG. 15 is a data field diagram of RTA session information according to at least one embodiment of the present disclosure.

FIG. 14 illustrates an example embodiment 210 of an RTA packet being dropped due to an expired packet lifetime, in particular in the case of when the retransmission of an RTA packet is not scheduled due to the expiration of the packet lifetime. The figure depicts a transmitter STA 212 and receiver STA 214. When the transmitter STA transmits an RTA packet, it sets a lifetime 216 to transmit that packet. An initial transmission is seen 218. In the figure the value G1 represents Short Interframe Spaces (SIFS), G2 represents Distributed Coordination Function (DCF) Interframe Spaces (DIFS) and G3 represents an ACKnowledgement (ACK) Timeout. Before performing any retransmitting of the RTA packet, the transmitter STA checks whether the lifetime of the packet expires. The retransmission is not scheduled and that packet is dropped if the lifetime has expired. In this example, the transmitter after the period 213 (G2+G3) which is between events 220 and 222, and performs a backoff 214, after then having obtained the channel, the STA transmits a first retransmission 216 since the packet lifetime has not expired. After that, it checks the packet lifetime and it is found in this example that it has expired 218, so it stops retransmitting and drops the packet.

On the receiver side, the RTA packet could be stored in the buffer before the packet lifetime expires. When the packet lifetime expires, the receiver should delete that packet from the buffer since the RTA traffic in the packet is no longer valid.

4.5. Creating an RTA Session

This section details how a STA creates an RTA session and how the STA manages multiple RTA sessions at its MAC layer. As mentioned in Section 4.4.1, the transmitter and the receiver STAs are able to identify the RTA traffic or packet by looking up the RTA session record created by prior negotiation. The disclosed technologies allow the STAs to create an RTA session table when a STA has RTA sessions to be established. A STA collects information about each RTA session and records the information in the RTA session table. RTA sessions can be inserted, removed, and modified in the table.

4.5.1. RTA Session Information

When a STA records an RTA session, it collects the information of that RTA session which could be used to track the session. In order to track the RTA session, the following requirements must be met for the RTA session. (a) Recording Identifying information to identify the RTA session and distinguish it from other RTA sessions. (b) Collecting status information to report the recent status of the RTA session. (c) Obtaining requirement information to indicate the transmission quality requirement of the RTA traffic generated by the RTA session. (d) Utilizing transmission information to show the channel resource that is distributed to the RTA traffic generated by the RTA session.

FIG. 15 illustrates an example embodiment 230 of RTA session information. The identifying information that is from the MAC header, such as Source MAC Address and Destination MAC Address, which are from the layers above the MAC layer are listed in Table 1, such as Session ID, Type of Service, Source IP Address, Source Port, Destination IP Address, Destination Port.

The following describes aspects of the status information such as Session Status, Comment, and Last Active Time. The session status shows whether the RTA session is set to generate traffic or not. Table 2 lists the possible states of RTA session status. When the RTA session status is active, the RTA session is enabled and generating RTA traffic. When the RTA session status is inactive, the RTA session is disabled to not generate RTA traffic by the user. When the RTA session status is error, the RTA session is not able to generate or transmit RTA traffic because of the error.

The Comment field can be used to show the details of the RTA session status. It can be used to carry warnings or error messages. For example, the comment could indicate that the transmission quality is poor when multiple RTA packets have been corrupted in the session.

The Last Active Time can be used to trigger an event, such as to check the status of the RTA session. Last Active Time is updated every time when RTA packet transmission occurs for the RTA session. This information can be used to track whether the RTA traffic is generated or delivered regularly. If the last active time is not updated for a certain period of time, then the RTA session is not generating or delivering RTA traffic. In at least one embodiment the RTA session status is regularly checked to determine whether errors are occurring.

Requirement information including Bandwidth Requirement, Delay Requirement, Jitter Requirement, Periodic Time, Priority, Session Start Time, and Session End Time are now described. The Bandwidth Requirement indicates the amount of the RTA traffic to transmit. The Delay Requirement indicates the transmission delay of the RTA packets. The Jitter Requirement indicates the maximum difference in the RTA packet delay during each periodic transmission time. The Periodic Time indicates the period of time between RTA transmissions in the RTA session. That is to say that the RTA session generates traffic every "periodic time". The Priority indicates the priority of the RTA traffic. The system is configured to first transmit RTA traffic with higher priority. The Session Start Time and Session End Time indicates the start time and the end time of the RTA session.

Transmission information including Time Allocation, Resource Unit (RU) Allocation, and Space Stream (SS) Allocation are now described. The Time Allocation indicates the channel time that is distributed to the RTA session for transmission. The RU Allocation indicates the resource unit (RU) of the channel that is distributed to the RTA session for transmission. The RU is a unit in OFDMA terminology used in IEEE 802.11ax, and it indicates which channel frequency to use for transmission. The SS Allocation indicates the spatial stream allocation for the RTA session traffic transmission. The SS allocation can be a unit as per MIMO terminology used in IEEE 802.11, or an index of directional antenna pattern in beamforming terminology.

4.5.2. RTA Session Table

Table 3 shows an example of RTA session table created by STA 0 when considering the network topology in FIG. 7. The RTA session in the table could contain all the information listed in FIG. 15. In order to make the RTA session table easier to describe herein, the table is depicted by way of example and not limitation as only containing the part of the RTA session information listed in FIG. 15. The RTA session table at STA 0 contains five RTA sessions. Each row in the table represents an RTA session.

The columns are Session Number (#), the Transmit and Receive stations (Tx and Rx), Session Start Time, Session End Time, Time Allocation (Time Alloc. mS), RU Allocation (RU Alloc.), SS Allocation (SS Alloc.), Period Time (Per. Time mS), Priority (Pri.) and Session Status (Sess Stat.).

The first row represents RTA Session Number (0), which transmits RTA traffic from STA 0 to STA 2. RTA session 0 starts at 0 ms (Session Start Time) and ends at 900 ms (Session End Time). Every time the RTA session generates traffic, it has 1 ms channel time (Time Allocation) to transmit. The RU and SS allocations are all random. The periodic Time of RTA session 0 is 0 ms, which means RTA session 0 generates RTA traffic by demand. Since the priority of RTA session 0 is 6, which is higher than other sessions, its traffic has higher priority to transmit than the traffic of other sessions. When the session status is active, RTA session 0 is able to generate traffic.

The second row represents RTA session 1, which transmits RTA traffic from STA 1 to STA 0. RTA session 1 starts at 1 ms and ends at 900 ms. Every time the RTA session generates traffic, it has 1 ms channel time to transmit. The RU and SS allocations are all random. The periodic time of RTA session 1 is 10 ms, which means RTA session 1 generates RTA traffic every 10 ms. The priority of RTA session 1 is 5, which is lower than RTA session 0. When RTA session 0 and 1 generates traffic simultaneously, RTA session 0 has a right to transmit its traffic first. When the session status is active, RTA session 1 is able to generate traffic. The remainder of the rows in the table represent other RTA sessions.

4.5.3. RTA Session Management

This section provides the details of how a STA manages the RTA sessions. In order to manage the RTA sessions, the STA is able to initiate an RTA session, update the RTA session, and finish the RTA session. Before the STA transmits RTA traffic, it creates an RTA session with RTA session information. The RTA session information is recorded in the RTA session table. The STA is able to manage the RTA sessions using this RTA session table. In order to simplify the description all the examples use the network topology as shown in FIG. 7, although of course the present disclosure is configured to operate under any realistic topology.

4.5.3.1. RTA Session Initiation Procedure

As described in Section 4.4.1, an RTA session uses the prior negotiation to establish the RTA traffic communication between STAs. During this procedure, a management frame exchange is performed to share the RTA session information between the STAs.

Figure 16:
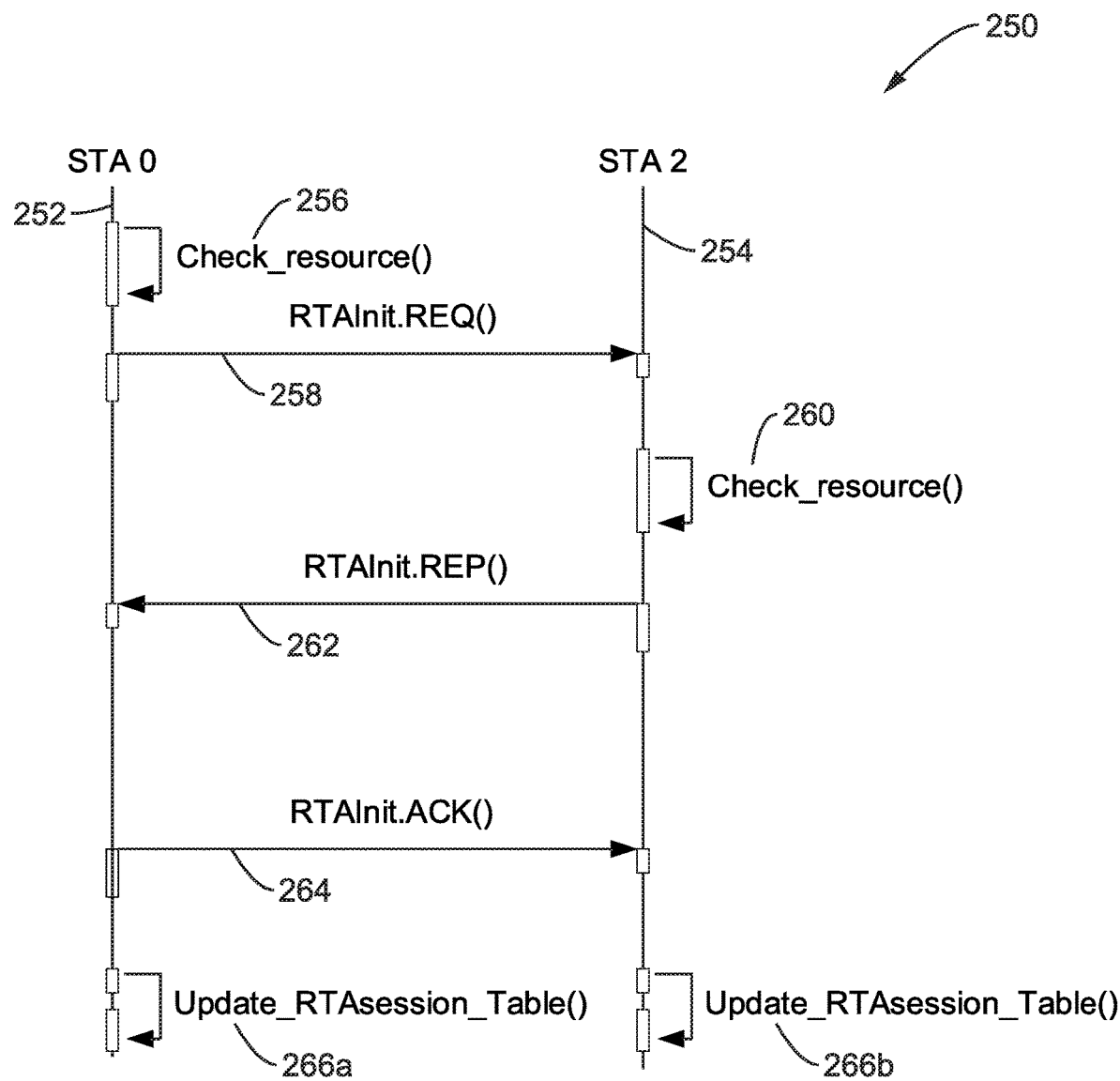
FIG. 16 is a communication interchange diagram of stations exchanging management frames at the MAC layer to initiate an RTA session according to at least one embodiment of the present disclosure.

FIG. 16 illustrates an example embodiment 250 depicting how STAs, herein exemplified as STA0 252 and STA2 254, exchange management frames at the MAC layer to initiate an RTA session. The management frames that are used to initiate an RTA session are shown in FIG. 17, FIG. 18 and FIG. 19.

In FIG. 16 the procedure is depicted in which STA0 checks resource availability on its side 256 and initializes 258 an RTA session from the perspective of the MAC layer. As shown in the figure, STA 0 initiates an RTA session with STA 2 and sends an RTA session initiation request frame (RTAInit.REQ) 258 containing the RTA session identifying information and requirement information to STA 2. STA 2 receives the RTA session initiation request frame and checks 260 resource availability according to the requirement information in the received frame. If the resource is available, STA 2 sends 262 an RTA session initiation reply frame (RTAInit.REP) containing the RTA session transmission information back to STA 0. If the resource is unavailable, the RTA session initiation reply frame would indicate the failure of the initiation procedure. STA 0 receives the RTA session initiation reply frame and sends 264 an RTA session initiation ACK frame (RTAInit.ACK) containing the RTA session status information to STA2. The RTA session finishes exchanging information between two STAs. Both STAs collect 266a, 266b the complete RTA session information and add this RTA session information in its RTA session table.

Figure 17:
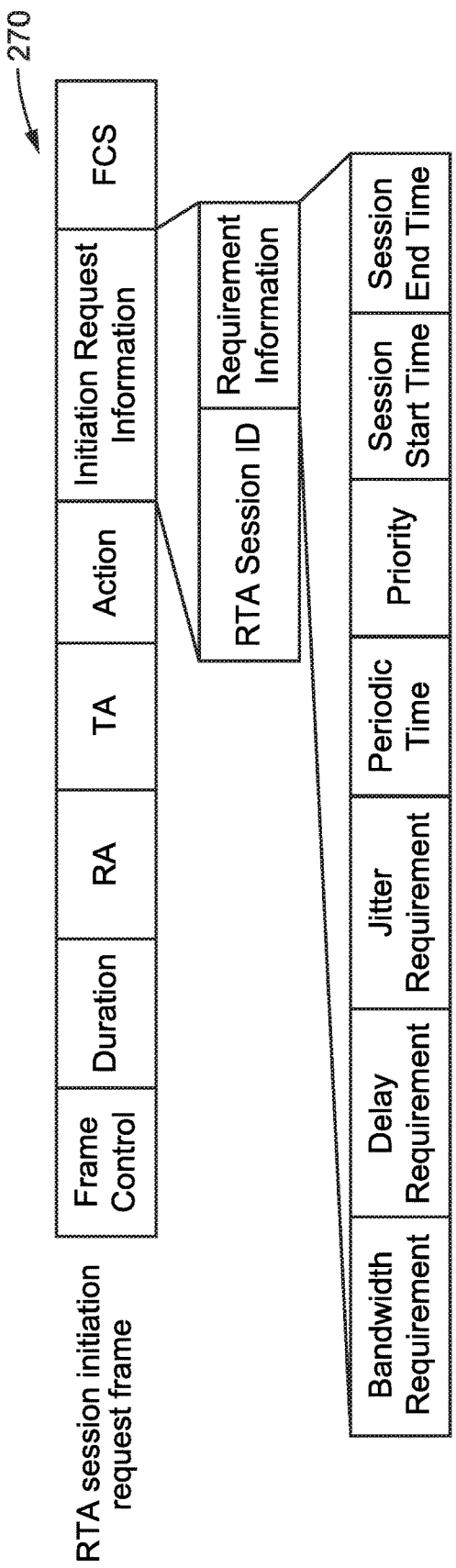
FIG. 17 is a data field diagram of an RTA session initiation request according to at least one embodiment of the present disclosure.

FIG. 17 illustrates an example embodiment 270 of the content of an RTA session initiation request frame. A Frame Control field indicates the type of frame. A Duration field contains NAV information used for CSMA/CA channel access. An RA field contains an address of the recipient of the frame. A TA field contains an address of the STA that transmits the frame. An Action field indicates the type of management frame, and specifically indicates that the management frame is an RTA session initiation request frame. An Initiation Request Information field follows the Action field when the Action field indicates that the frame is RTA session initiation request frame, and contains the fields as follows. (a) An RTA Session ID which provides identifying information of the RTA session. The content of this field is shown in FIG. 11. (b) A Resource Requirement field indicates the information requirement of the RTA session as described in Section 4.5.1. The subfields within of the Resource Requirement are as follows. A Bandwidth Requirement field indicates the amount of RTA traffic to be transmitted. A Delay Requirement field indicates the amount of transmission delay of the RTA packets. A Jitter Requirement field indicates the maximum difference in the RTA packet delay during each periodical transmission time. A Periodic time subfield indicates the duration of time that RTA session generates RTA traffic once (periodicity). A Priority field indicates the priority of the RTA traffic. A Session Start Time field and Session End Time field indicates a start time and end time of the RTA session, respectively.

Figure 18:
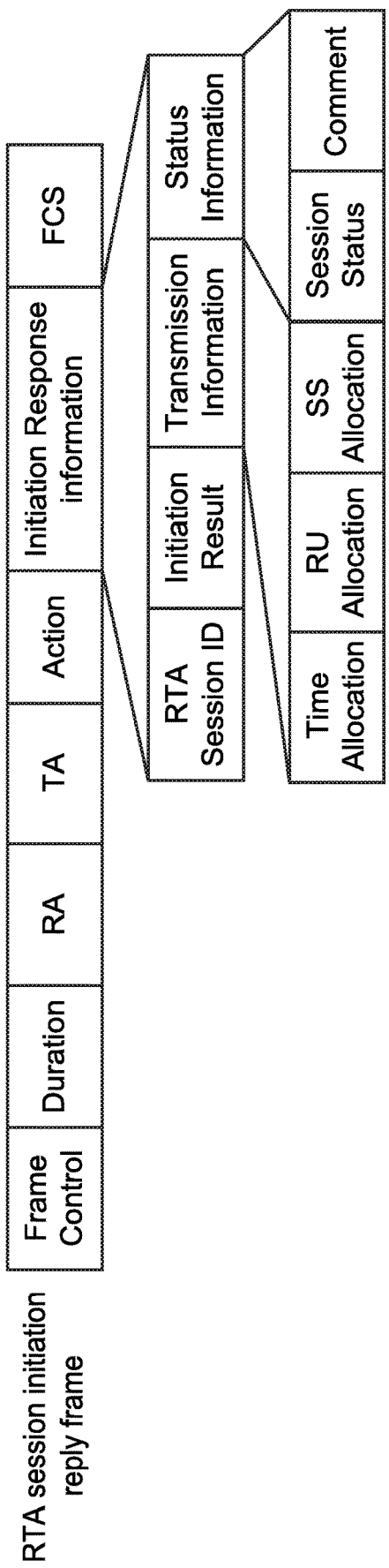
FIG. 18 is a data field diagram of RTA session initiation reply frame according to at least one embodiment of the present disclosure.
Figure 19:
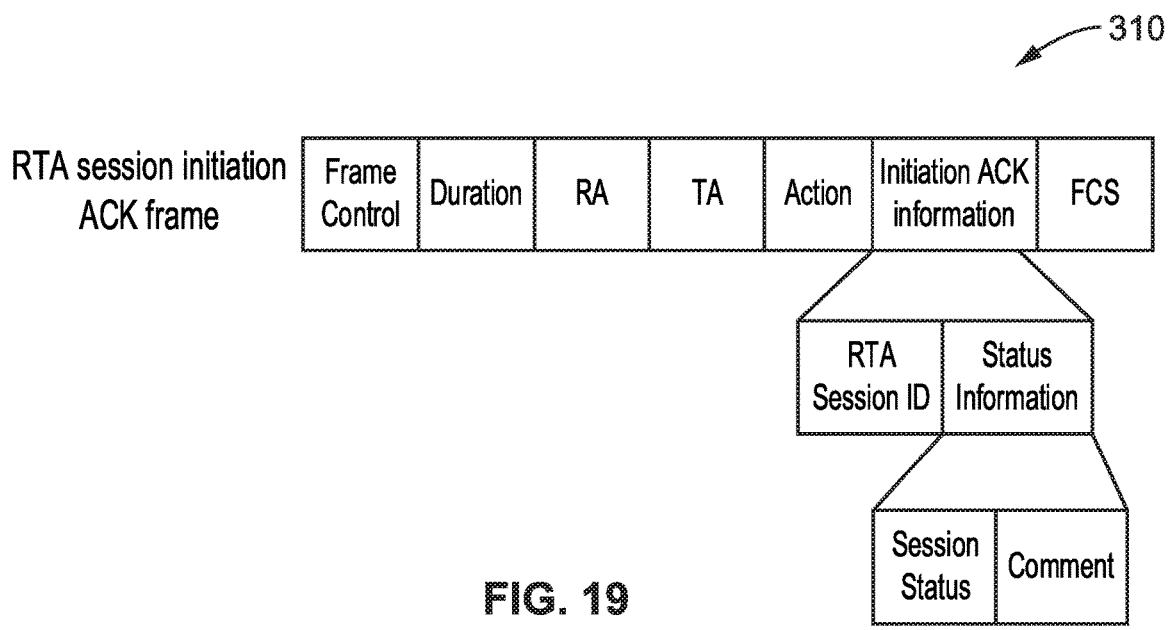
FIG. 19 is a data field diagram of an RTA session initiation ACK frame according to at least one embodiment of the present disclosure.

FIG. 18 illustrates an example embodiment 290 of RTA session initiation reply frame contents with the following fields. A Frame Control field indicates the type of the frame. A Duration field contains NAV information used for CSMA/CA channel access. An RA field contains an address for the recipient of the frame. A TA field contains the address of the STA that transmitted the frame. An Action field indicates the type of management frame, and in this case indicates that the management frame is an RTA session initiation reply frame. An Initiation Response Information field follows the Action field when the Action field indicates that the frame is an RTA session initiation reply frame, and contains the following fields. (a) An RTA Session ID provides for identifying the information of the RTA session. The content of this field is shown in FIG. 11. (b) An Initiation Result field is a one bit indication to show whether the initiation is granted or not. When this field is set to a first state (e.g., "1"), then the initiation is granted by the other STA; otherwise if this field is set to a second state (e.g., "0") then the request was not granted. A Transmission Information field provides transmission information of RTA sessions as described in Section 4.5.1. A Time Allocation field shows the channel time that is distributed to the RTA session for transmission. An RU Allocation field shows the resource unit (RU) of the channel that is distributed to the RTA session for transmission. An SS Allocation field indicates the spatial stream allocation for the RTA session traffic transmission. A Status Information field provides status information of the RTA session as described in Section 4.5.1. A Session Status field indicates the status of an RTA session. A Comment field indicates more details of the RTA session status. This information can be used to report the initiation result and its details.

FIG. 19 illustrates an example embodiment 310 of an RTA session initiation ACK frame. A Frame Control field indicates the type of frame. A Duration field contains NAV information used for CSMA/CA channel access. An RA field contains an address of the recipient of the frame. A TA field contains the address of the STA that transmits the frame. An Action field indicates the type of management frame, and in this case indicates that the management frame is an RTA session initiation ACK frame. An Initiation ACK Information field follows the Action field when the Action field indicates that the frame is RTA session initiation ACK frame. It contains the fields as follows. (a) An RTA Session ID for identifying information of the RTA session. The content of this field is shown in FIG. 11. (b) A Status Information field provides the status information of the RTA session as described in Section 4.5.1., and includes the following fields. A Session Status field indicates the status of the RTA session. A Comment field indicates more details of the RTA session status.

Table 4 shows an example of the RTA session table at STA 0 after it initiates a new RTA session with STA 2. The RTA session table before the initiation procedure is shown in Table 3. Here, a new RTA session 5 is inserted into the RTA session table. The session ID is linked to the RTA session identifying information. In the new RTA session, the time, RU and SS resources are allocated and fixed by the procedure. When RTA session 5 generates RTA traffic every 10 ms to transmit, it has 4 ms time (time domain) to transmit RTA packets using RU 1 (frequency domain) and SS 1 (spatial domain) of the channel resources.

4.5.3.2. RTA Session Update Procedure

After the RTA session is initiated by the STAs, in certain cases the RTA session information will need to be updated between the STAs when the RTA session information at one STA side changes.

Figure 20:
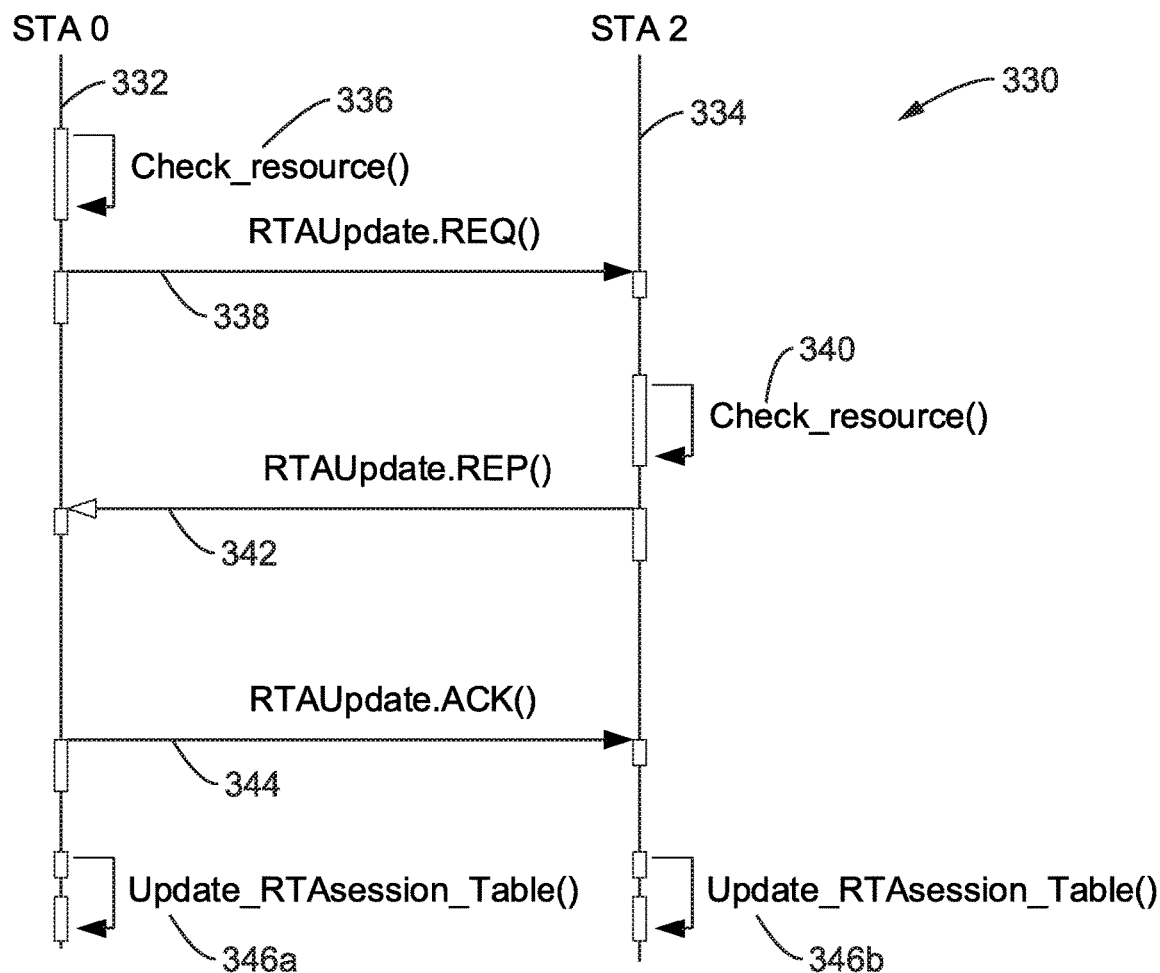
FIG. 20 is a communication interchange diagram of stations exchanging management frames at the MAC layer to update an RTA session according to at least one embodiment of the present disclosure.

FIG. 20 illustrates an example embodiment 330 of how STAs exchange the management frames at the MAC layer to update an RTA session. The management frames that are used to update an RTA session are shown in FIG. 21, FIG. 22, and FIG. 23.

In FIG. 20 the procedure of updating an RTA session from the perspective of the MAC layer at STA0 332 and STA2 334. STA 0 first checks 336 resource availability on its side. Then, it sends an RTA session update request frame (RTAUpdate.REQ) 338 containing the update information names and the update information values to STA 2. When STA 2 receives the RTA session update request frame, it checks 340 the resource availability on its side. Then STA 2 sends an RTA session update reply frame (RTAUpdate.REP) 342 to STA 0. The information updated by STA 2 will be carried by the RTA session update reply frame. STA 0 receives the RTA session update reply frame and sends an RTA session update ACK frame (RTAUpdate.ACK) 344 to STA2. The RTA session finishes exchanging information between two STAs. Both STAs acknowledge the change of the RTA session information and update 346a, 346b the RTA session in its RTA session table.

Figure 21:
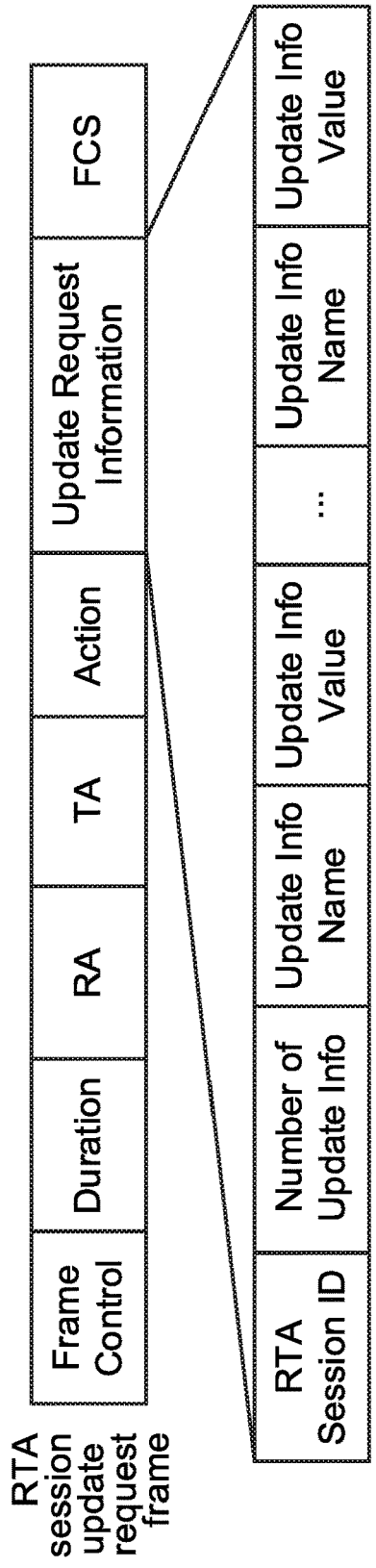
FIG. 21 is a data field diagram of an RTA session update request frame according to at least one embodiment of the present disclosure.

FIG. 21 illustrates an example embodiment 350 of an RTA session update request frame. A Frame Control field indicates frame type. A Duration field contains NAV information used for CSMA/CA channel access. An RA field contains an address for the recipient of the frame. A TA field contains the address of the STA that transmitted the frame. An Action field indicates the type of management frame, and in this case indicates that the management frame is an RTA session update request frame. An Update Request Information field follows the Action field when the Action field indicates that the frame is an RTA session update request frame, and contains the following fields. (a) An RTA Session ID provides identifying information of the RTA session. The content of this field is shown in FIG. 11. A Number of Update Information field indicates the number (amount) of update information carried by this frame. An Update Info Name field indicates the name of the update information. An Update Info Value gives the value of the update information.

Figure 22:
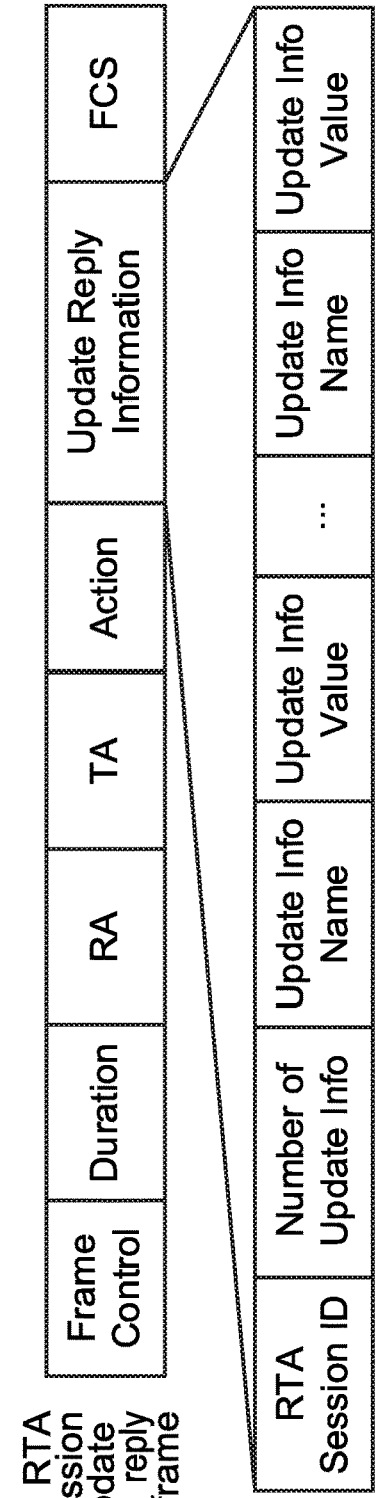
FIG. 22 is a data field diagram of an RTA session update reply frame according to at least one embodiment of the present disclosure.
Figure 23:
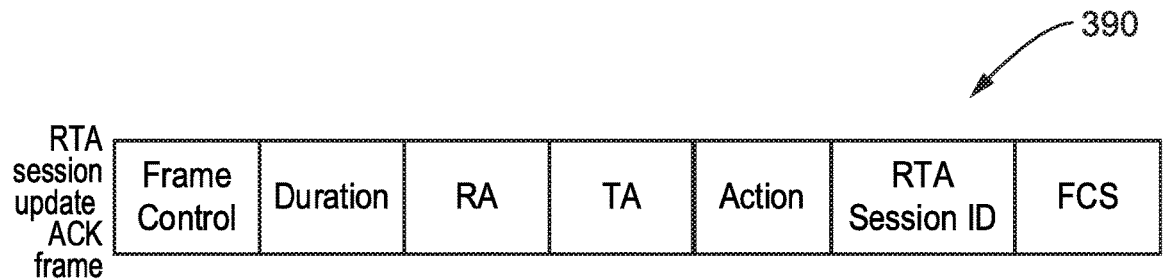
FIG. 23 is a data field diagram of an RTA session update ACK frame according to at least one embodiment of the present disclosure.

FIG. 22 illustrates an example embodiment 370 of an RTA session update reply frame. A Frame Control field indicates the frame type. A Duration field contains NAV information used for CSMA/CA channel access. An RA field contains an address for the recipient of the frame. A TA field contains the address of the STA that transmitted the frame. An Action field indicates the type of management frame, and in this case indicates that the management frame is an RTA session update reply frame. An Update Reply Information field follows the Action field when the Action field indicates that the frame is RTA session update reply frame, and contains the fields as follows. (a) An RTA Session ID provides identifying information of the RTA session; the content of this field is shown in FIG. 11. A Number of Update Information field provides the number of update information carried by this frame. An Update Info Name provides the name of the update information. An Update Information Value field provides a value of the update information.

FIG. 23 illustrates an example embodiment 390 of an RTA session update ACK frame. A Frame Control field indicates frame type. A Duration field contains NAV information used for CSMA/CA channel access. An RA field contains an address for the recipient of the frame. A TA field contains the address of the STA that transmitted the frame. An Action field indicates the type of management frame, and in this case indicates that the management frame is an RTA session update ACK frame. An RTA Session ID field follows the Action field when the Action field indicates that the frame is an RTA session update ACK frame, the content of this field was shown in FIG. 11.

Table 5 shows an example of the RTA session table at STA 0 after it updates RTA session 5 with STA 2. The RTA session table before the update procedure is shown in Table 4. Here, STA 0 sends an RTA session update request frame to reduce the periodic time from 10 ms to 5 ms in RTA session 5. When STA 2 receives the frame, it checks the resources on its side. Then, STA 2 finds that the resources are unavailable to support the update of the session. STA 2 then changes the session status to error and puts the reason of error as a comment. When STA 2 sends the RTA session update reply frame to STA 0, it puts the new session status and the comment in the frame. It informs STA 0 that the session status is changed to error and the reason of the error status is carried by the Comment field. STA 0 receives the RTA session update reply frame and updates the RTA session table as shown in Table 5. It should be noted that the Comment field is not shown in the table but it can be part of the table.

4.5.3.3. RTA Session Finish Procedure

A STA is able to finish an RTA session at any time using the RTA session finish procedure. The figure described below provides an example to show how STAs exchange the management frames at the MAC layer to finish an RTA session. The management frames that are used to finish an RTA session are shown in FIG. 25 and FIG. 26.

Figure 24:
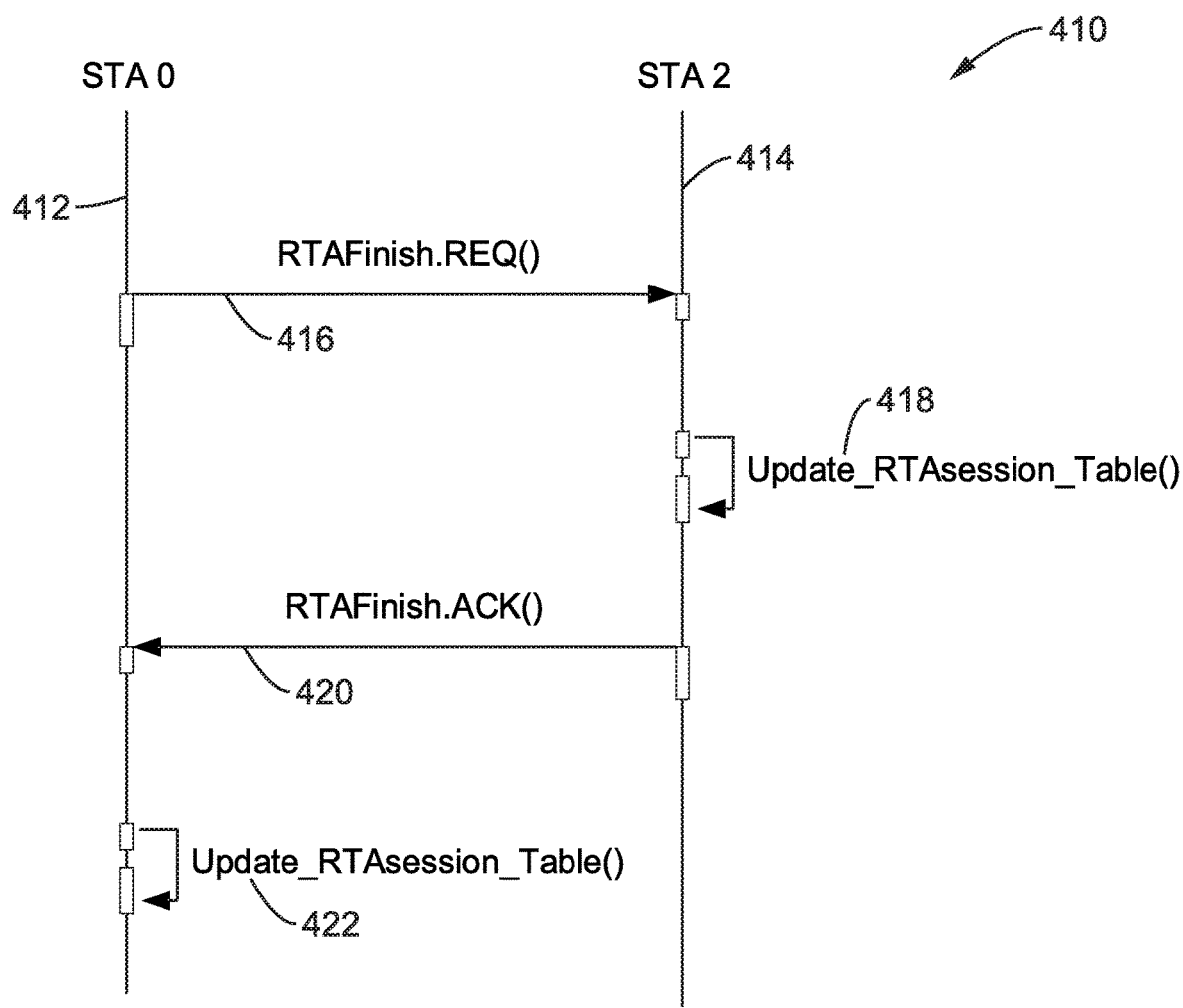
FIG. 24 is a communication interchange diagram of finishing an RTA session from the perspective of the MAC layer according to at least one embodiment of the present disclosure.

FIG. 24 illustrates an example embodiment 410 of finishing an RTA session from the perspective of the MAC layer for STA0 412 and STA2 414. When STA 0 plans to finish an RTA session, it sends an RTA session finish request frame (RTAFinish.REQ) 416 containing RTA session identifying information to STA 2. When STA 2 receives the RTA session finish request frame, it finds the RTA session and removes it 418 from its RTA session table. Then, STA 2 sends an RTA session finish ACK frame (RTAFinish.ACK) 420 to STA 0. Both of the RTA session finish request frame and the RTA session finish ACK frame contains the RTA session identifying information so that the neighboring STAs can be informed immediately. The RTA session can also be finished at the Session End Time. When the RTA session is finished, it is removed 422 from the RTA session table.

Figure 25:
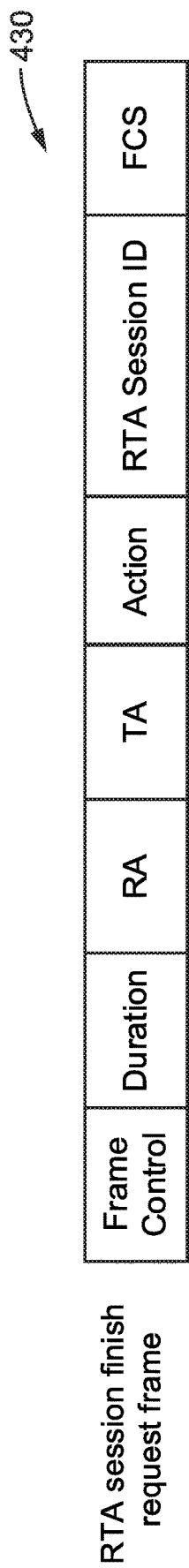
FIG. 25 is a data field diagram of an RTA session finish request frame according to at least one embodiment of the present disclosure.

FIG. 25 illustrates an example embodiment 430 of an RTA session finish request frame. A Frame Control field indicates frame type. A Duration field contains NAV information used for CSMA/CA channel access. An RA field contains an address of the recipient of the frame. A TA field contains the address of the STA that transmitted the frame. An Action field indicates the type of management frame, and in this case indicates that the management frame is an RTA session finish request frame. An RTA Session ID field (shown in FIG. 11) follows the Action field when the Action field indicates that the frame is RTA session finish request frame.

Figure 26:
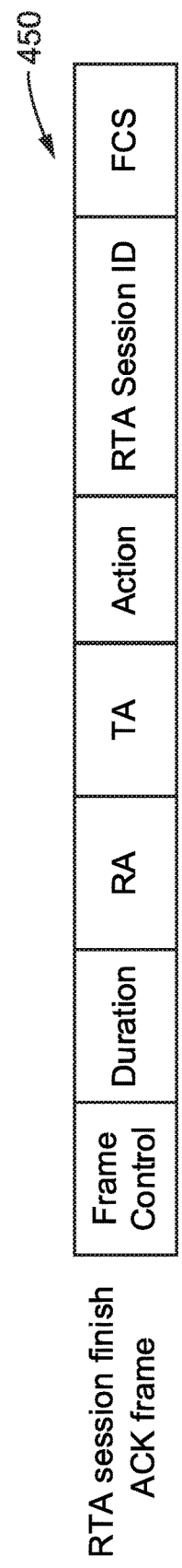
FIG. 26 is a data field diagram of an RTA session finish ACK frame according to at least one embodiment of the present disclosure.

FIG. 26 illustrates an example embodiment 450 of an RTA session finish ACK frame. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame, and in this case indicates that the management frame is an RTA session finish ACK frame. An RTA Session ID field (shown in FIG. 11) follows the Action field when the Action field indicates that the frame is RTA session finish ACK frame.

Table 6 shows an example of the RTA session table at STA 0 after it finishes RTA session 5 with STA 2. The RTA session table before the update procedure is shown in Table 5. Here, STA 0 sends an RTA session finish request frame to finish RTA session 5. When STA 2 receives the frame, it finds the RTA session 5 in its RTA session table and removes it. After that, STA 2 sends the RTA session finish ACK frame to STA 0. STA 0 receives the RTA session finish ACK frame and removes RTA session 5 from the RTA session table as shown in Table 5.

4.5.3.4. RTA Session Announcement Procedure

Figure 27:
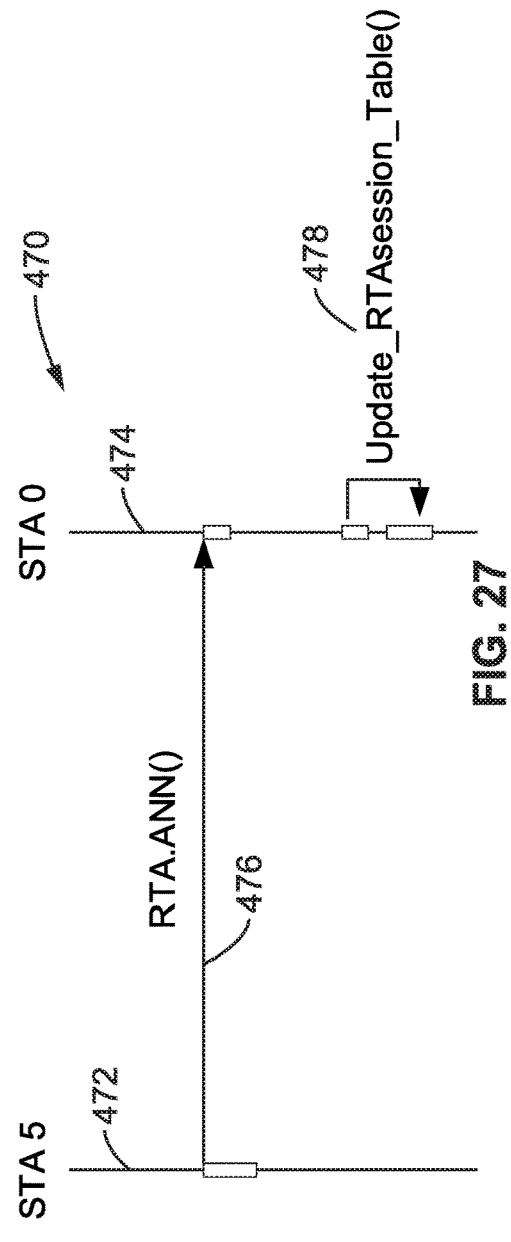
FIG. 27 is a communication interchange diagram of announcing an RTA session between stations according to at least one embodiment of the present disclosure.

FIG. 27 illustrates an example embodiment 470 of announcing an RTA session between STA5 472 and STA0 474. In this way a STA is able to communicate to its neighboring STAs that an RTA session has been created at its side. The figure gives an example to show how STAs exchange the management frames at the MAC layer to announce an RTA session to its neighboring STAs, with the management frame used to announce an RTA session being described in FIG. 28.

In FIG. 27 STA 5 creates an RTA session on its side, it sends an RTA session announcement frame (RTA.ANN) 476 containing RTA session information to STA 0. When STA 0 receives the RTA session announcement frame, it adds 478 the RTA session in the announcement frame into its RTA session table. It should be noted that the RTA session announcement frame can be broadcast.

Figure 28:
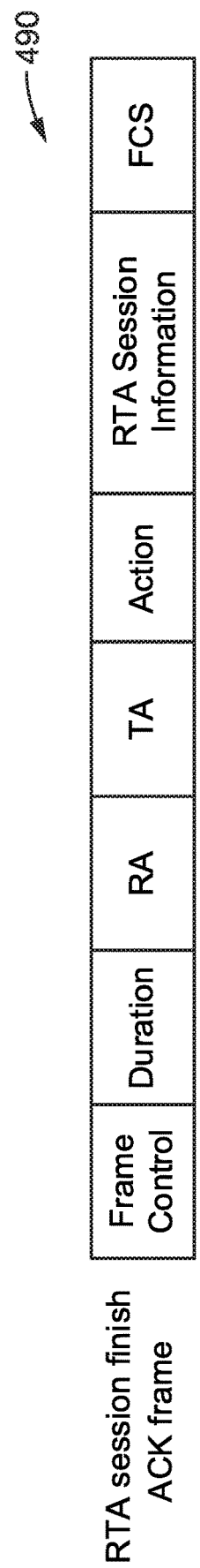
FIG. 28 is a data field diagram of an RTA session announcement frame according to at least one embodiment of the present disclosure.

FIG. 28 illustrates an example embodiment 490 of an RTA session announcement frame. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame, and in this case indicates that the management frame is RTA session announcement frame. An RTA Session Information field (shown in FIG. 15) follows the Action field when the Action field indicates that the frame is an RTA session announcement frame.

Table 7 shows an example of the RTA session table at STA 0 after it receives RTA session announcement frames from STA 2. The RTA session table before the update procedure is shown in Table 6. According to the RTA session announcement frames, STA 0 knows that STA 2 schedules RTA sessions 5 and 6 on its side. STA 0 adds RTA session 5 and 6 into the RTA session table as shown in Table 7.

4.6. RTA Channel Scheduling

When an RTA session generates traffic periodically, a STA is able to schedule the channel resource allocation for the traffic transmission of the RTA session. Every periodic time (interval), the active RTA session creates an RTA scheduled period (RTA-SP) to allocate the scheduled channel time for the RTA traffic transmission. During each RTA-SP, the amount of RTA traffic that needs to be transmitted is known by the STA (e.g., the amount of RTA traffic is constant).

The disclosed technology allows a STA to schedule RTA-SPs based on the information in its RTA session table at the MAC layer. Then the STA stores the RTA-SPs in an RTA channel scheduling table. The STA executes the RTA-SPs by following the list in the RTA channel scheduling table. Each RTA-SP is responsible for transmitting the RTA traffic or RTA packets of a certain RTA session. The method of identifying RTA traffic or RTA packet at the MAC layer of the STA is explained at Section 4.4.

Due to the lifetime of the RTA packet as explained in Section 4.4.3, when RTA-SP is used to transmit RTA packets, the duration of RTA-SP should not be any longer than the lifetime of the RTA packet so as to ensure the validation of the packet when it is delivered.

Figure 29:
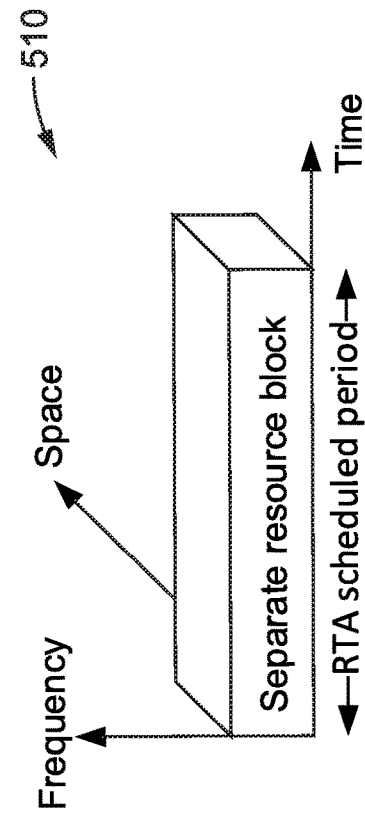
FIG. 29 is a space, time frequency diagram of a resource block according to at least one embodiment of the present disclosure.

FIG. 29 illustrates an example embodiment 510 of a resource block for RTA traffic transmission in an RTA scheduled period. During RTA-SP, the RTA traffic can be transmitted using the allocated channel resource at a specific channel frequency and/or space. The allocated time, frequency, and space of the channel resource generates a separate resource block for the RTA traffic transmission in an RTA-SP. Due to the separate resource block used in the RTA-SP, the channel scheduling scheme is able to schedule the multi-user transmission, such as MIMO, OFDMA, and so forth.

4.6.1. RTA Channel Scheduling Table

When a STA schedules RTA-SPs for RTA sessions in its RTA session table, it creates an RTA channel scheduling table to list all the RTA-SPs that are scheduled for the future. One example of the RTA channel scheduling table is shown in Table 8.

Table 8 shows an example of RTA channel scheduling table of STA 0 at time 0 ms. The RTA-SPs in the table are scheduled based on the RTA session table as shown in Table 7. Each row in the table represents an RTA-SP which is scheduled by the STA. The content of each column is explained as follows. RTA-SP Number represents the order number of RTA-SP. The RTA-SP with a larger order number is scheduled later than the RTA-SP with a smaller order number. A Session ID indicates which RTA session scheduled the RTA-SP. The Session ID in the RTA channel scheduling table can be pointed to (directed to) the Session ID in the RTA session table. For example, RTA-SP 1 with Session ID 1 in Table 8 indicates that the RTA-SP is scheduled by RTA session 1 in Table 7. For the purpose of simplifying the description, RTA session 1 is called the RTA session of RTA-SP 1. The period start time and the period end time represent the start time and the end time of the RTA-SP. The period time of RTA-SP is equal to the Periodic Time of its RTA session in the RTA session table. Table 8 lists the first RTA-SPs scheduled by all the RTA sessions in Table 7. The Period Start Time of RTA-SP in this example is considered to be the same as the Session Start Time of its RTA session.

The RU Allocation and SS Allocation fields show the allocated channel resource of frequency and space, respectively, and they can be fixed or random. When RU Allocation or SS Allocation is random, the RTA packet can be transmitted using random channel resource of either frequency or space according to the channel condition during RTA-SP. When RU Allocation or SS Allocation is fixed, then the RTA packet can only be transmitted using allocated channel resources of frequency or space during the RTA-SP. For example, RU1 and RU2 are denoted as channel resource of RU Allocation. SS1 and SS2 are denoted as channel resources of SS Allocation. RTA-SP 5 can only use RU1 and SS1 for RTA packet transmission during its period time. RTA-SP 6 can only use RU2 and SS2 for RTA packet transmission during its period time.

Priority is the priority of the RTA-SP. The RTA-SP has the same priority of its RTA session. The RTA-SP with higher priority has the higher priority to use the allocated resource block for transmission. Activity represents the actions STA will take during the RTA-SP. This can be determined by checking the Tx Node and Rx Node of the RTA session in the RTA session table. If the STA is the Tx Node, then it transmits RTA packets during the RTA-SP. If the STA is the Rx Node, then it receives RTA packets during the RTA-SP.

If the STA is neither the Tx Node nor the Rx Node, it only listens to the channel during RTA-SP.

The RTA-SPs in the RTA channel scheduling table are sorted using the period start time as a primary sort key, and the priority as a secondary sort key. According to the RTA channel scheduling table, the STA is able to execute the RTA-SPs line by line in the RTA channel scheduling table. Every time the STA finishes one RTA-SP, it will remove the finished RTA-SP from the table, schedule a new RTA-SP based on the RTA session information of the finished RTA-SP, and insert the new RTA-SP to the table.

Figure 30:
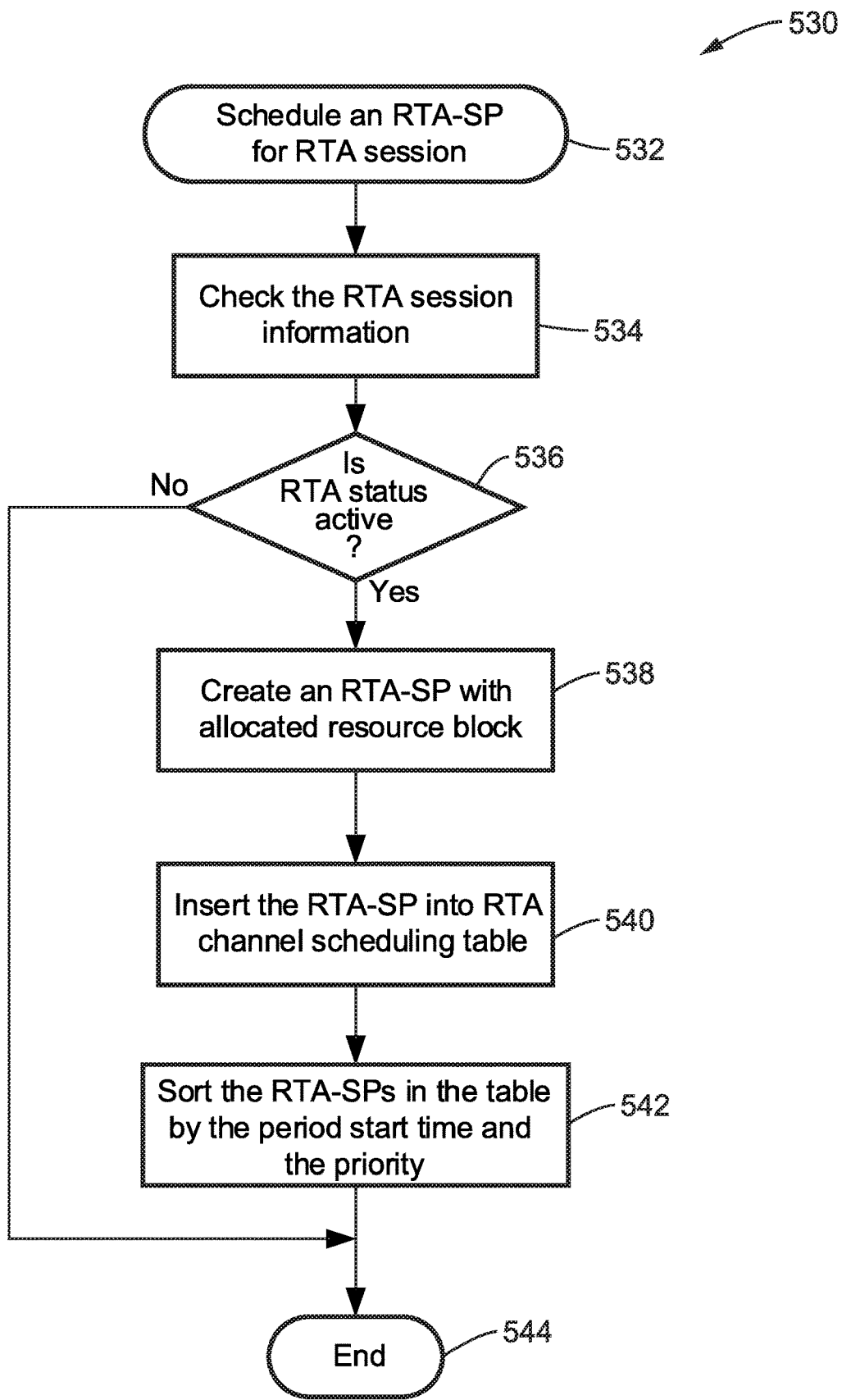
FIG. 30 is a flow diagram of a stations scheduling RTA-SPs and adding them to the RTA channel scheduling table according to at least one embodiment of the present disclosure.

FIG. 30 illustrates an example embodiment 530 of a STA scheduling RTA-SPs and adding it into the RTA channel scheduling table. When the STA schedules 532 an RTA-SP for RTA session, it first obtains 534 RTA session information from the RTA session table. A check 536 is performed if the RTA session status is active. If the RTA session is not active, then RTA-SP is not scheduled and the process ends 544. Otherwise, if the RTA session is active, the STA creates 538 an RTA-SP with allocated resource block for that RTA session. The STA then adds (inserts) 540 the RTA-SP into the RTA channel scheduling table. The RTA-SPs in the RTA channel scheduling table will be sorted 542 using the period start time as primary sort key, and the priority as secondary sort key, before ending 544 the process.

Tables 8 through Table 12 provide an example to show how STA 0 schedules RTA-SPs and manages them using the RTA channel scheduling table. Table 8 shows the RTA channel scheduling table of STA 0 at time 0 ms based on the RTA session information in Table 7. As shown in Table 9, at time 2 ms, STA 0 finishes the RTA traffic transmission in RTA-SP 1 and removes it from the RTA channel scheduling table. Meanwhile, STA 0 needs to schedule a new RTA-SP based on the information of RTA session information of RTA-SP 1, such as RTA session 1.

According to FIG. 30, STA 0 checks the information of RTA session 1 in its RTA session table. The status of RTA session 1 is active. STA 0 schedules a new RTA-SP for RTA session 1, which is RTA-SP 7 shown in Table 9. The Period Start Time of RTA-SP 7 could be the Periodic Time of RTA session 1 plus the Period Start Time of RTA-SP 1. The other information of RTA-SP 7 is the same as that of RTA-SP 1 since there is no update in RTA session 1. STA 0 inserts the RTA-SP 7 into the RTA channel scheduling table. Since RTA-SP has the latest Period Start Time, it is listed at the last line of the table.

Table 10 lists the RTA-SPs in the RTA channel scheduling table of STA 0 at time 4 ms. STA 0 uses multi-user transmission to transmit RTA traffic of RTA sessions 2, 3, and 4. STA 0 finishes the RTA transmission of RTA sessions 3 first and ends RTA-SP 3. It removes RTA-SP 3 from the table and inserts a new RTA-SP 8 for RTA session 3. This process is the same as explained in Table 9.

Table 11 lists the RTA-SPs in the RTA channel scheduling table of STA 0 at time 6 ms. STA 0 ends RTA-SPs 2 and 4. STA 0 inserts two new RTA-SPs 9 and 10 into the table. RTA-SP 9 is for RTA session 2 and RTA-SP 10 is for RTA session 4. Since the Period Start Time of RTA-SPs 8, 9 and 10 is the same but RTA-SP 9 has higher priority, RTA-SP 9 lists above RTA-SP 8 and 10.

Table 12 lists the RTA-SPs in the RTA channel scheduling table of STA 0 at time 10 ms. STA 0 ends RTA-SPs 5 and 6 and inserts two new RTA-SPs 11 and 12 into the table. RTA-SP 11 is for RTA session 5 and RTA-SP 12 is for RTA session 6. Since the Period Start Time of RTA-SPs 11 and 12 is earlier than RTA-SPs 8, 9, 10, RTA-SPs 11 and 12 lists above RTA-SPs 8, 9, 10.

4.6.2. RTA Channel Schedule Execution

This section explains how a STA starts and ends an RTA-SP in the RTA channel scheduling table.

Figure 31:
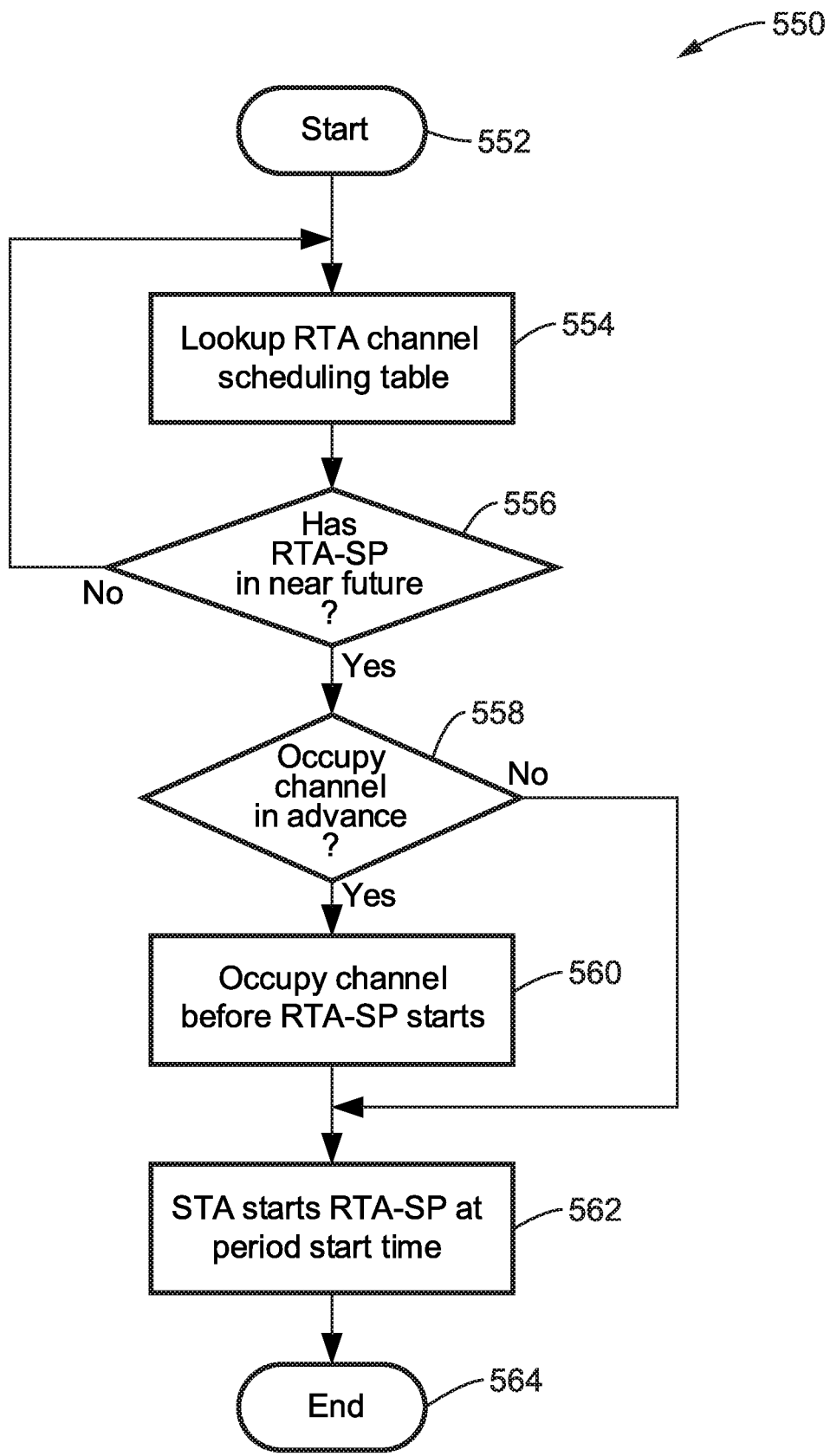
FIG. 31 is a flow diagram of a station starting an RTA-SP listed in its RTA channel scheduling table according to at least one embodiment of the present disclosure.

FIG. 31 illustrates an example embodiment 550 of a STA starting an RTA-SP listed in its RTA channel scheduling table. When a STA plans to start 552 an RTA-SP, it first searches 554 (lookup) the RTA channel scheduling table. A check is made 556 if there is an RTA-SP in the immediate future which is a fixed period of time determined by the STA. If there is no RTA-SP scheduled in this near future, then execution returns to block 554 and it will keep searching and looking up in the RTA channel scheduling table. Otherwise, if there is an RTA-SP scheduled in the near future then the STA needs to make a decision whether to gain the channel access before RTA-SP starts so that the channel can be occupied in advance. So a check is made 558 to determine if it should occupy the channel in advance. If it decides to occupy the channel in advance it will try to occupy the channel as seen at block 560 before the RTA-SP starts to occupy the channel in advance by reserving the channel resource block for RTA-SP to allow the RTA traffic transmission to start at the beginning of the RTA-SP without channel contention. The method of channel occupancy in advance is explained in Section 4.7.2. Then the STA starts 562 the RTA-SP at the Period Start Time listed in the RTA channel scheduling table. Otherwise, if the STA decides not to occupy the channel, then the STA does not reserve the channel and execution directly reaches block 562 to start RTA-SP. After starting RTA-SP the process ends 564.

Figure 32:
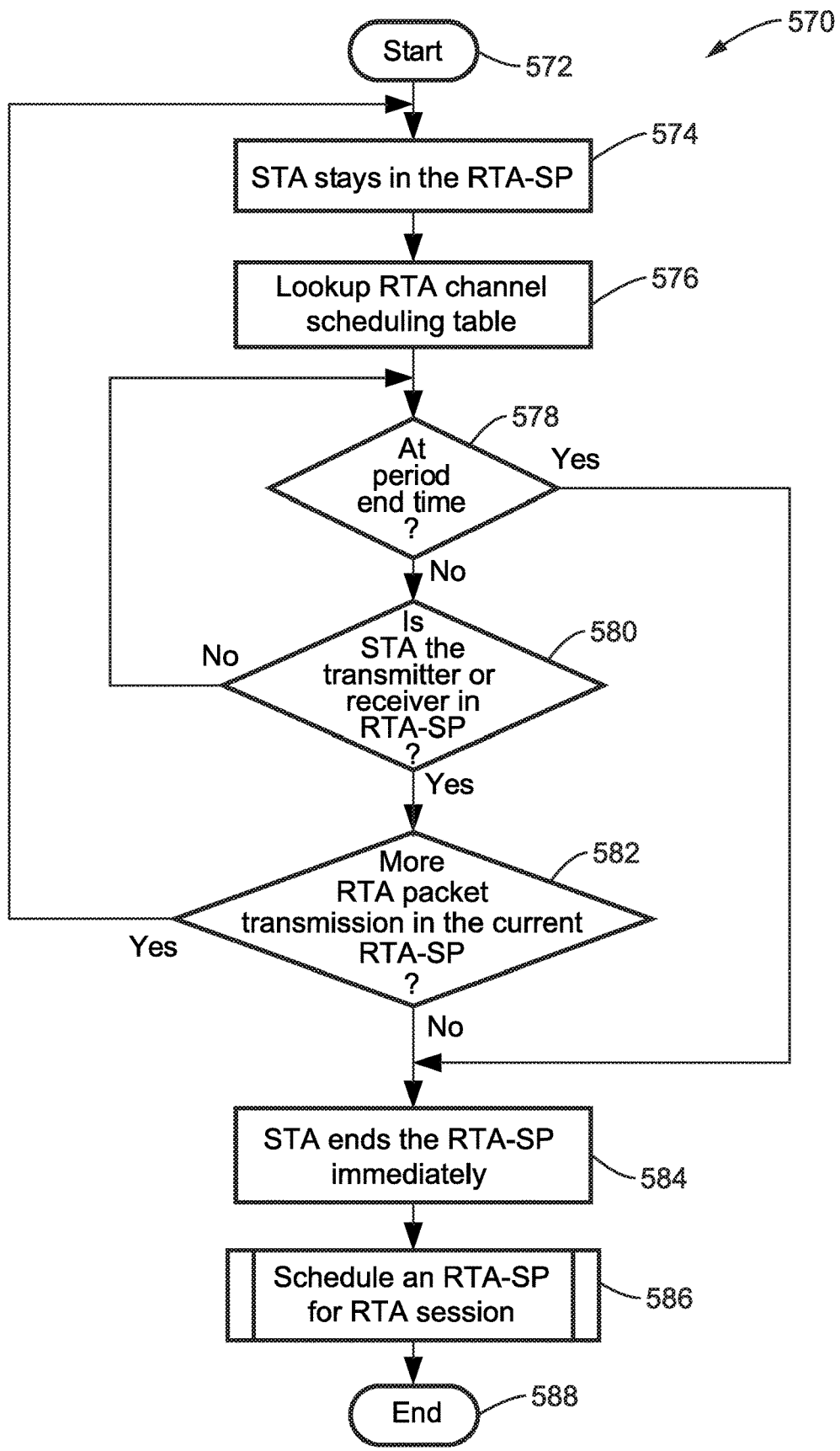
FIG. 32 is a flow diagram of a STA ending an RTA-SP according to at least one embodiment of the present disclosure.

FIG. 32 illustrates an example embodiment 570 of a STA ending an RTA-SP. The process starts 572 and the STA stays 574 in an RTA-SP and looks up (searches) 576 information of the RTA-SP in the RTA channel scheduling table. A check is made 578 if the current time has reached the Period End Time of the RTA-SP shown in the RTA channel scheduling table. If the end is reached then execution moves on to block 584 to end the RTA-SP immediately. Otherwise, if the end time has not been reached then the STA may remain in (stay in) RTA-SP and be tracking RTA traffic. A check is made at block 580 to determine if the STA is either the transmitter or the receiver in the RTA-SP. If the STA is neither transmitter nor receiver, then it is a listener and execution returns back to block 578 to check period end time. Otherwise, since the STA is either a transmitter or receiver it knows there are more packet transmissions, so it checks 582 whether there are more RTA packets to transmit or receive during the RTA-SP. If there are more RTA packet transmissions, it remains in RTA-SP and execution moves back to block 574. Otherwise, with no more packets transmissions it ends the RTA-SP 584, then based on RTA session information it schedules 586 an RTA-SP for the RTA session before the process ends 588.

Figure 33:
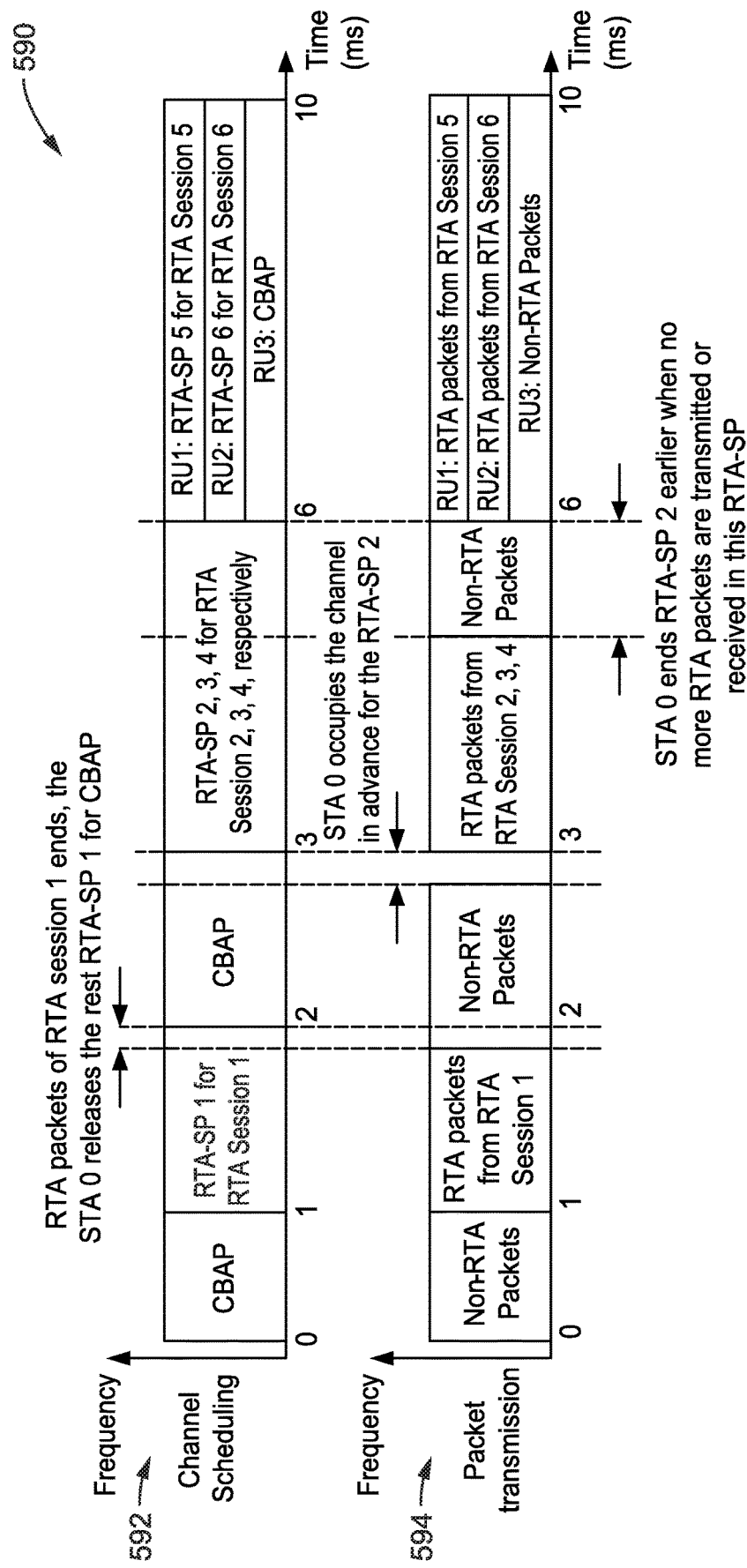
FIG. 33 is a packet scheduling diagram of a station executing the RTA-SPs listed in the RTA scheduling table according to at least one embodiment of the present disclosure.

FIG. 33 illustrates an example embodiment 590 of a STA executing the RTA-SPs listed in the RTA scheduling table, and showing both channel scheduling 592 and packet transmission 594, with time markers along the base of each, exemplified here from 0 to 10 ms. The channel scheduling in the figure follows the RTA channel scheduling table of STA 0 as shown in Table 8. CBAP in the channel scheduling represents the contention based access period. That is, during CBAP, the STA access the channel following the CSMA/CA scheme. The packet transmission in the figure represents the packet transmission over the channel following the channel scheduling.

During time 0 ms to 1 ms, the channel scheduling is CBAP, non-RTA packets are allowed to transmit over the channel. As seen in block 562 of FIG. 31, STA 0 starts the RTA-SP 1 for receiving RTA packets generated by RTA session 1 at time 1 ms. The RTA packet can be identified as explained in FIG. 13. RTA-SP 1 is scheduled to end at time 2 ms. However, the RTA packets of RTA session 1 finish transmitting before time 2 ms. STA 0 ends the RTA-SP 1 when the RTA packet transmission finishes as explained in blocks 580, 582, 584 in FIG. 32. The remaining time for RTA-SP 1 can be used as CBAP. There is no RTA-SP scheduled during time 2 ms to 3 ms. That period of time is CBAP and used for non-RTA packet transmission.

Three RTA-SPs (i.e., RTA-SPs 2, 3, 4) are scheduled to start at time 3 ms. Especially, RTA-SP 2 has higher priority and is required to occupy the channel in advance. As seen in blocks 556, 558, 560 in FIG. 31, STA 0 gains the channel access before time 3 ms and transmits the RTA packet generated by RTA session 2 at time 3 ms without channel contention. The RTA packets generated by different RTA sessions can be identified as explained in FIG. 10. The RTA packets generated by RTA sessions 3 and 4 may be transmitted after finishing the RTA packet transmission of RTA sessions 2 due to the priority.

RTA-SPs 2, 3, 4 end earlier than time 6 ms because STA 0 finishes the RTA packet transmission, with the remainder of the time of the RTA-SPs used for non-RTA packet transmission.

RTA-SPs 5 and 6 start at time 6 ms. As shown in Table 8, those two RTA-SPs have allocated resource block for transmission, i.e., RU1 and RU2 in the figure. If there exists extra resource blocks, such as RU3, then STA 0 can use these for packet transmission. Since STA 0 is the listener, it ends RTA-SPs 5 and 6 at Period End Time 10 ms as seen in FIG. 32.

4.7. RTA-RTS/CTS/NTS Exchange

As mentioned in Section 4.6.2, the STA is able to gain the channel access in advance and reserve the channel for RTA-SP. This section provides one method of allowing a STA to gain channel access before the start of RTA-SP. The disclosed technology is able to use RTA-RTS/CTS/NTS exchange to allow a STA to occupy the channel in advance for packet transmissions in RTA-SP. RTA-RTS/CTS/NTS exchange occupies the channel by setting the NAV at STAs, which is similar to RTS/CTS exchange. Compared with regular RTS/CTS exchange, the RTA-RTS/CTS/NTS exchange has the following features. (a) When STA sends an RTA-RTS frame, it will either receive an RTA-CTS frame to indicate successful channel occupancy, or receive an RTA-NTS to indicate that the channel occupancy is rejected and some other transmission is scheduled in the near future. (b) The RTA-RTS/CTS/NTS frame carries the traffic information that will be transmitted using the channel occupied by the RTA-RTS/CTS exchange. The response of RTA-RTS frame depends on the priority of the traffic indicated in the RTA-RTS frame. (c) When channel occupancy is denied, it also denies the traffic transmission indicated in the RTA-RTS frame.

4.7.1. Frame Formats

FIG. 34 illustrates an example embodiment 610 of an RTA-RTS frame having the following fields. A Frame Control field indicates frame type. A Duration field contains NAV information used for CSMA/CA channel access. An RA field contains an address for the recipient of the frame. A TA field contains the address of the STA that transmitted the frame. An RTA Traffic field is a one bit indication to show whether the packet transmission following the RTA-RTS/CTS exchange is RTA or not. When the bit is set to a first state (e.g., "1"), the packet transmission is RTA; otherwise it is non-RTA. An RTA Session ID field (shown in FIG. 11) indicates the identifying information of the RTA session. A Priority field indicates the priority of RTA traffic that will be transmitted after the RTA-RTS/CTS exchange.

FIG. 35 illustrates an example embodiment 630 of a RTA-CTS frame having the following fields. A Frame Control field indicates the type of frame. A Duration field contains NAV information used for CSMA/CA channel access. An RA field contains an address for the recipient of the frame. An RTA Traffic field is a one bit indication to show whether the packet transmission following the RTA-RTS/CTS exchange is RTA or not. When the bit is set to a first state (e.g., "1"), then packet transmission is RTA; otherwise if set to a second state (e.g., "0"), it is considered non-RTA. An RTA Session ID field indicates the identifying information of the RTA session, as was shown in FIG. 11. A Priority field indicates the priority of RTA traffic that will be transmitted after the RTA-RTS/CTS exchange.

FIG. 36 illustrates an example embodiment 650 of an RTA-NTS frame having the following fields. A Frame Control field indicates frame type. A Duration field contains NAV information used for CSMA/CA channel access. An RA-NAV field contains an address for the recipient of the frame who sent the RTS or RTA-RTS frame. The recipient should set the NAV according to the Duration field and Start Time of Channel Occupancy field. A Number of RA-not-NAV field indicates the number of RA-notNAV fields in the frame. RA-notNAV field contains address of the recipient of the frame who should remove the NAV set by RTS frame or RTA-RTS frame. An RTA Traffic field provides a one bit indication of whether the packet transmission after the RTA-RTS/CTS exchange is RTA or not. When the bit is set to a first state (e.g., "1"), the packet transmission is RTA; otherwise it set to a second state (e.g., "0") it is considered non-RTA transmission. An RTA Session ID field indicates the identifying information of RTA session as was shown in FIG. 11. A Priority field indicates the priority of RTA traffic that will be transmitted after the RTA-RTS/CTS exchange. A Start Time of Channel Occupancy field indicates the start time that the channel will be occupied by the STA who sends this RTS-NTS.

Figure 37:
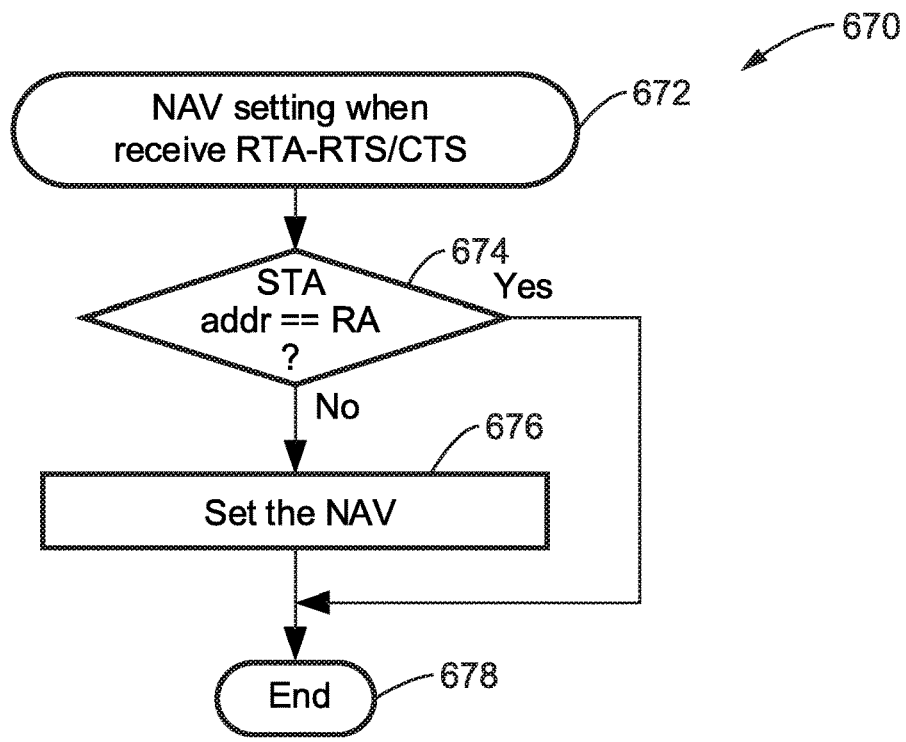
FIG. 37 is a flow diagram of NAV setting when receiving an RTA-RTS/CTS frame according to at least one embodiment of the present disclosure.

FIG. 37 illustrates an example embodiment 670 for NAV setting when receiving an RTA-RTS/CTS frame. When the STA receives 672 an RTA-RTS/CTS frame, it checks 674 the RA field in the frame. If the STA address is not the same as in the RA field then at block 676 the NAV is set, and the process ends 678. Otherwise, if the STA address is the same as in the RA field, then from block 674 execution moves to end 678 as it does not need to set the NAV. The duration of the NAV is the time in the Duration field of the frame and the NAV starts when it receives the frame.

Figure 38:
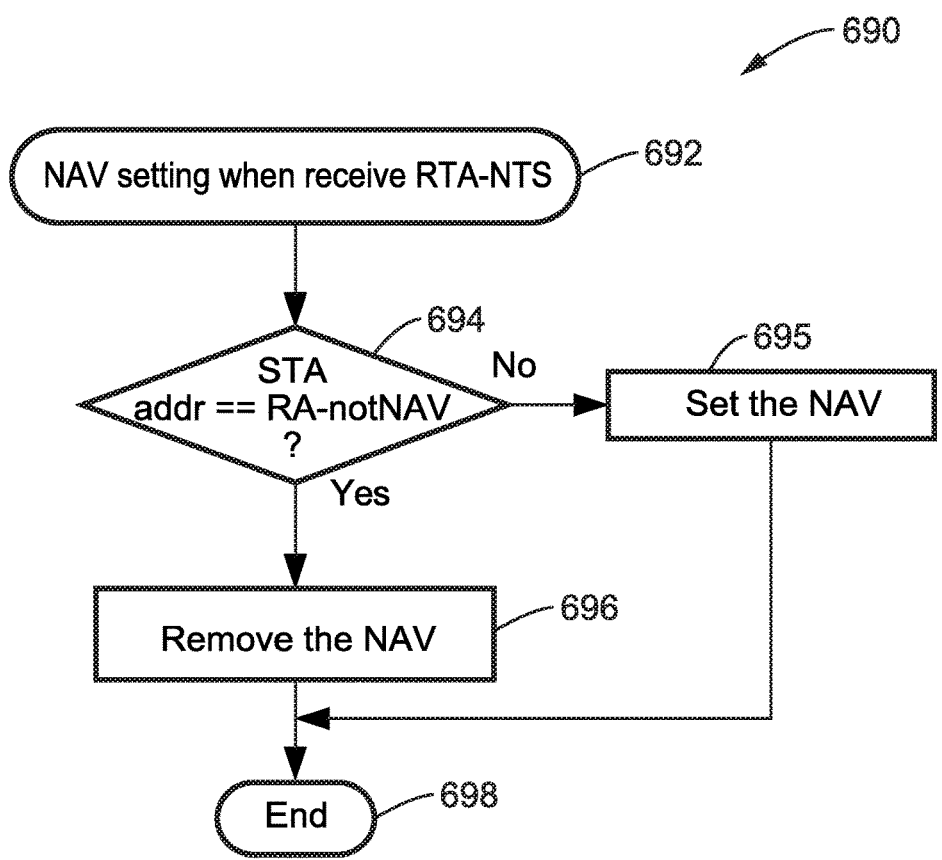
FIG. 38 is a flow diagram of how the NAV is set when receiving an RTA-NTS frame according to at least one embodiment of the present disclosure.

FIG. 38 illustrates an example embodiment 690 of how the NAV at the STA is set when receiving an RTA-NTS frame. When a STA receives RTA-NTS frame 692, it checks 694 the RA-notNAV field in the frame. If the STA address is the same as in the RA-notNAV field, it removes 696 the NAV and the process ends 698. Otherwise, execution reaches block 695 and it sets the NAV according to the Duration field and Start Time of Channel Occupancy field in the frame and then reaches ends 698. When setting or removing the NAV, the start time and the duration of the NAV is the same. The duration of the NAV is the time in the Duration field of the frame and the NAV starts at the Start Time of Channel Occupancy.

4.7.2. Channel Occupancy

This section explains the details of how the STA is able to occupy the channel using an RTA-RTS/CTS/NTS exchange. The channel occupancy can be used for: (a) occupying the channel in advance for RTA-SP; and (b) occupying the channel for RTA and non-RTA packet transmissions.

Figure 39:
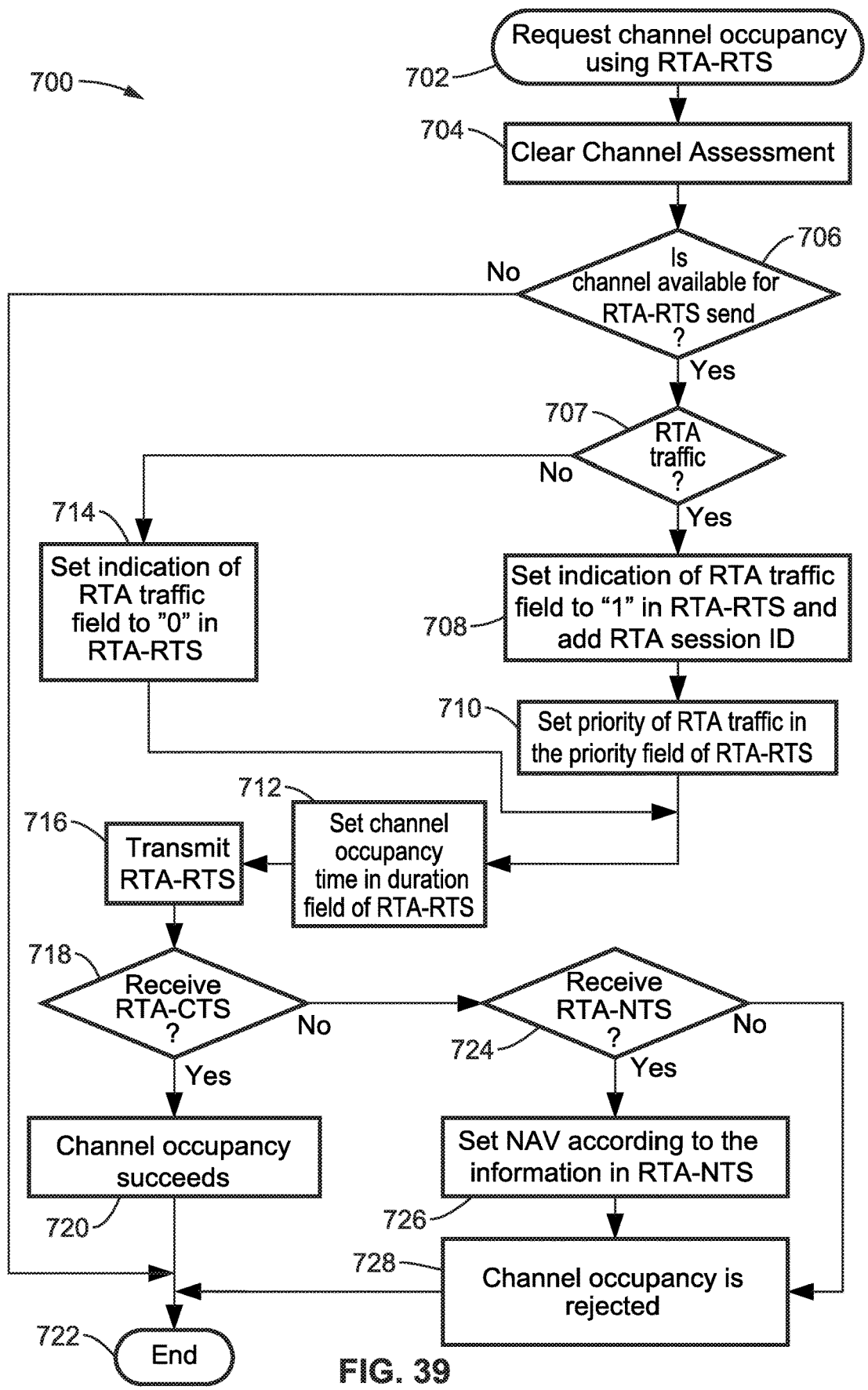
FIG. 39 is a flow diagram of a STA sending RTA-RTS frame to request channel occupancy according to at least one embodiment of the present disclosure.

FIG. 39 illustrates an example embodiment 700 of a STA sending RTA-RTS frame to request channel occupancy. When the STA determines 702 to send an RTA-RTS frame to request channel occupancy, it first performs 704 a clear channel assessment before gaining channel access for sending the RTA-RTS frame. A check at block 706 determines if the channel is available for sending an RTA-RTS. If the channel is not available, then the process ends 722. Otherwise, if the channel is available, then a check is made at block 707 as to whether the channel occupancy request is for RTA traffic or non-RTA traffic.

If the request is for occupying the channel for sending RTA traffic, the STA sets 708 the Indication of RTA Traffic field to a first state (e.g., "1") to indicate that the channel is occupied for RTA traffic in the RTA-RTS frame, adds the RTA session ID, and sets 710 the priority of the RTA traffic in the Priority field.

Otherwise, if at block 707 the channel occupancy is only requested for transmitting non-RTA traffic, then in block 714 the STA sets the indication of RTA Traffic field to a second state (e.g., "0") in the RTA-RTS frame to indicate the traffic is non-RTA. Then in either occupancy case execution reaches block 712 where the STA sets the channel occupancy time in the Duration field of the frame and transmits 716 the RTA-RTS frame.

A check 718 determines if the STA receives the RTA-CTS frame after sending RTA-RTS frame. If it received the RTA-CTS, then at block 720 channel occupancy succeeds with the STA able to use the occupied channel for packet transmission, and the process ends 722. Otherwise, if the RTA-CTS is not received, then occupancy is directly or indirectly rejected, so a check is made at block 724 for RTA-NTS. If the STA receives RTA-NTS frame as a direct rejection, then at block 726 the STA sets NAV according to the information in RTA-NTS frame and reaches block 728 to reject channel occupancy and the process ends 722. Otherwise, if the check at block 724 determines that RTA-NTS is not received, then execution reaches block 728 with occupancy rejected and the process ends 722. Thus, even if the STA does not receive anything after sending RTA-RTS frame, it also indicates that channel occupancy is rejected. The STA is required to re-contend for the channel for the purpose of channel occupancy.

Figure 40:
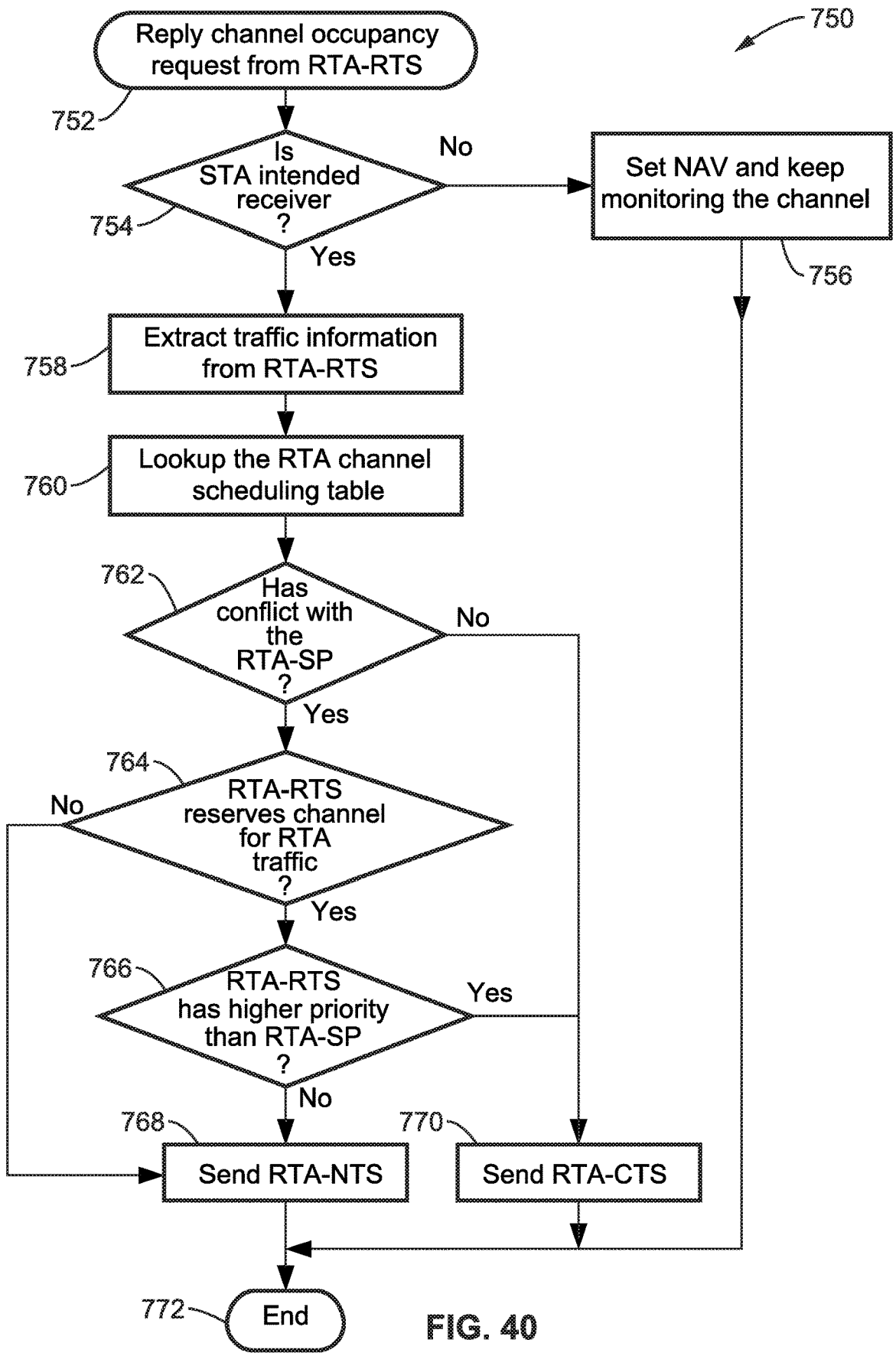
FIG. 40 is a flow diagram of a STA replying to a channel occupancy request in response to an RTA-RTS frame according to at least one embodiment of the present disclosure.

FIG. 40 illustrates an example embodiment 750 of a STA replying to a channel occupancy request in response to an RTA-RTS frame. When the STA receives 752 an RTA-RTS frame for channel occupancy request, it first checks 754 whether it is the intended receiver. If the STA is not the intended receiver, it sets 756 the NAV as explained in FIG. 37 and continues monitoring the channel, wherein the process is seen ending 772.

Otherwise, if the STA is the intended receiver then execution moves from block 754 to block 758 wherein the STA extracts traffic information from the RTA-RTS frame and thus the STA recognizes the type of traffic (i.e., RTA or non-RTA). If the traffic is RTA, STA can also obtain the RTA session identifying information and the priority of the traffic.

Then, the STA performs a lookup (search) 760 of its RTA channel scheduling table and checks 762 whether the channel occupancy time requested by the RTA-RTS frame would conflict with the RTA-SPs scheduled in the table. If there is no conflict, that is to say that the channel occupancy time does not overlap with the RTA-SPs in the table or the channel occupancy is for one RTA-SP in the table, then block 770 is reached with the STA sending an RTA-CTS frame back to the requesting station to grant channel occupancy, after which the process ends 772.

Otherwise, if it is found at block 762 that the channel occupancy requested by the RTA-RTS frame conflicts the RTA-SPs scheduled in the table, then a check 764 is performed on the traffic type indicated in the RTA-RTS frame. If the traffic type is not RTA traffic, the execution moves to block 768 with the STA sending an RTA-NTS to reject the channel occupancy request and indicate that there is RTA traffic transmission in the near future, before the process ends 772

If, however, the traffic type determined at check 764 is RTA, then at block 766 the STA performs a check comparing the priority of the RTA traffic indicated in the RTA-RTS frame with the priority of the RTA-SPs which have conflicts with the channel occupancy time requested by the RTA-RTS frame. If the RTA traffic indicated in the RTA-RTS frame has higher priority, then the STA allows the RTA-RTS to occupy the channel and execution moves to block 770 which sends an RTA-CTS frame back to grant the request. Otherwise, if the request is of lower priority, then execution moves to block 768 with the STA rejecting the channel occupancy request and sending an RTA-NTS frame.

Figure 41:
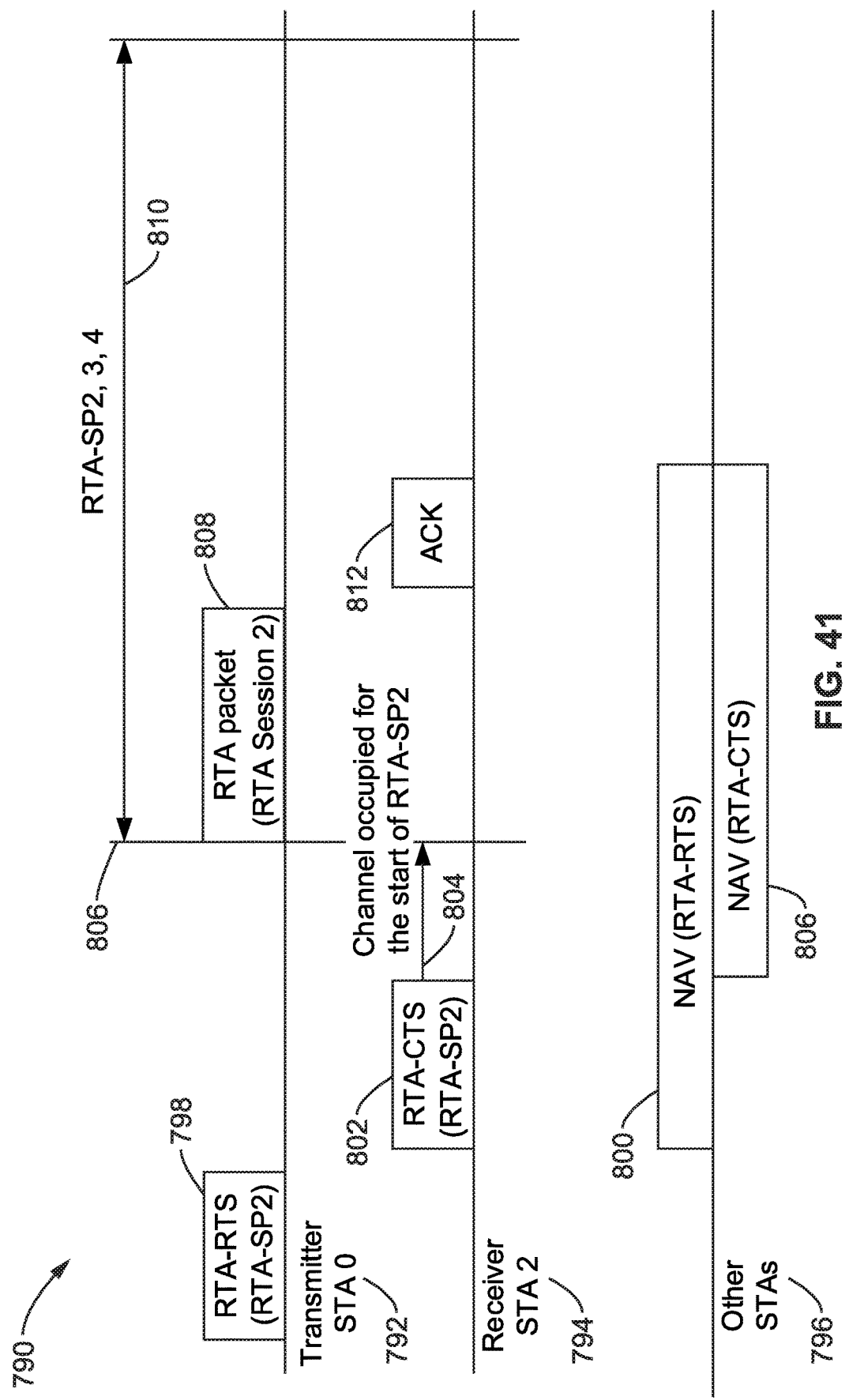
FIG. 41 is a communication sequence diagram of a station using RTA-RTS/CTS exchange to occupy the channel in advance for RTA-SP according to at least one embodiment of the present disclosure.
Figure 42:
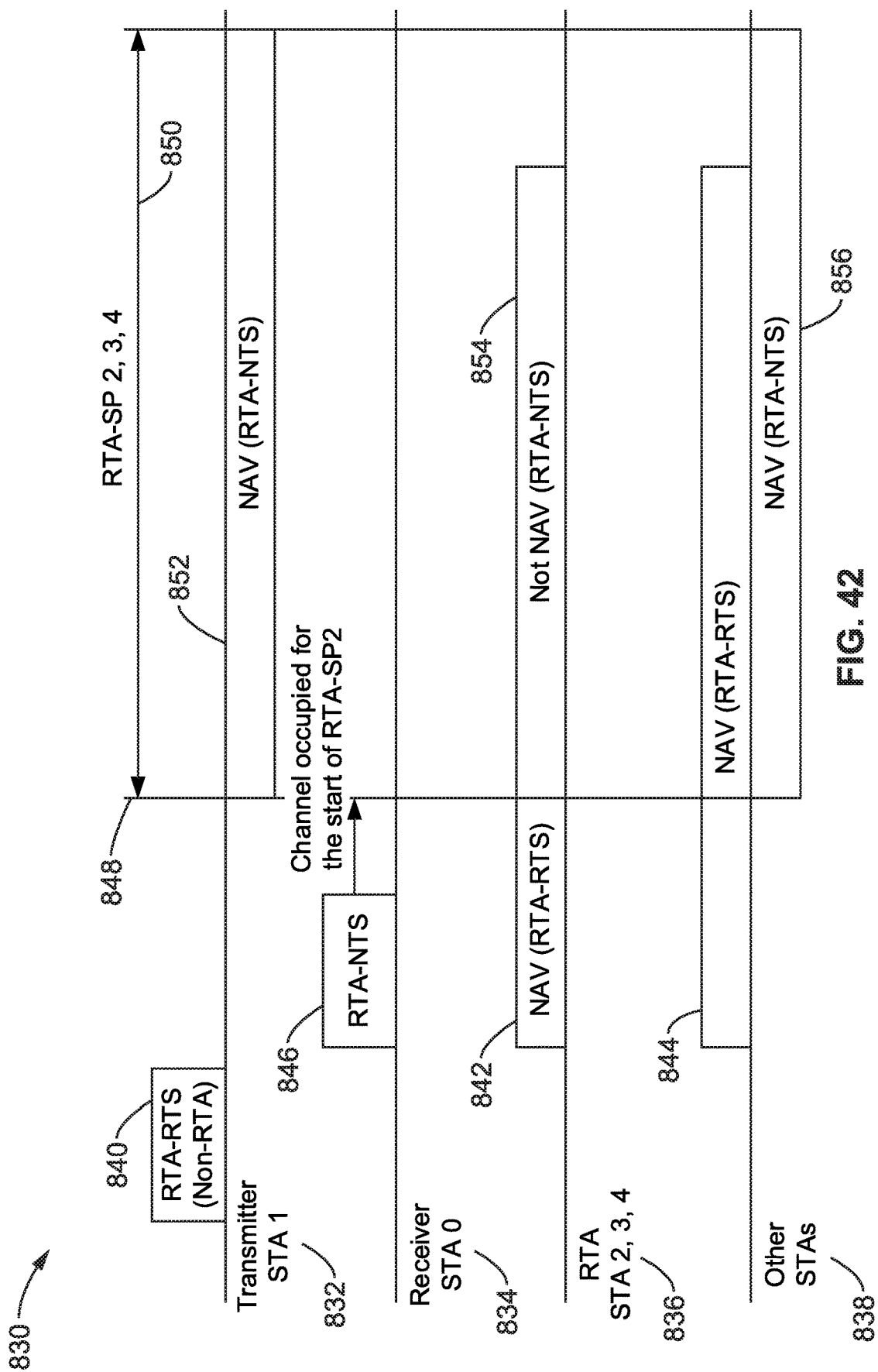
FIG. 42 is a communication sequence diagram of how a station uses RTA-RTS/NTS exchange to occupy the channel in advance for RTA-SP according to at least one embodiment of the present disclosure.
Figure 43:
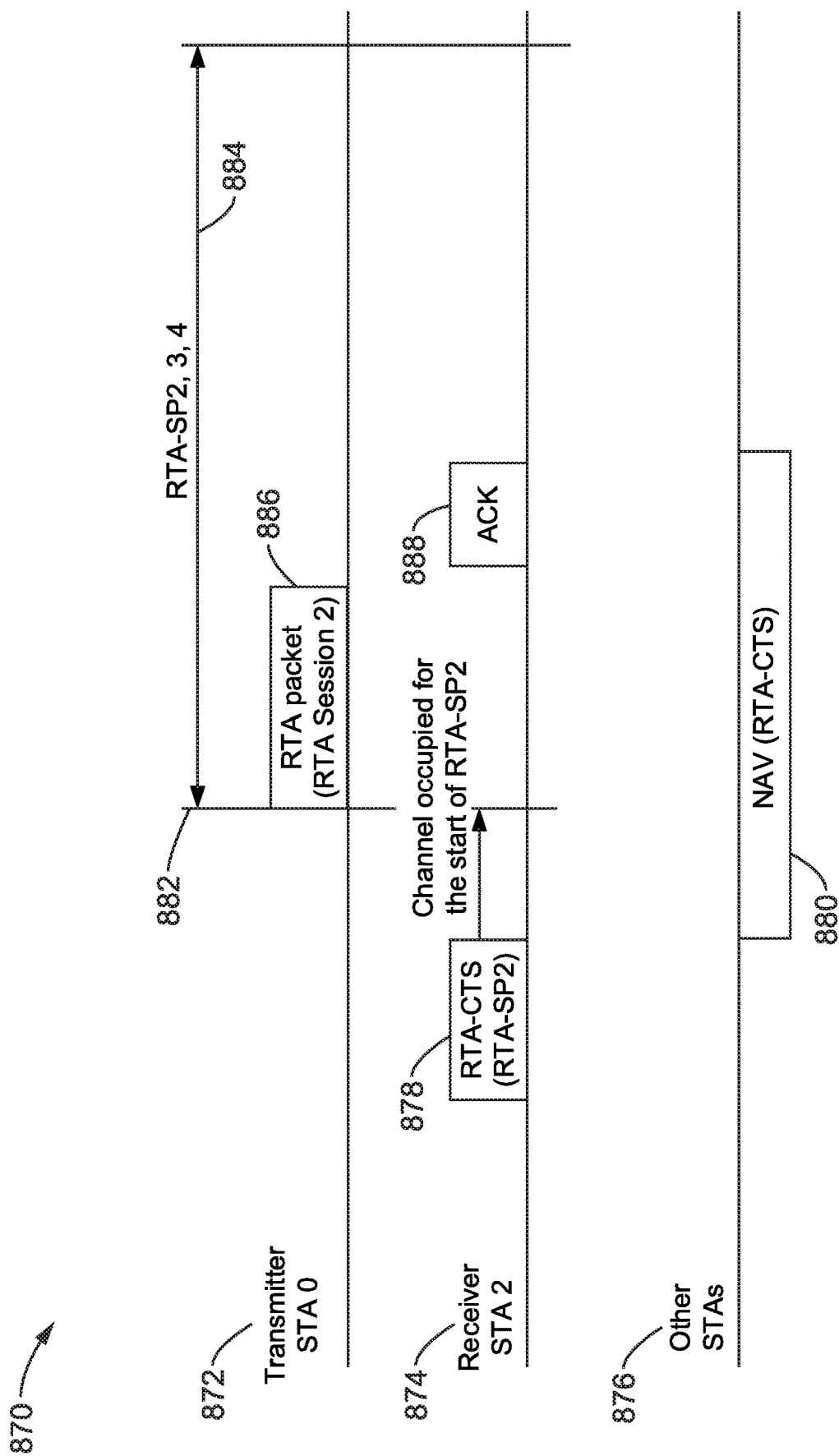
FIG. 43 is a communication sequence diagram of channel occupancy for RTA-SP, showing interaction between stations according to at least one embodiment of the present disclosure.

FIG. 41 through FIG. 43 illustrate an example embodiment 790, 830, 890 explaining how RTA-RTS/CTS/NTS exchange is used for channel occupancy in advance for RTA-SPs. All the examples consider the scenario as shown in FIG. 33 when STA 0 occupies the channel in advance for RTA-SP 2. Multiple options are provided to occupy the channel in advance.

In FIG. 41 is an example 790 is shown of how a STA uses RTA-RTS/CTS exchange to occupy the channel in advance for RTA-SP. The figure depicts the interaction between transmitter STA0 792, receiver STA2 794 and other STAs 796. STA 0 generates 798 an RTA-RTS frame carrying traffic information to indicate the channel occupancy request for RTA-SP2 and sends it to STA 2. STA 2 receives the RTA-RTS frame from STA 0. It extracts the traffic information carried by the RTA-RTS frame and compares it with the RTA-SPs listed in its RTA channel scheduling table. STA 2 recognizes that the RTA-RTS frame is requesting channel occupancy for RTA-SP2 and sends 802 an RTA-CTS frame back to STA 0, with the channel occupied 804 for the start of RTA-SP2. When STA 0 receives the RTA-CTS frame, the channel is occupied 806 successfully, and the RTA packet is 808 is sent, with an ACK 812 sent back from receiver STA2. The figure depicts time period 810 for RTA-SP2, RTA-SP3, and RTA-SP4.

Other STAs 796 are receiving these transmission and sets NAV 800 in response to RTA-RTS, and NAV 806 in response to RTA-CTS as was shown in FIG. 37. Accordingly, STA 0 can transmit RTA packets generated by RTA session 2 at the beginning of RTA-SP 2 over the channel without contention issues.

In FIG. 42 is an example 830 of how a STA uses RTA-RTS/NTS exchange to occupy the channel in advance for RTA-SP. The figure depicts the interaction between transmitter STA1 832, receiver STA0 834, RTA STAs 2, 3, 4 836 and other STAs 838. In this example, the RTA-SP is able to occupy the channel in advance by rejecting the channel occupancy request from other STAs. As was shown in FIG. 33, before RTA-SP 2 starts, the channel stays in CBAP for non-RTA traffic transmission.

In the example scenario of FIG. 42, when the CBAP is close to its end, STA 1 sends 840 an RTA-RTS to STA 0 for with a channel occupancy request. According to the traffic information carried by the STA 1, the traffic is non-RTA. As explained in FIG. 37, all the STAs except STA 0 will set the NAV. However, the channel occupancy time, starting at 848, is overlapped with the period time 850 of RTA-SPs 2, 3, 4. So STA 0 must reject the channel occupancy request from STA 1 to protect the channel time for RTA-SPs 2, 3, 4. It sends 846 an RTA-NTS frame to STA 1 as well as to STAs 2, 3, 4, who are involved in RTA-SPs 2, 3, 4. The Duration field of the RTA-NTS frame is set to the period time of RTA-SPs 2, 3, 4. The Start Time of Channel Occupancy field of the RTA-NTS frame is set to the start time of RTA-SPs 2, 3, 4. When STAs 2, 3, 4 receive the RTA-NTS frame, they change NAV 842 to a notNAV 854 that occupies the duration time of RTA-SPs 2, 3, 4. STA 1 recognizes that the channel is occupied and sets NAV (RTS-NTS) 852 since the channel occupancy request was rejected. The other STAs also set NAV (RTA-RTS) 844, then at time 848 also set 856 NAV (RTS-NTS) to reserve the channel time for RTA-SPs 2, 3, 4.

The example in FIG. 42 shows operation of the channel occupancy request for non-RTA traffic that is rejected if the channel occupancy time is overlapped with the RTA-SPs. If the traffic information carried by the RTA-RTS frame in the example is RTA traffic instead of non-RTA traffic, it is possible that the channel occupancy request for RTA traffic also gets rejected. As was shown in FIG. 40, if the priority of the RTA traffic indicated in the RTA-RTS frame is not higher than the priority of the RTA-SPs, the channel occupancy request will be rejected. In the example shown in this figure, if priority of the RTA traffic indicated in the RTA-RTS frame is not higher than 5 (the priority of RTA session 2), the channel occupancy request will be rejected.

In FIG. 43 is another example 870 of channel occupancy for RTA-SP, showing interaction between transmitter STA0 872, receiver STA2 874 and other STAs 876. In this example, the channel occupancy is not launched by RTA-RTS frame as shown in FIG. 39 and FIG. 40, but in the case of FIG. 43 it is possible that the receiver STA in the RTA-SP sends an RTA-CTS frame 878 to the transmitter STA for channel occupancy. This request is received prior to time 882 with the start of the RTA-SP2-4 884.

So in this example before RTA-SP 2 882 commences, STA 2 sends 878 an RTA-CTS frame to occupy the channel in advance. When the other STAs receive the RTA-CTS frame, they set the NAV 880 as was seen in FIG. 37.

The decision of launching the channel occupancy in advance by RTA-RTS frame or RTA-CTS frame can be made by the time before the start of RTA-SP. For example, if the time before the start of RTA-SP is enough for RTA-RTS/CTS/NTS exchange, the channel occupancy is launched by the RTA-RTS frame as shown in FIG. 41 and FIG. 42. Otherwise, the channel occupancy is launched by the RTA-CTS frame as shown in FIG. 43. In this case we see STA 0 transmitting 886 RTA packet (RTA Session 2), which is ACKnowledged 888 by STA 2.

4.7.3. Packet Reception

This section explains the details of how the STA is able to decide whether to receive the packets during RTA-SP using RTA-RTS/CTS/NTS exchange, especially the packets that are not scheduled to transmit during RTA-SP. The goal is to ensure the STA can occupy the channel during the RTA-SPs to transmit RTA packets. Toward that goal, the STA is configured to be able to reject packet reception during RTA-SP by rejecting the channel occupancy request from RTS or RTA-RTS frame.

When the transmitter STA transmits a packet, it may send a regular RTS frame or an RTA-RTS frame first for a channel occupancy request. When the receiver STA receives the RTS frame or RTA-RTS frame, it is able to decide whether to grant the request and receive the packet from the transmitter STA by sending a CTS frame or RTA-CTS frame, or to reject the request and not receive the packet from the transmitter STA by sending a RTA-NTS frame.

Figure 44:
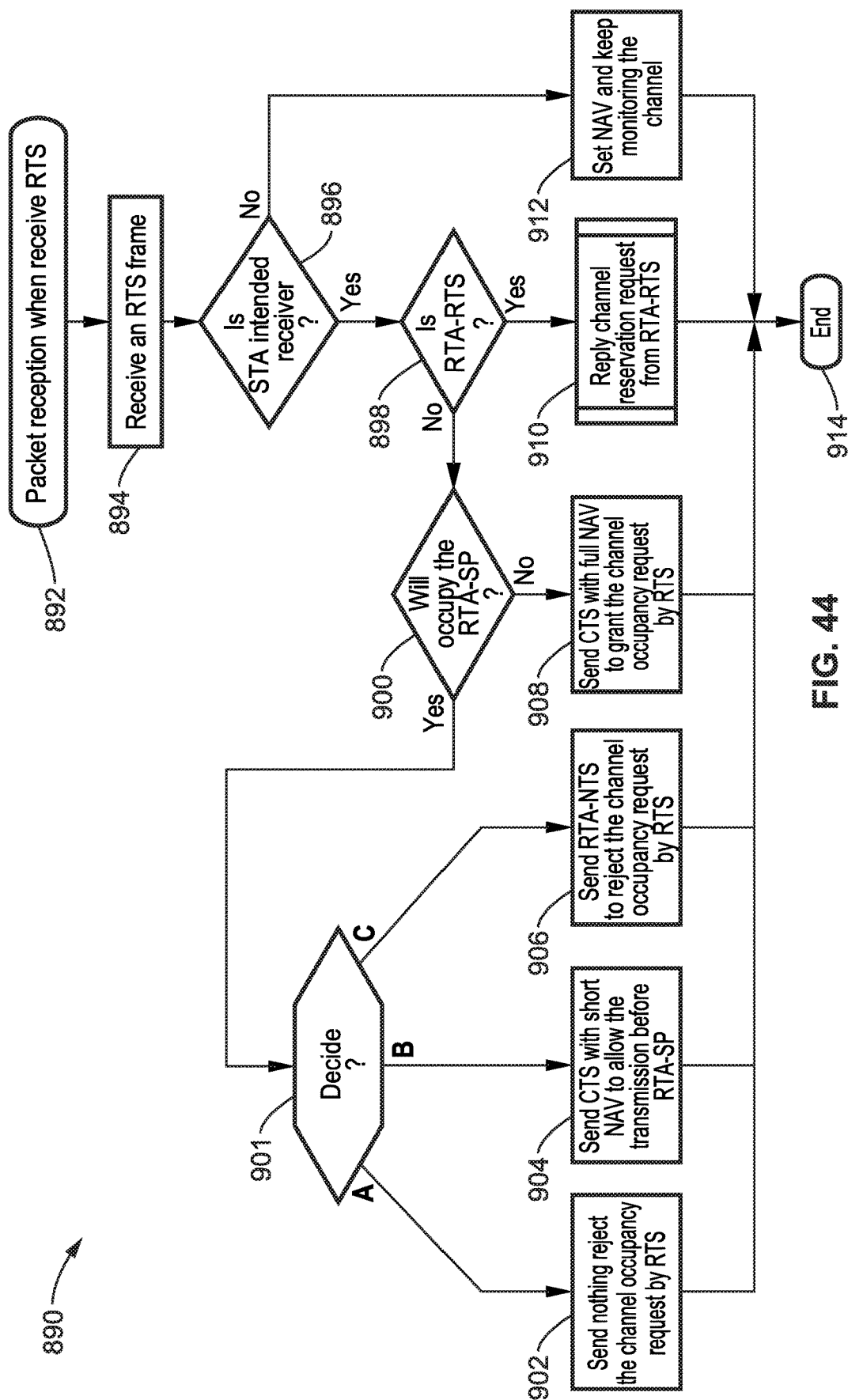
FIG. 44 is a flow diagram of the operation of a STA when it receives an RTS frame for packet reception according to at least one embodiment of the present disclosure.

FIG. 44 illustrates an example embodiment 890 of the operation of a STA when it receives an RTS frame for packet reception. The process starts 892 and the STA receives 894 an RTS frame and determines 896 whether it is the intended receiver. If the STA is not the intended receiver, then at block 912 it sets the NAV and continues monitoring the channel, wherein the process ends 914.

If, however, the STA is the intended receiver, then execution moves from check 896 to check 898 which determines whether the RTS frame is an RTA-RTS frame or a regular RTS frame. If the frame is RTA-RTS, then execution reaches block 910 with the STA generating a reply to the channel reservation as was described in FIG. 40.

However, if it is determined at block 898 that the frame is a regular RTS, then check 900 determines whether the channel occupancy time requested by the RTS frame conflicts the duration time of any RTA-SP. If there is no conflict, then the STA sends 908 a CTS frame with full NAV to grant the channel occupancy request by RTS.

Otherwise, if a conflict is detected at block 900 then a decision at block 901 determines one of three options (A, B or C) that the STA can choose to protect RTA-SP.

(A) The STA sends 906 an RTA-NTS to reject the channel occupancy. It will be noted that the transmitter STA of the RTS frame may not be able to recognize the RTA-NTS frame. The purpose of sending the RTA-NTS frame is to remove the NAV at the STAs who has RTA-SPs affected by the NAV setting due to the RTS frame.

(B) The STA sends 904 a regular CTS with short NAV (Duration field in the frame) to shorten the channel occupancy time requested by the RTS. The NAV will be ended before the start of RTA-SP. The STA who sends RTS is allowed to use the channel time before the start of RTA-SP to transmit packets.

(C) The STA sends 902 nothing to reject the channel occupancy request by RTS. The packet transmission is stopped because of the failure in RTS/CTS exchange. The STAs who are involved in the RTA-SP remove the NAV during the RTA-SP by their own decisions. That is, if the NAV overlaps the RTA-SPs, the NAV set by the RTS for lower priority RTA traffic or non-RTA traffic will be removed at the STAs who are involved in the those RTA-SPs.

The examples shown in previous FIG. 42 (explained in Section 4.7.2.) and in FIG. 45 below explain how STA uses RTA-RTS/CTS/NTS to ensure channel occupancy for the RTA traffic transmission during RTA-SPs by rejecting RTA and non-RTA packet receptions. Both of the examples consider the scenario as shown in FIG. 33 when STA 0 occupies the channel in advance for RTA-SP 2.

Figure 45:
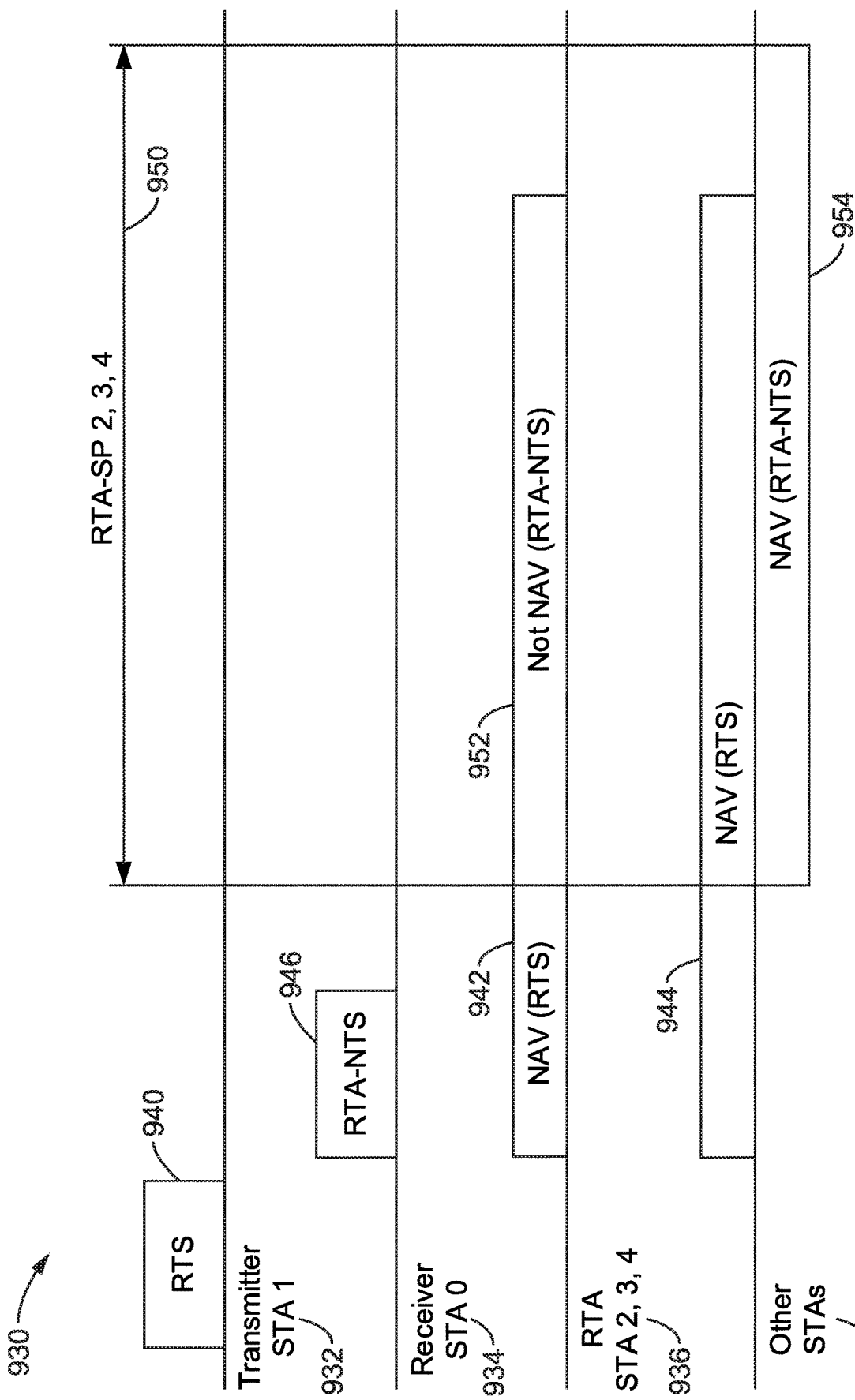
FIG. 45 is a communication sequence diagram of rejecting non-RTA packet reception by RTA-NTS when RTS/CTS is enabled according to at least one embodiment of the present disclosure.

FIG. 45 illustrates an example embodiment 930 of rejecting non-RTA packet reception by RTA-NTS when RTS/CTS is enabled. The figure depicts communication between transmitter STA1 932, receiver STA0 934, RTA STA2-4 936 and other STAs 938. STA 1 transmits 940 a regular RTS frame to STA 0. When STA 0 receives an RTS frame, since it has an impact on the RTA-SP, it sends an RTA-NTS frame 946 to reject the channel occupancy request and the packet reception. Meanwhile, STA2-4, associated with RTA-SP 2, 3, 4 950, have set NAV (RTS) 942 in response to the RTS, have received the RTA-NTS frame 946 and remove the NAV, changing to notNAV (RTA-NTS) 952 for the portion that overlaps the duration time of RTA-SP 2, 3, 4. During the time between the end of RTA-NTS frame and the start of RTA-SP 2-4, STA 1 is able to use this period of time for packet transmission. The other stations 938 are seen setting NAV (RTS) 944 upon receiving RTS 940, and NAV (RTA-NTS) 954 in response to the received RTA-NTS 946.

Figure 46:
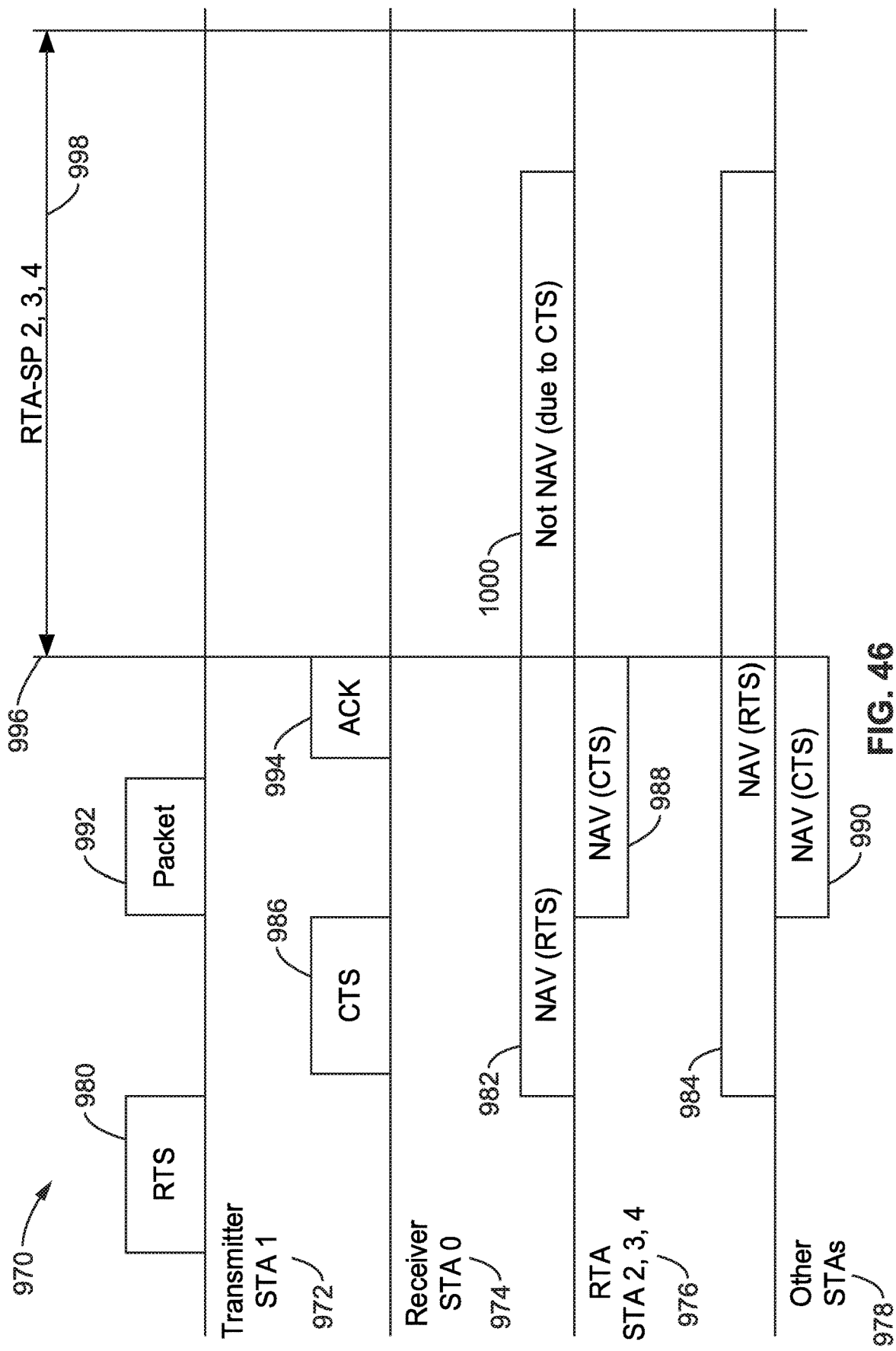
FIG. 46 is a communication sequence diagram of allowing non-RTA packet reception before the start of an RTA-SP according to at least one embodiment of the present disclosure.
Figure 47:
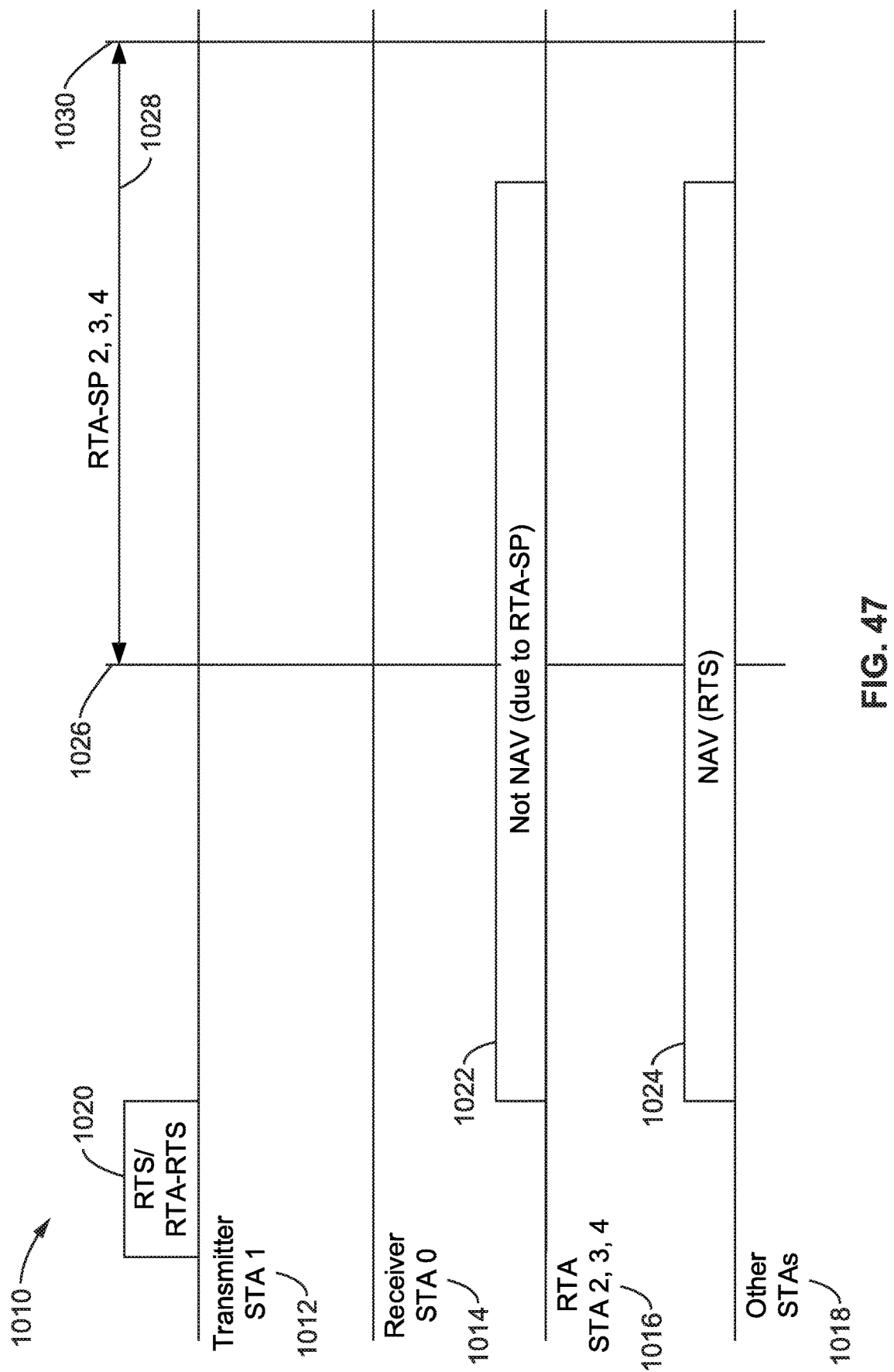
FIG. 47 is a communication sequence diagram of non-RTA packet reception being rejected by a no response when RTS/CTS is enabled according to at least one embodiment of the present disclosure.

FIG. 46 and FIG. 47 illustrate an example embodiment 970, 1010 explain how a STA uses regular RTS/CTS to ensure channel occupancy for the RTA traffic transmission during RTA-SPs by rejecting RTA and non-RTA packet receptions. Both of the examples consider the scenario as shown in FIG. 33 when STA 0 occupies the channel in advance for RTA-SP 2.

In FIG. 46 interaction 970 is seen between transmitter STA1 972, receiver STA0 974, RTA STA2, 3, 4 976 and other STAs 978, in the scenario of allowing non-RTA packet reception before the start of RTA-SP 2, 3, 4 996 by sending a CTS frame with short NAV duration. This option is seen in block 904 of FIG. 44. Referring again to FIG. 46, STA1 sends RTS 980, which is received by STA 0, that sends a CTS frame 986 back with short NAV. The duration of the NAV in CTS frame ends before the start 996 of RTA-SP 2, 3, 4 998. In response to the CTS, STA1 knows to use the duration of NAV set by the CTS frame for packet transmission, and it transmits packet 992 which is ACKnowledged 994 by STA 1.

When STA 2, 3, 4 receives RTS 980 they set NAV (RTS) 982, and after CTS frame 986 they set short NAV (CTS) 988 to adjust the NAV setting accordingly. At the beginning of time RTA-SP 2, 3, 4 these stations set notNAV (cue to CTS) 1000, for example, they reset the NAV to the Duration field of the CTS frame. The other STAs set the NAV as usual, with NAV (RTS) 984 in response to RTS and a short NAV (CTS) 990 in response to CTS 986.

In FIG. 47 an example 1010 is seen of interaction between transmitter STA1 1012, receiver STA0 1014, RTA STA2-4 1016 and other STAs 1018, in which non-RTA packet reception is rejected by no response when RTS/CTS is enabled, that is of rejecting non-RTA packet reception by not responding to the RTS frame. This option is shown in block 902 of FIG. 44. Returning to FIG. 47, STA1 1012 sends 1020 an RTS/RTA-RTS. After STA 0 receives RTS frame 1020 from STA 1, it notices that the channel occupancy time requested by the RTS frame overlaps the RTA-SPs 1028. STA 0 can simply reject the channel occupancy request by taking no action. STA 2, 3, 4, having upcoming RTA-SP 2, 3, 4 1028 starting at time 1026, and ending at 1030, can decide to not NAV 1022 since they did not hear any response for the RTS frame. The other stations 1018 set NAV (RTS) 1024 in response to RTS 1020.

During the RTA-SP, there is at least one exception in which a STA may accept the channel occupancy request and receive the packet that is not scheduled by RTA-SP. As seen in blocks 766 and 770 of FIG. 40, if the packet is an RTA packet with higher priority than the priority of the RTA-SP, the STA is able to receive the packet.

Figure 48:
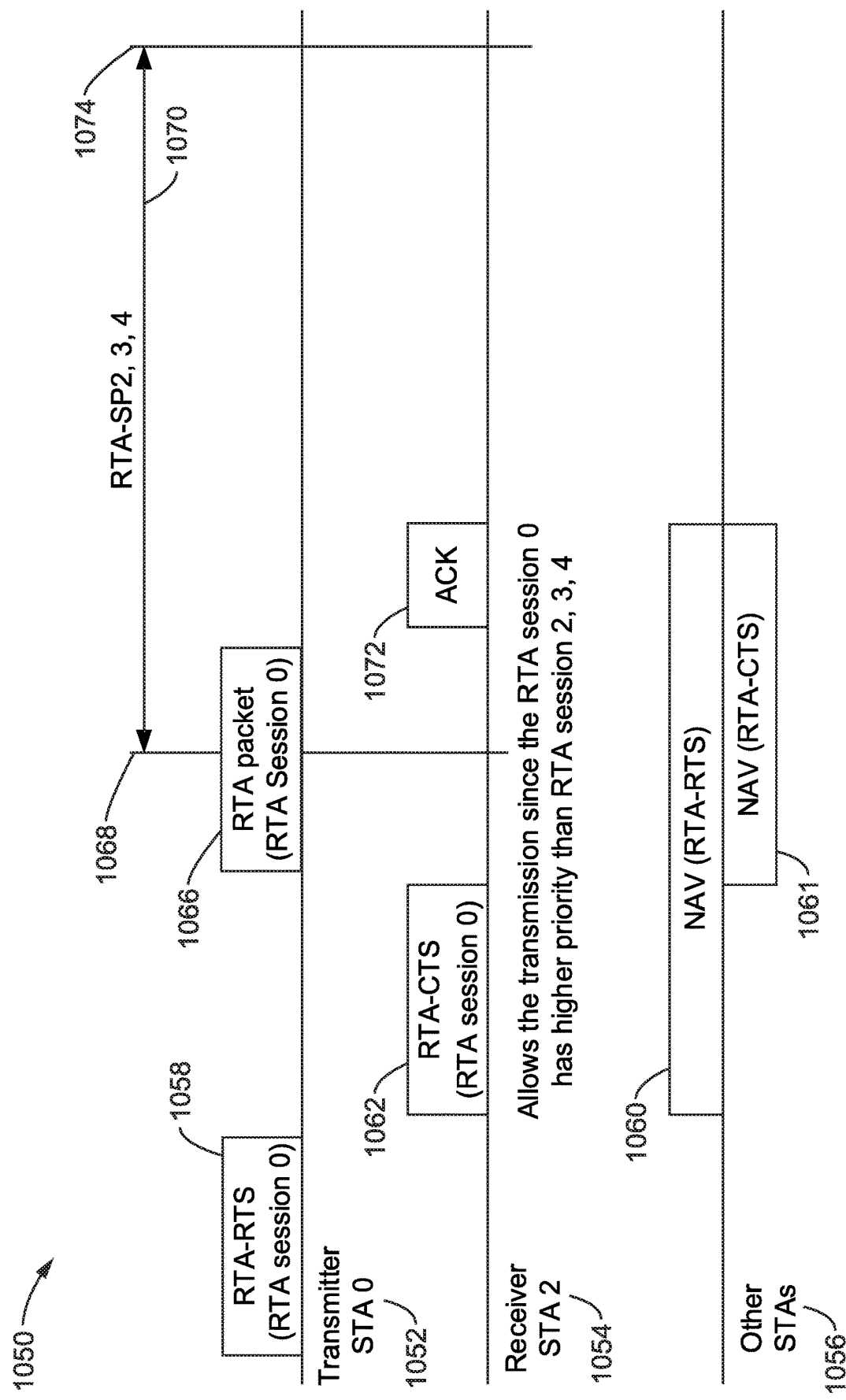
FIG. 48 is a communication sequence diagram of accepting RTA packet reception when the RTA-SP is affected according to at least one embodiment of the present disclosure.

FIG. 48 illustrates an example embodiment 1050 of accepting RTA packet reception when the RTA-SP is affected. The figure depicts interaction between transmitter STA0 1052, receiver STA2 1054, and other STAs 1056. In this example RTA-SPs 2, 3, 4 1070 is scheduled in the near future to start at 1068 and end at 1074. The communication commences with STA 0 sending an RTA-RTS frame 1058 to occupy the channel for transmitting RTA packet generated by RTA session 0. As shown in Table 7, the priority of RTA session 0 is 6 which is higher than the priority of RTA-SPs 2, 3, 4. In response to this RTS, STA 2 sends an RTA-CTS frame 1062 to grant channel occupancy and receive the RTA packet 1066 transmitted from STA 0, which it then ACKnowledges 1072. The other STAs 1056 set NAV (RTA-RTS) 1060 and then NAV (RTA-CTS) 1061.

5. General Scope of Embodiments

The enhancements described in the presented technology can be readily implemented within various wireless communication circuits. It should also be appreciated that wireless communication circuits are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with wireless packet communications. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating with at least one other wireless local area network (WLAN) station in its reception area; (b) a processor coupled to said wireless communication circuit within a station configured for operating on the WLAN; (c) a non-transitory memory storing instructions executable by the processor; and (d) wherein said instructions, when executed by the processor, perform one or more steps comprising: (d)(i) operating said wireless communication circuit as a WLAN station configured to support communicating real-time application (RTA) packets that are sensitive to communication delays as well as communicating non-real time packets; (d)(ii) distinguishing real-time application (RTA) packets from non-real-time application (non-RTA) packets; (d)(iii) utilizing carrier sense multiple access/collision avoidance (CSMA/CA) in which real time application (RTA) traffic and non-RTA traffic coexist; (d)(iv) maintaining an RTA scheduling table for tracking active RTA sessions and managing transmission times for RTA traffic; (d)(v) scheduling channel time based on the expected RTA packet arrival time; and (d)(vi) rejecting other packet transmissions during the scheduled channel time for RTA packet.

2. An apparatus for wireless communication in a network, the apparatus comprising: (a) a wireless communication circuit configured for wirelessly communicating with at least one other wireless local area network (WLAN) station in its reception area; (b) a processor coupled to said wireless communication circuit within a station configured for operating on the WLAN; (c) a non-transitory memory storing instructions executable by the processor; and (d) wherein said instructions, when executed by the processor, perform one or more steps comprising: (d)(i) operating said wireless communication circuit as a WLAN station configured to support communicating real-time application (RTA) packets that are sensitive to communication delays as well as non-real time packets; (d)(ii) distinguishing real-time application (RTA) packets from non-real-time application (non-RTA) packets by making a determination based on prior negotiation, or packet header information, or a combination of prior negotiation and packet header information; (d)(iii) utilizing carrier sense multiple access/collision avoidance (CSMA/CA) in which real time application (RTA) traffic and non-RTA traffic coexist; and (d)(iv) maintaining an RTA scheduling table for tracking active RTA sessions based on RTA session information embedded in packet headers and managing transmission times for RTA traffic; (d)(v) scheduling channel time based on the expected RTA packet arrival time; and (d)(vi) rejecting other packet transmissions during the scheduled channel time for RTA packet.

3. A method of performing wireless communication in a network, comprising: (a) operating a wireless communication circuit, configured for wirelessly communicating with at least one other wireless local area network (WLAN) station in its reception area, as a WLAN station configured to support communicating real-time application (RTA) packets that are sensitive to communication delays as well as non-real time packets; (b) distinguishing real-time application (RTA) packets from non-real-time application (non-RTA) packets; (c) utilizing carrier sense multiple access/collision avoidance (CSMA/CA) in which real time application (RTA) traffic and non-RTA traffic coexist; (d) maintaining an RTA scheduling table for tracking active RTA sessions and managing transmission times for RTA traffic; (e) scheduling channel time based on the expected RTA packet arrival time; and (f) rejecting other packet transmissions during the scheduled channel time for RTA packet.

4. An apparatus for performing wireless communication of packets, where CSMA/CA is applied, and the real time application (RTA) traffic and non-RTA traffic coexist, comprising: (a) stations distinguishing RTA traffic and non-RTA traffic; (b) stations keeping track of active RTA sessions and managing transmission times for RTA traffic; (c) stations scheduling channel time based on expected RTA packet arrival; and (d) stations rejecting other packet transmissions during the scheduled channel time for the RTA packet.

5. The apparatus or method of any preceding embodiment, wherein said instructions when executed by the processor perform one or more steps in distinguishing real-time application (RTA) packets from non-real-time application (non-RTA) packets comprising making a determination based on prior negotiation, or packet header information, or a combination of prior negotiation and packet header information.

6. The apparatus or method of any preceding embodiment, wherein said instructions when executed by the processor perform one or more steps in tracking active RTA sessions comprising performing said tracking based on RTA session information embedded in packet headers.

7. The apparatus or method of any preceding embodiment, wherein said instructions when executed by the processor perform one or more steps further comprising scheduling a specific period of channel time for a given RTA packet and rejecting a request to send (RTS) that requires channel time that is not associated with that given RTA packet during that period.

8. The apparatus or method of any preceding embodiment, wherein said instructions when executed by the processor perform one or more steps further comprising scheduling a specific period of channel time for an RTA packet and responds to a request to send (RTS) frame based on information found in said RTA scheduling table.

9. The apparatus or method of any preceding embodiment, wherein said instructions when executed by the processor perform one or more steps further comprising scheduling a specific period of channel time for an RTA packet and reject non-RTA packet reception if it is determined that any RTA transmissions are scheduled within that period of time.

10. The apparatus or method of any preceding embodiment, wherein said instructions when executed by the processor perform one or more steps further comprising scheduling a specific period of channel time for transmitting an RTA packet in a CTS frame with a shortened transmission opportunity (TXOP) to reserve a channel for near future use.

11. The apparatus or method of any preceding embodiment, wherein said instructions when executed by the processor perform one or more steps further comprising scheduling a specified period of channel time for an RTA packet and transmitting a not clear to send (NotCTS) frame to notify nearby stations of channel busy over the specified period of time.

12. The apparatus or method of any preceding embodiment, wherein said instructions when executed by the processor perform one or more steps further comprising scheduling a specific period of channel time for a given RTA packet and rejecting a request to send (RTS) that requires channel time that is not associated with that given RTA packet during that period.

13. The apparatus or method of any preceding embodiment, wherein said instructions when executed by the processor perform one or more steps further comprising scheduling a specific period of channel time for an RTA packet and responds to a request to send (RTS) frame based on information found in said RTA scheduling table.

14. The apparatus or method of any preceding embodiment, wherein said instructions when executed by the processor perform one or more steps further comprising scheduling a specific period of channel time for an RTA packet and reject non-RTA packet reception if it is determined that any RTA transmissions are scheduled within that period of time.

15. The apparatus or method of any preceding embodiment, wherein said instructions when executed by the processor perform one or more steps further comprising scheduling a specific period of channel time for transmitting an RTA packet in a CTS frame with a shortened transmission opportunity (TXOP) to reserve a channel for near future use.

16. The apparatus or method of any preceding embodiment, wherein said instructions when executed by the processor perform one or more steps further comprising scheduling a specified period of channel time for an RTA packet and transmitting a not clear to send (NotCTS) frame to notify nearby stations of channel busy over the specified period of time.

17. The apparatus or method of any preceding embodiment, further comprising distinguishing real-time application (RTA) packets from non-real-time application (non-RTA) packets by making a determination based on prior negotiation, or packet header information, or a combination of prior negotiation and packet header information;

18. The apparatus or method of any preceding embodiment, wherein said tracking active RTA sessions comprises performing said tracking based on RTA session information embedded in packet headers.

19. The apparatus or method of any preceding embodiment, further comprising scheduling a specific period of channel time for a given RTA packet and rejecting a request to send (RTS) that requires channel time that is not associated with that given RTA packet during that period.

20. The apparatus or method of any preceding embodiment, further comprising scheduling a specific period of channel time for an RTA packet and responds to a request to send (RTS) frame based on information found in said RTA scheduling table.

21. The apparatus or method of any preceding embodiment, further comprising scheduling a specific period of channel time for an RTA packet and rejecting non-RTA packet reception if it is determined that any RTA transmissions are scheduled within that period of time.

22. The apparatus or method of any preceding embodiment, further comprising scheduling a specific period of channel time for transmitting an RTA packet in a CTS frame with a shortened transmission opportunity (TXOP) to reserve a channel for future use.

23. The apparatus or method of any preceding embodiment, further comprising scheduling a specified period of channel time for an RTA packet and transmitting a not clear to send (NotCTS) frame to notify nearby stations of channel busy over the specified period of time.

24. The apparatus or method of any preceding embodiment, wherein stations distinguishing the RTA traffic and non-RTA traffic based on using information based on prior negotiation or packet header information.

25. The apparatus or method of any preceding embodiment, wherein stations tracking active RTA sessions are configured to embed RTA session information in the packet header.

26. The apparatus or method of any preceding embodiment, wherein a station scheduling a certain period of channel time for an RTA packet is configured for rejecting a request to send (RTS) which would require channel time that is not for that RTA packet during that period.

27. The apparatus or method of any preceding embodiment, wherein a station scheduling a certain period of channel time for a RTA packet is configured to respond to a request to send (RTS) frame depending on the RTA schedule.

28. The apparatus or method of any preceding embodiment, wherein a station scheduling a certain period of channel time for an RTA packet would reject non-RTA packet reception if it knows that RTA transmissions will be scheduled in the near future.

29. The apparatus or method of any preceding embodiment, wherein a station scheduling a certain period of channel time for an RTA packet is configured for transmitting a clear to send (CTS) frame with shortened TXOP to reserve the channel for the near future.

30. The apparatus or method of any preceding embodiment, wherein a station scheduling a certain period of channel time for an RTA packet is configured to transmit a NotCTS frame to notify that the channel will be busy in the near future.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Header Information for Identifying RTA Traffic at the Transmitter Side | |
|---|---|
| Layers | Header information |
| APP | RTA session id, RTA session name, signature |
| Transport | TCP/UDP port numbers |
| Network | IP address of source & destination, type of service |

TABLE 2

| List of RTA Session Status | |
|---|---|
| RTA Session Status | Action in Status |
| Active | Session is active to generate traffic |
| Inactive | Session is disabled to not generate traffic |
| Error | Session has error(s) |

TABLE 3

| RTA Session Status at STA 0 | | | | | | | | | | |
|---|---|---|---|---|---|---|---|---|---|---|
| # | Tx | Rx | Start Time (mS) | End Time (mS) | Time Alloc. (mS) | RU Alloc. | SS Alloc. | Per. Time (mS) | Pri. | Sess Stat. |
| 0 | STA0 | STA2 | 0 | 900 | 1 | Ran | Ran | 0 | 6 | Act |
| 1 | STA1 | STA0 | 1 | 900 | 1 | Ran | Ran | 10 | 5 | Act |
| 2 | STA0 | STA2 | 3 | 800 | 3 | Ran | Ran | 20 | 5 | Act |
| 3 | STA0 | STA3 | 3 | 800 | 3 | Ran | Ran | 20 | 4 | Act |
| 4 | STA0 | STA4 | 3 | 800 | 3 | Ran | Ran | 20 | 4 | Act |

Allocations: Ran = Random

Session Status: Act = Active

TABLE 4

RTA Sessions at STA0 after Initiating Session 5 with STA2

| # | Tx | Rx | Start Time (mS) | End Time (mS) | Time Alloc. (mS) | RU Alloc. | SS Alloc. | Per. Time (mS) | Pri. | Sess Stat. |
|---|------|------|---|------|---|-----|-----|----|---|-----|
| 0 | STA0 | STA2 | 0 | 900  | 1 | Ran | Ran | 0  | 6 | Act |
| 1 | STA1 | STA0 | 1 | 900  | 1 | Ran | Ran | 10 | 5 | Act |
| 2 | STA0 | STA2 | 3 | 800  | 3 | Ran | Ran | 20 | 5 | Act |
| 3 | STA0 | STA3 | 3 | 800  | 3 | Ran | Ran | 20 | 4 | Act |
| 4 | STA0 | STA4 | 3 | 800  | 3 | Ran | Ran | 20 | 4 | Act |
| 5 | STA0 | STA2 | 6 | 1000 | 4 | RU1 | SS1 | 10 | 3 | Act |

Allocations: Ran = Random
Session Status: Act = Active

TABLE 5

RTA sessions at STA0 after Updating RTA Session 5 with STA2

| # | Tx | Rx | Start Time (mS) | End Time (mS) | Time Alloc. (mS) | RU Alloc. | SS Alloc. | Per. Time (mS) | Pri. | Sess Stat. |
|---|------|------|---|------|---|-----|-----|----|---|-----|
| 0 | STA0 | STA2 | 0 | 900  | 1 | Ran | Ran | 0  | 6 | Act |
| 1 | STA1 | STA0 | 1 | 900  | 1 | Ran | Ran | 10 | 5 | Act |
| 2 | STA0 | STA2 | 3 | 800  | 3 | Ran | Ran | 20 | 5 | Act |
| 3 | STA0 | STA3 | 3 | 800  | 3 | Ran | Ran | 20 | 4 | Act |
| 4 | STA0 | STA4 | 3 | 800  | 3 | Ran | Ran | 20 | 4 | Act |
| 5 | STA0 | STA2 | 6 | 1000 | 4 | RU1 | SS1 | 5  | 3 | Err |

Allocations: Ran = Random
Session Status: Act = Active, Err = Error

TABLE 6

RTA Session at STA0 after Finishing RTA Session 5 with STA2

| # | Tx | Rx | Start Time (mS) | End Time (mS) | Time Alloc. (mS) | RU Alloc. | SS Alloc. | Per. Time (mS) | Pri. | Sess Stat. |
|---|------|------|---|-----|---|-----|-----|----|---|-----|
| 0 | STA0 | STA2 | 0 | 900 | 1 | Ran | Ran | 0  | 6 | Act |
| 1 | STA1 | STA0 | 1 | 900 | 1 | Ran | Ran | 10 | 5 | Act |
| 2 | STA0 | STA2 | 3 | 800 | 3 | Ran | Ran | 20 | 5 | Act |
| 3 | STA0 | STA3 | 3 | 800 | 3 | Ran | Ran | 20 | 4 | Act |
| 4 | STA0 | STA4 | 3 | 800 | 3 | Ran | Ran | 20 | 4 | Act |

Allocations: Ran = Random
Session Status: Act = Active

TABLE 7

RTA Session at STA0 after Receiving RTA Announcement from STA5

| # | Tx | Rx | Start Time (mS) | End Time (mS) | Time Alloc. (mS) | RU Alloc. | SS Alloc. | Per. Time (mS) | Pri. | Sess Stat. |
|---|------|------|---|------|---|-----|-----|----|---|-----|
| 0 | STA0 | STA2 | 0 | 900  | 1 | Ran | Ran | 0  | 6 | Act |
| 1 | STA1 | STA0 | 1 | 900  | 1 | Ran | Ran | 10 | 5 | Act |
| 2 | STA0 | STA2 | 3 | 800  | 3 | Ran | Ran | 20 | 5 | Act |
| 3 | STA0 | STA3 | 3 | 800  | 3 | Ran | Ran | 20 | 4 | Act |
| 4 | STA0 | STA4 | 3 | 800  | 3 | Ran | Ran | 20 | 4 | Act |
| 5 | STA6 | STA5 | 6 | 1000 | 4 | RU1 | SS1 | 10 | 3 | Act |
| 6 | STA7 | STA5 | 6 | 1000 | 4 | RU2 | SS2 | 10 | 3 | Act |

Allocations: Ran = Random
Session Status: Act = Active

TABLE 8

RTA channel scheduling table at STA0 at time 0 ms

| SP# | Sess. ID | Period St. Time (mS) | Period End Time (mS) | RU Alloc. | SS Alloc. | Pri. | Activity |
|---|---|---|---|---|---|---|---|
| 1 | 1 | 1 | 2 | Ran | Ran | 5 | Rx |
| 2 | 2 | 3 | 6 | Ran | Ran | 5 | Tx |
| 3 | 3 | 3 | 6 | Ran | Ran | 4 | Tx |
| 4 | 4 | 3 | 6 | Ran | Ran | 4 | Tx |
| 5 | 5 | 6 | 10 | RU1 | SS1 | 3 | Listen |
| 6 | 6 | 6 | 10 | RU2 | SS2 | 3 | Listen |

Allocations: Ran = Random, RUn = Resource Unit "n", SSn—Spatial Stream "n"
Activity: Rx = Receiving, Tx = Transmitting, Listen = Listening

TABLE 9

RTA Channel Scheduling of STA 0 at Time of 2 mS

| SP# | Sess. ID | Period St. Time (mS) | Period End Time (mS) | RU Alloc. | SS Alloc. | Pri. | Activity |
|---|---|---|---|---|---|---|---|
| 2 | 2 | 3 | 6 | Ran | Ran | 5 | Tx |
| 3 | 3 | 3 | 6 | Ran | Ran | 4 | Tx |
| 4 | 4 | 3 | 6 | Ran | Ran | 4 | Tx |
| 5 | 5 | 6 | 10 | RU1 | SS1 | 3 | Listen |
| 6 | 6 | 6 | 10 | RU2 | SS2 | 3 | Listen |
| 7 | 1 | 11 | 12 | RAN | RAN | 5 | Rx |

Allocations: Ran = Random, RUn = Resource Unit "n", SSn—Spatial Stream "n"
Activity: Rx = Receiving, Tx = Transmitting, Listen = Listening

TABLE 10

RTA Channel Scheduling of STA 0 at Time of 4 mS

| SP# | Sess. ID | Period St. Time (mS) | Period End Time (mS) | RU Alloc. | SS Alloc. | Pri. | Activity |
|---|---|---|---|---|---|---|---|
| 2 | 2 | 3 | 6 | Ran | Ran | 5 | Tx |
| 4 | 4 | 3 | 6 | Ran | Ran | 4 | Tx |
| 5 | 5 | 6 | 10 | RU1 | SS1 | 3 | Listen |
| 6 | 6 | 6 | 10 | RU2 | SS2 | 3 | Listen |
| 7 | 1 | 11 | 12 | RAN | RAN | 5 | Rx |
| 8 | 3 | 23 | 26 | RAN | RAN | 4 | Tx |

Allocations: Ran = Random, RUn = Resource Unit "n", SSn—Spatial Stream "n"
Activity: Rx = Receiving, Tx = Transmitting, Listen = Listening

TABLE 11

RTA Channel Scheduling of STA 0 at Time of 6 mS

| SP# | Sess. ID | Period St. Time (mS) | Period End Time (mS) | RU Alloc. | SS Alloc. | Pri. | Activity |
|---|---|---|---|---|---|---|---|
| 5 | 5 | 6 | 10 | RU1 | SS1 | 3 | Listen |
| 6 | 6 | 6 | 10 | RU2 | SS2 | 3 | Listen |
| 7 | 1 | 11 | 12 | RAN | RAN | 5 | Rx |
| 9 | 2 | 23 | 26 | RAN | RAN | 5 | Tx |
| 8 | 3 | 23 | 26 | RAN | RAN | 4 | Tx |
| 10 | 4 | 23 | 26 | RAN | RAN | 4 | Tx |

Allocations: Ran = Random, RUn = Resource Unit "n", SSn—Spatial Stream "n"
Activity: Rx = Receiving, Tx = Transmitting, Listen = Listening

TABLE 12

RTA Channel Scheduling of STA 0 at Time of 10 mS

| SP# | Sess. ID | Period St. Time (mS) | Period End Time (mS) | RU Alloc. | SS Alloc. | Pri. | Activity |
|---|---|---|---|---|---|---|---|
| 7 | 1 | 11 | 12 | RAN | RAN | 5 | Rx |
| 11 | 5 | 16 | 20 | RU1 | SS1 | 3 | Listen |
| 12 | 6 | 16 | 20 | RU2 | SS2 | 3 | Listen |
| 9 | 2 | 23 | 26 | RAN | RAN | 5 | Tx |
| 8 | 3 | 23 | 26 | RAN | RAN | 4 | Tx |
| 10 | 4 | 23 | 26 | RAN | RAN | 4 | Tx |

Allocations: Ran = Random, RUn = Resource Unit "n", SSn—Spatial Stream "n"
Activity: Rx = Receiving, Tx = Transmitting, Listen = Listening

What is claimed is:

1. An apparatus for wireless communication in a network, the apparatus comprising:
    (a) a wireless communication circuit, as a WLAN station (STA), configured for wirelessly communicating with at least one other wireless local area network (WLAN) station in its reception area;
    (b) a processor coupled to said wireless communication circuit within a station configured for operating on the WLAN;
    (c) a non-transitory memory storing instructions executable by the processor; and
    (d) wherein said instructions, when executed by the processor, perform one or more steps comprising:
        (i) operating said wireless communication circuit as a WLAN station configured to support communicating real-time application (RTA) packets that are sensitive to communication delays as well as communicating non-real time packets, so that real time application (RTA) traffic and non-RTA traffic coexist;
        (ii) negotiating for an RTA session between said WLAN STA and another STA on the network, and recording identifying RTA session information; wherein said RTA session can be utilized for all packets generated for that RTA session;
        (iii) receiving both real-time application (RTA) packets and non-real-time application (non-RTA) packets generated at an application layer of the protocol, through middle layers of the protocol for the WLAN STA, at a Medium Access Control (MAC) layer;
        (iv) appending additional signal fields in the MAC header and physical layer convergence protocol (PLCP) header preparing the packets for transmission over the physical layer of the network protocol for said WLAN STA;
        (v) distinguishing real-time application (RTA) packets from non-real-time application (non-RTA) packets at the MAC layer from information embedded in the MAC or PLCP headers;
        (vi) utilizing carrier sense multiple access/collision avoidance (CSMA/CA) for all non-RTA packets;
        (vii) maintaining an RTA scheduling table for tracking active RTA sessions and managing transmission times for RTA traffic;
        (viii) scheduling channel time as scheduled channel time on a channel based on determining an expected RTA packet arrival time at its Medium Access Control (MAC) layer and using a modified ready-to-send (RTS)/clear-to-send(CTS) exchange;
        (ix) occupying the channel before the scheduled channel time for an RTA traffic transmission, whereby channel access is available for the RTA traffic at the beginning of the scheduled channel time; and (x) rejecting other packet transmissions during the scheduled channel time for RTA packet.

2. The apparatus of claim 1, wherein said instructions when executed by the processor perform one or more steps in distinguishing real-time application (RTA) packets from non-real-time application (non-RTA) packets comprising making a determination based on prior negotiation, or packet header information, or a combination of prior negotiation and packet header information.

3. The apparatus of claim 1, wherein said instructions when executed by the processor perform one or more steps in tracking active RTA sessions comprising performing said tracking based on RTA session information embedded in packet headers.

4. The apparatus of claim 1, wherein said instructions when executed by the processor perform one or more steps further comprising scheduling a specific period of channel time for a given RTA packet and rejecting a request to send (RTS) that requires channel time that is not associated with that given RTA packet during that period.

5. The apparatus of claim 1, wherein said instructions when executed by the processor perform one or more steps further comprising scheduling a specific period of channel time for an RTA packet and responds to a request to send (RTS) frame based on information found in said RTA scheduling table.

6. The apparatus of claim 1, wherein said instructions when executed by the processor perform one or more steps further comprising scheduling a specific period of channel time for an RTA packet and reject non-RTA packet reception if it is determined that any RTA transmissions are scheduled within that period of time.

7. The apparatus of claim 1, wherein said instructions when executed by the processor perform one or more steps further comprising scheduling a specific period of channel time for transmitting an RTA packet in a CTS frame with a shortened transmission opportunity (TXOP) to reserve a channel for near future use.

8. The apparatus of claim 1, wherein said instructions when executed by the processor perform one or more steps further comprising scheduling a specified period of channel time for an RTA packet and transmitting a not clear to send (NotCTS) frame to notify nearby stations of channel busy over the specified period of time.

9. An apparatus for wireless communication in a network, the apparatus comprising:

(a) a wireless communication circuit, as a WLAN station (STA), configured for wirelessly communicating with at least one other wireless local area network (WLAN) station in its reception area;

(b) a processor coupled to said wireless communication circuit within a station configured for operating on the WLAN;

(c) a non-transitory memory storing instructions executable by the processor; and (d) wherein said instructions, when executed by the processor, perform one or more steps comprising:

(i) operating said wireless communication circuit as a WLAN station configured to support communicating real-time application (RTA) packets that are sensitive to communication delays as well as non-real time packets, so that real time application (RTA) traffic and non-RTA traffic coexist;

(ii) negotiating for an RTA session between said WLAN STA and another STA on the network, and recording identifying RTA session information; wherein said RTA session can be utilized for all packets generated for that RTA session;

(iii) receiving both real-time application (RTA) packets and non-real-time application (non-RTA) packets generated at an application layer of the protocol, through middle layers of the protocol for the WLAN STA, at a Medium Access Control (MAC) layer;

(iv) appending additional signal fields in the MAC header and physical layer convergence protocol (PLCP) header preparing the packets for transmission over the physical layer of the network protocol for said WLAN STA;

(v) distinguishing real-time application (RTA) packets from non-real-time application (non-RTA) packets by making a determination based on prior negotiation, or packet header information, or a combination of prior negotiation and packet header information as determined at the MAC layer from information embedded in the MAC or PLCP headers;

(vi) utilizing carrier sense multiple access/collision avoidance (CSMA/CA) for all non-RTA packets; and (vii) maintaining an RTA scheduling table for tracking active RTA sessions based on RTA session information embedded in packet headers and managing transmission times for RTA traffic;

(viii) scheduling channel time, as scheduled channel time on a channel, based on determining an expected RTA packet arrival time at its Medium Access Control (MAC) layer and using a modified ready-to-send (RTS)/clear-to-send(CTS) exchange;

(ix) occupying the channel before the scheduled channel time for an RTA traffic transmission, whereby channel access is available for the RTA traffic at the beginning of the scheduled channel time; and (x) rejecting other packet transmissions during the scheduled channel time for RTA packet.

10. The apparatus of claim 9, wherein said instructions when executed by the processor perform one or more steps further comprising scheduling a specific period of channel time for a given RTA packet and rejecting a request to send (RTS) that requires channel time that is not associated with that given RTA packet during that period.

11. The apparatus of claim 9, wherein said instructions when executed by the processor perform one or more steps further comprising scheduling a specific period of channel time for an RTA packet and responds to a request to send (RTS) frame based on information found in said RTA scheduling table.

12. The apparatus of claim 9, wherein said instructions when executed by the processor perform one or more steps further comprising scheduling a specific period of channel time for an RTA packet and reject non-RTA packet reception if it is determined that any RTA transmissions are scheduled within that period of time.

13. The apparatus of claim 9, wherein said instructions when executed by the processor perform one or more steps further comprising scheduling a specific period of channel time for transmitting an RTA packet in a CTS frame with a shortened transmission opportunity (TXOP) to reserve a channel for near future use.

14. The apparatus of claim 9, wherein said instructions when executed by the processor perform one or more steps further comprising scheduling a specified period of channel time for an RTA packet and transmitting a not clear to send (NotCTS) frame to notify nearby stations of channel busy over the specified period of time.

15. A method of performing wireless communication in a network, comprising:
(a) operating a wireless communication circuit as a WLAN station (STA) configured for wirelessly communicating with at least one other wireless local area network (WLAN) station in its reception area, as a WLAN station configured to support communicating real-time application (RTA) packets that are sensitive to communication delays as well as non-real time packets, so that real time application (RTA) traffic and non-RTA traffic coexist;
(b) negotiating for an RTA session between said WLAN STA and another STA on the network, and recording identifying RTA session information; wherein said RTA session can be utilized for all packets generated for that RTA session;
(c) receiving both real-time application (RTA) packets and non-real-time application (non-RTA) packets generated at an application layer of the protocol, through middle layers of the protocol for the WLAN STA, at a Medium Access Control (MAC) layer;
(d) appending additional signal fields in the MAC header and physical layer convergence protocol (PLCP) header preparing the packets for transmission over the physical layer of the network protocol for said WLAN STA;
(e) distinguishing real-time application (RTA) packets from non-real-time application (non-RTA) packets at the MAC layer from information embedded in the MAC or PLCP headers;
(f) utilizing carrier sense multiple access/collision avoidance (CSMA/CA) for all non-RTA packets;
(g) maintaining an RTA scheduling table for tracking active RTA sessions and managing transmission times for RTA traffic;
(h) scheduling channel time as scheduled channel time on a channel based on determining an expected RTA packet arrival time at its Medium Access Control (MAC) layer and using a modified ready-to-send (RTS)/clear-to-send(CTS) exchange;
(i) occupying the channel before the scheduled channel time for an RTA traffic transmission, whereby channel access is available for the RTA traffic at the beginning of the scheduled channel time; and
(j) rejecting other packet transmissions during the scheduled channel time for RTA packet.

16. The method of claim 15, further comprising distinguishing real-time application (RTA) packets from non-real-time application (non-RTA) packets by making a determination based on prior negotiation, or packet header information, or a combination of prior negotiation and packet header information.

17. The method of claim 15, wherein said tracking active RTA sessions comprises performing said tracking based on RTA session information embedded in packet headers.

18. The method of claim 15, further comprising scheduling a specific period of channel time for a given RTA packet and rejecting a request to send (RTS) that requires channel time that is not associated with that given RTA packet during that period.

19. The method of claim 15, further comprising scheduling a specific period of channel time for an RTA packet and responds to a request to send (RTS) frame based on information found in said RTA scheduling table.

20. The method of claim 15, further comprising scheduling a specific period of channel time for an RTA packet and rejecting non-RTA packet reception if it is determined that any RTA transmissions are scheduled within that period of time.

21. The method of claim 15, further comprising scheduling a specific period of channel time for transmitting an RTA packet in a CTS frame with a shortened transmission opportunity (TXOP) to reserve a channel for future use.

22. The method of claim 15, further comprising scheduling a specified period of channel time for an RTA packet and transmitting a not clear to send (NotCTS) frame to notify nearby stations of channel busy over the specified period of time.

* * * * *